Jan. 17, 1967 K. E. PRESCHER ET AL 3,299,214

COMMUNICATION SWITCHING SYSTEM COMMON CONTROL ARRANGEMENT

Original Filed March 27, 1963 20 Sheets-Sheet 1

INVENTORS

Kenneth E. Prescher
John G. Van Bosse

BY

ATTY.

COMMUNICATION SWITCHING SYSTEM COMMON CONTROL ARRANGEMENT

Original Filed March 27, 1963 20 Sheets-Sheet 4

| POSITION → | Bit | DUA & DUG | DUB | DUC | DUD | DUE | | DUF |
|---|---|---|---|---|---|---|---|---|
| A | 1–4 | COUNT OF-16 | COUNT OF-16 | COUNT OF-16 / TRUNK ID | COUNT OF-16 | K | | |
| B | 1–2 | MODE OF-COUNT | MODE OF-COUNT | TRUNK T DIGIT | SPARE | Y | | P |
| B | 3 | SPARE | SPARE | | | | | |
| B | 4 | P | SPARE | | | | | |
| C | 1–3 | REG. (Rx) SEQ. STATES | SENDERS (Sx) SEQUENCE STATES | 7TH DIGIT | Z DIGIT | BLANK | N | U |
| C | 4 | SPARE | | | | | | |
| D | 1 | STATES(Vx) | Qx STATES | N | N·U | PARTY DIGIT | N | T |
| D | 2 | DISC. | | | | | | |
| D | 3 | FTO | | | | | | |
| D | 4 | TRR | SPARE | | | | | |
| E | 1 | W1 | TRUNK IDEN. COUNT | N | NT | U | N | H |
| E | 2 | W2 | | | | | | |
| E | 3 | SDC | | | | | | |
| E | 4 | RDC | SPARE | | | | | |
| F | 1 | TR | SPARE | A | N-H | T | N | D |
| F | 2 | TS | | | | | | |
| F | 3 | D | | | | | | |
| F | 4 | 24 | | | | | | |
| G | 1 | CB | SENDER ADDRESS | N | N·TH | H | N | C |
| G | 2–3 | SPARE | | | | | | |
| G | 4 | | SPARE | | | | | |
| H | 1–4 | X INST. | SENDER S(SD) DIGIT | N | BLANK | B | L | B |
| I | 1–4 | DRUM ADDRESS & J-DIGIT | SENDER I(ID) DIGIT | A | A | A | L | A |

FIG. 4

Jan. 17, 1967 K. E. PRESCHER ET AL 3,299,214

COMMUNICATION SWITCHING SYSTEM COMMON CONTROL ARRANGEMENT

Original Filed March 27, 1963 20 Sheets-Sheet 5

COMMUNICATION SWITCHING SYSTEM COMMON CONTROL ARRANGEMENT

Original Filed March 27, 1963

20 Sheets-Sheet 6

Jan. 17, 1967 K. E. PRESCHER ET AL 3,299,214

COMMUNICATION SWITCHING SYSTEM COMMON CONTROL ARRANGEMENT

Original Filed March 27, 1963 20 Sheets-Sheet

COMMUNICATION SWITCHING SYSTEM COMMON CONTROL ARRANGEMENT

Original Filed March 27, 1963 20 Sheets-Sheet 8

Jan. 17, 1967 K. E. PRESCHER ETAL 3,299,214

COMMUNICATION SWITCHING SYSTEM COMMON CONTROL ARRANGEMENT

Original Filed March 27, 1963 20 Sheets-Sheet 9

Jan. 17, 1967 K. E. PRESCHER ET AL 3,299,214

COMMUNICATION SWITCHING SYSTEM COMMON CONTROL ARRANGEMENT

Original Filed March 27, 1963 20 Sheets-Sheet 10

COMMUNICATION SWITCHING SYSTEM COMMON CONTROL ARRANGEMENT

Original Filed March 27, 1963

Jan. 17, 1967 K. E. PRESCHER ETAL 3,299,214

COMMUNICATION SWITCHING SYSTEM COMMON CONTROL ARRANGEMENT

Original Filed March 27, 1963 20 Sheets-Sheet 12

Jan. 17, 1967 K. E. PRESCHER ET AL 3,299,214

COMMUNICATION SWITCHING SYSTEM COMMON CONTROL ARRANGEMENT

Original Filed March 27, 1963 20 Sheets-Sheet 13

Jan. 17, 1967 K. E. PRESCHER ET AL 3,299,214

COMMUNICATION SWITCHING SYSTEM COMMON CONTROL ARRANGEMENT

Original Filed March 27, 1963 20 Sheets-Sheet 15

COMMUNICATION SWITCHING SYSTEM COMMON CONTROL ARRANGEMENT

Original Filed March 27, 1963

20 Sheets-Sheet 17

United States Patent Office 3,299,214

Patented Jan. 17, 1967

3,299,214

COMMUNICATION SWITCHING SYSTEM COMMON CONTROL ARRANGEMENT

Kenneth E. Prescher, Chicago, and John G. Van Bosse, Park Ridge, Ill., assignors to Automatic Electric Laboratories, Inc., Northlake, Ill., a corporation of Delaware Original application Mar. 27, 1963, Ser. No. 268,385. Divided and this application May 13, 1964, Ser. No. 367,003

56 Claims. (Cl. 179—18)

This invention relates to a register arrangement, and more particularly to a communication switching system common control arrangement.

This is a division of a copending patent application Serial No. 268,385 filed March 27, 1963, for a Register-Sender Arrangement for a Communication Switching System, by R. E. Schauer, K. E. Prescher, J. G. Van Bosse and A. C. Lange, the inventorship being corrected for the subject matter claimed herein.

Many electronic automatic telephone switching systems have been developed in order to realize advantages such as fast operation, small size, and easy maintenance as compared to mechanical systems. These electronic systems can be divided into two categories, those in which the voice path switching is accomplished by means of a common highway with time division multiplex sampling of the voice signals, and those using crosspoint switching devices connected in matrix form in one or more stages. The crosspoint type systems include small exchange types having approximately 100 lines in which control circuits such as registers and sequence switches are individual to connecting units such as links. In the larger crosspoint type systems the control circuits are time-shared by the connecting units. Furthermore, in order to permit nondecimal selections translation is usually provided in these systems. Translation permits conversion of called number information from the form in which it is received, for example as decimal dial pulses, to nondecimal forms for switch control and other purposes.

The object of this invention is to reduce the amount of equipment required in the register arrangement.

Another object of this invention is the provision of an arrangement whereby the flexibility of telephone switching systems is increased in order to permit rapid and inexpensive rearrangements to meet changes in traffic and other environmental conditions and to facilitate the addition of new and unusual functions in telephone switching systems.

These and other objects of this invention are attained in one specific illustrative embodiment wherein the common control equipment includes a pool of registers, with each originating call using a register only until the connection to a called line or outgoing trunk is established; and with a pool of registers comprising electronic apparatus shared on a time division multiplex basis. The pool of registers is preferably divided into a plurality of register groups, each including a ferrite core array, used with the electronic apparatus in a recirculating arrangement. Senders are also included for transmitting switching information in response to information stored in the registers. A translator is provided for seizure by the register equipment for providing a translation between the equipment location numbers and the corresponding line directory numbers and for passing the translated information to the register.

According to one feature, a large amount of storage is obtained for a register by providing several rows of storage elements in the memory for each register. The first memory row of the register is used to store control information, which controls the storage of data information in subsequent memory rows of the register. After a portion of the data information is stored, the control information is up-dated corresponding to the information contained in the stored data information so that the register is prepared for the receipt of additional data information.

Since each register in the memory is shared on a time division multiplex basis by providing several rows per register in the memory with a time slot and by dividing the time slot of each register into several subtime slots corresponding to each row in the register, the last subtime slot of a register's time slot is used to up-date the control word contained in the first row of the register. Each of the rows is individually associated with one of the subtime slots, except that the first row is accessed during both the first subtime slot and the last subtime slot for each register. This first row contains the control information for the register and the translators, and timing and sequence information, which is read out during the first subtime slot, modified in accordance with data information obtained from the other rows during individual subtime slots, and written into the first row during the last subtime slot. The time slot and subtime slot signals are generated by counters in a distributor having its outputs connected to register junctors and the memory rows, and may be considered to be *addresses* as defined in the computer art.

Since the register is provided with a separate carry storage area having sufficient capacity for one memory row, the first memory row of the register can be accessed for the second time during the same time slot of a register. During a register's time slot, data information (such as dioled digits from the subscriber, line number identification, or switching digits from the translator) is written into a row of the memory designated by the control information contained in the first row, and this data information is also written into the carry storage area so that this data information can be used during the last subtime slot of the register's time slot to update the control information in the first row of the register. Thereupon additional data information is written into the memory during subsequent time slots for this register.

Dividing the storage requirements of a register into several rows allows a more efficient use of the memory drive and sense circuitry, and the other electronic apparatus of a register group. With the large amount of storage available by providing several rows per register, storage is available for the line number identification of the calling subscriber, thus providing a centralized storage area for ticketing.

The decoding logic and the time-shared electronic apparatus can be used more efficiently by storing digits in the same memory columns but in different rows.

Other features relate to the counting and timing techniques for controlling the memory and the various time division multiplex circuits, as well as for various timing functions required during dialing, for time-out of apparatus, and for other functions.

The above-mentioned and other objects and features of this invention and the manner of attaining them will become more apparent, and the invention itself will be best understood, by reference to the following description of an embodiment of the invention taken in conjunction with the accompanying drawings comprising FIGS. 1–25 wherein:

FIGS. 1–3 when arranged as shown in FIG. 24 comprise a block diagram of a telephone switching exchange.

FIGS. 4–6 are charts which are useful in understanding the operation of the memory;

Figure 1:
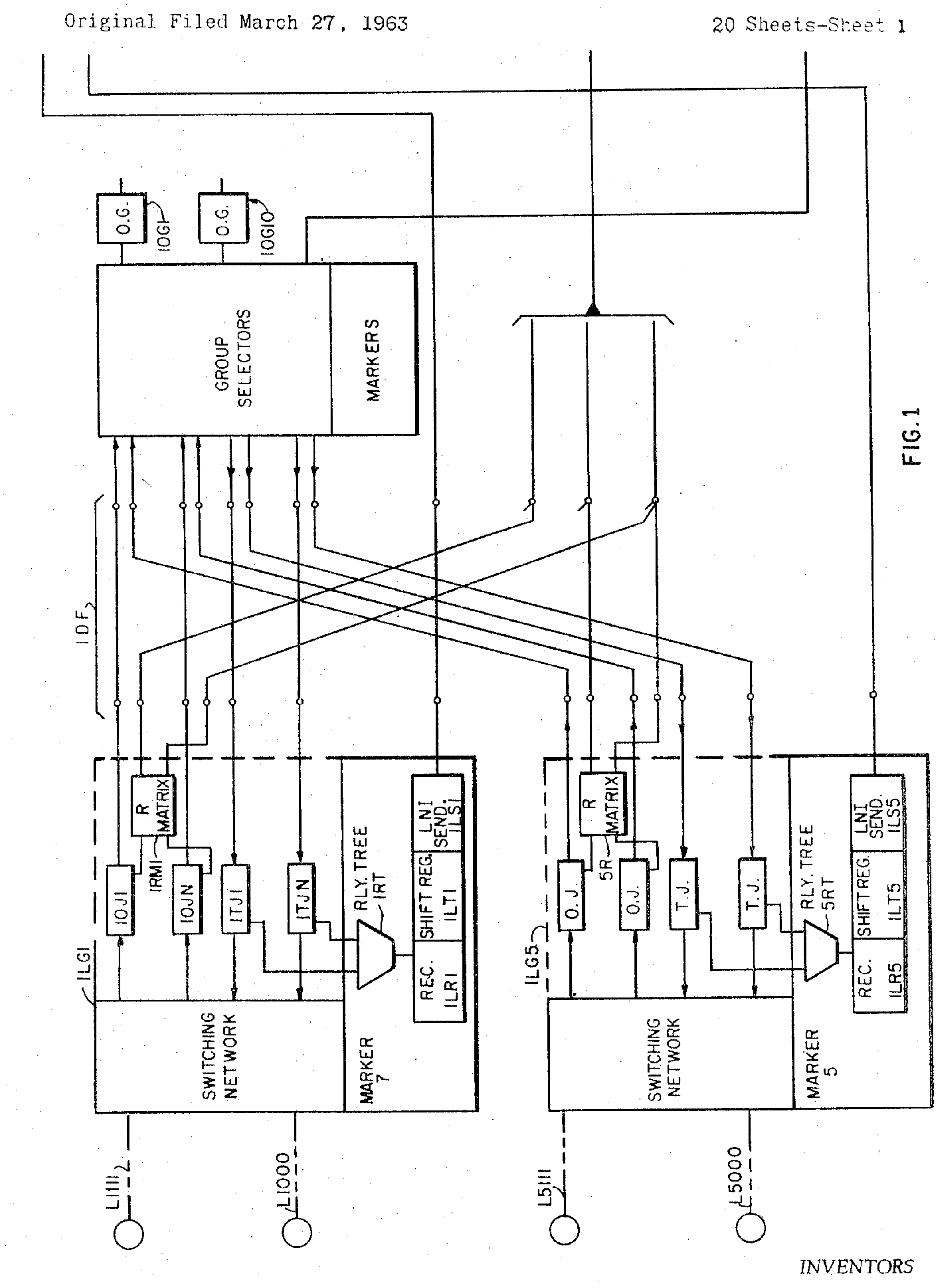
Figure 2:
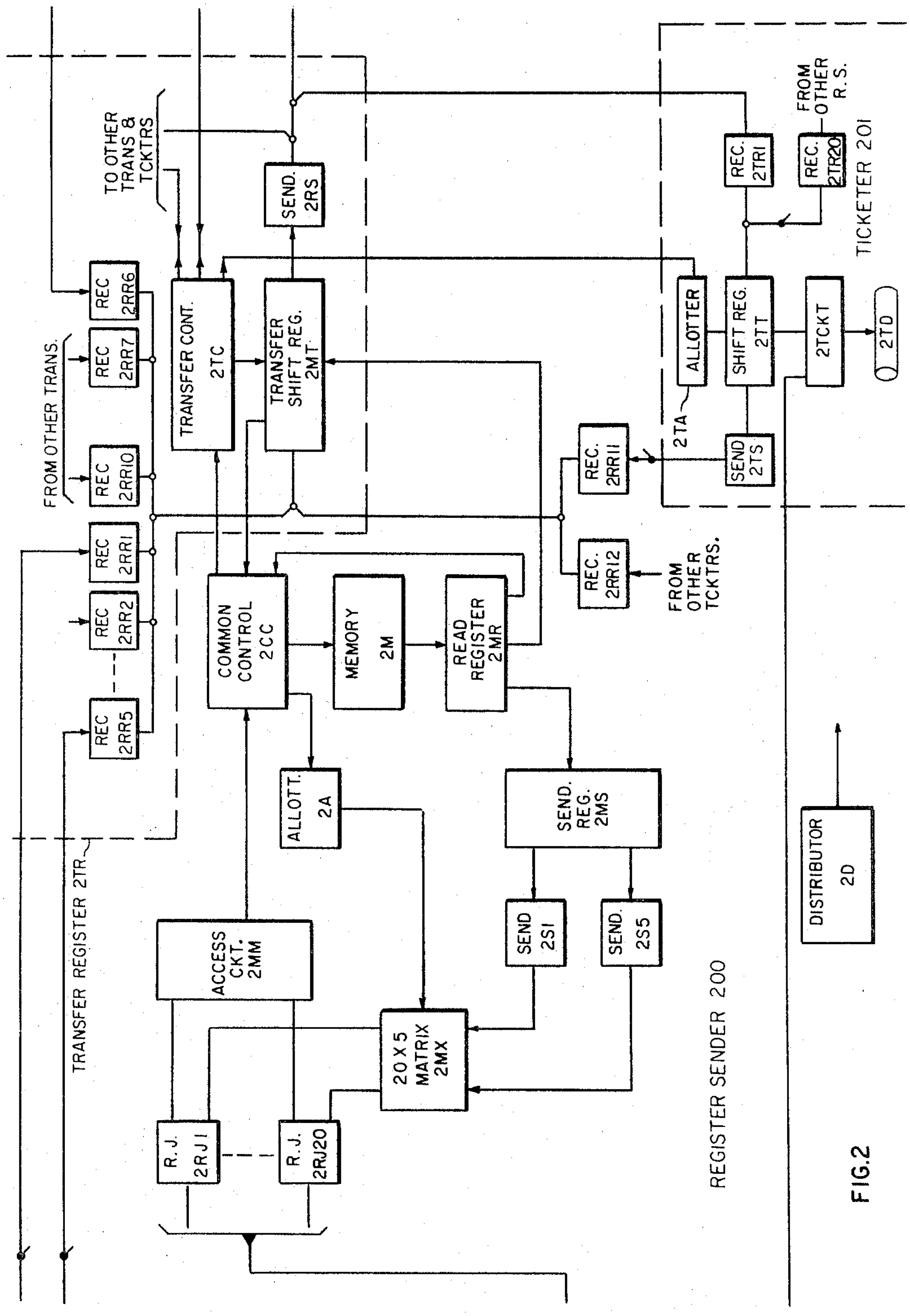
Figure 3:
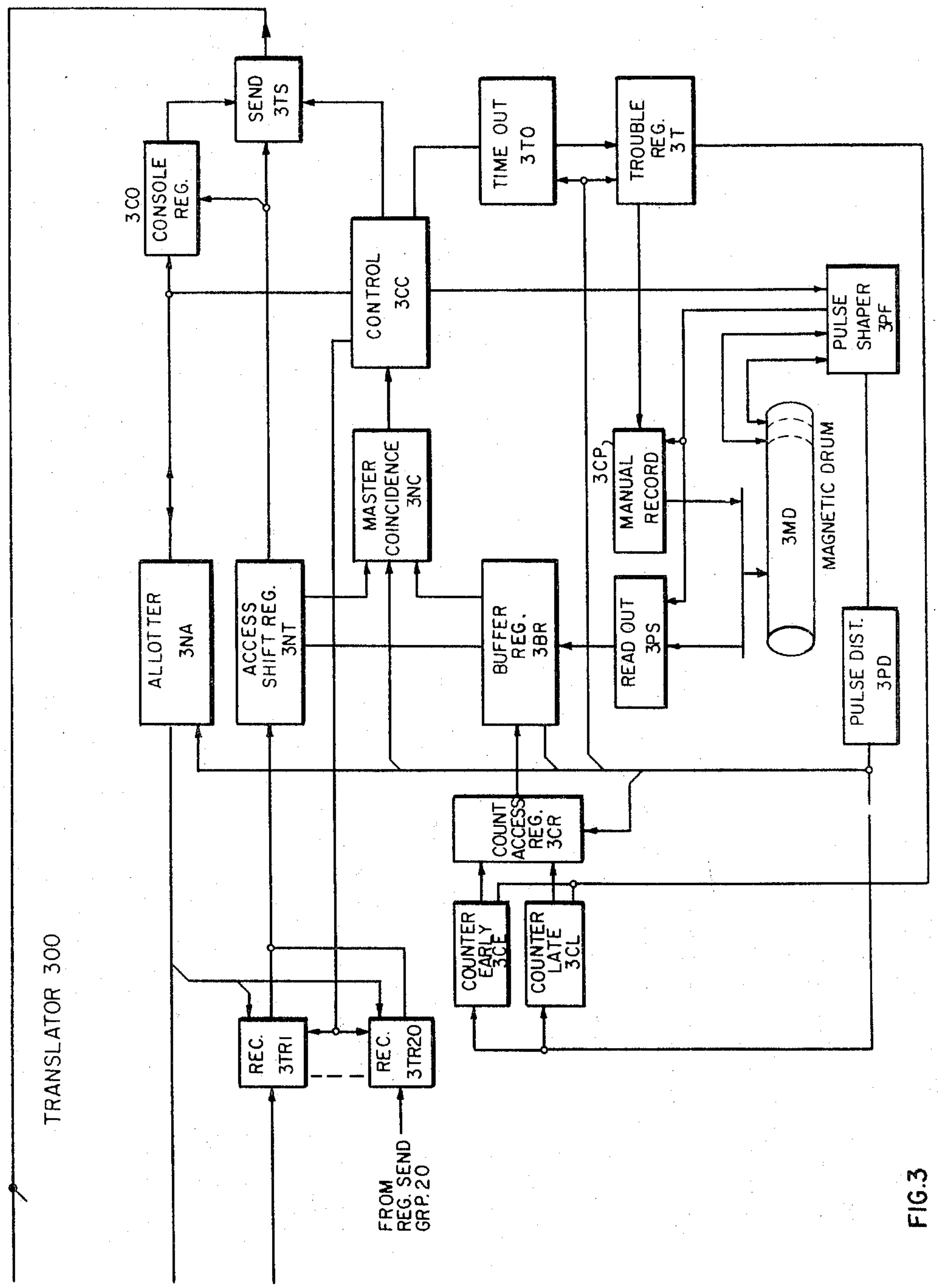
Figure 11A:
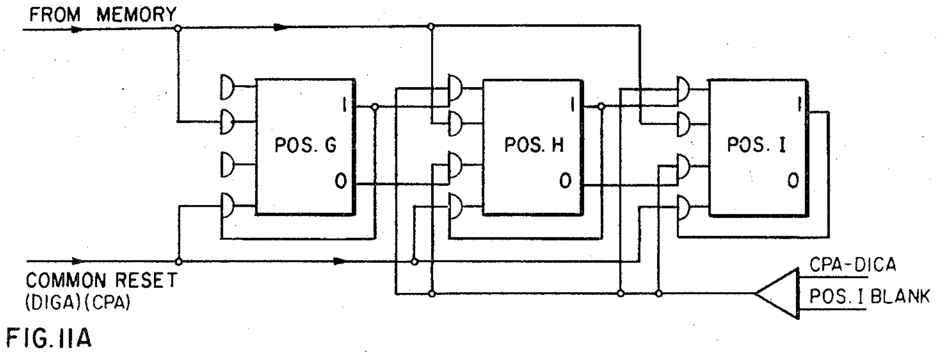
Figure 11B:
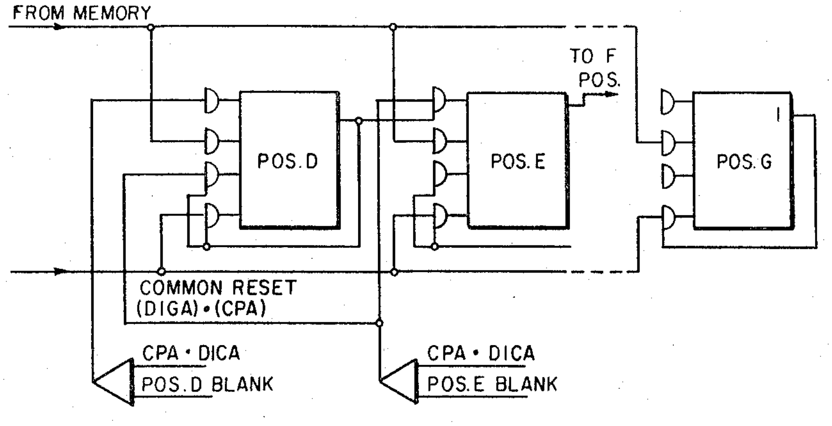
Figure 9A:
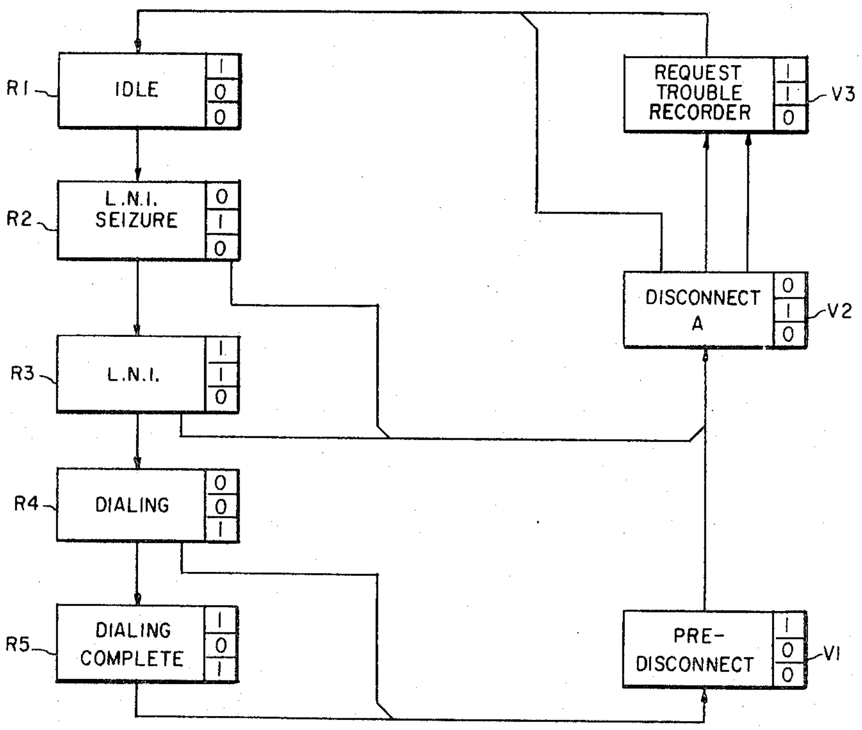
Figure 9B:
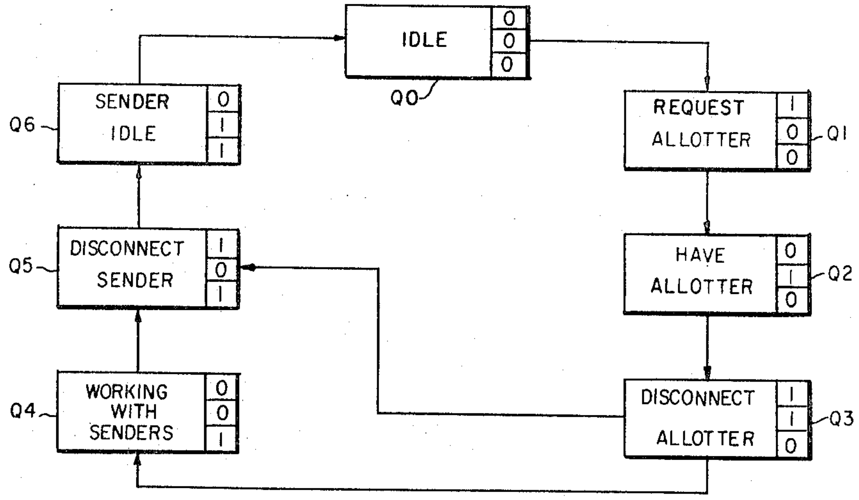
Figure 10:
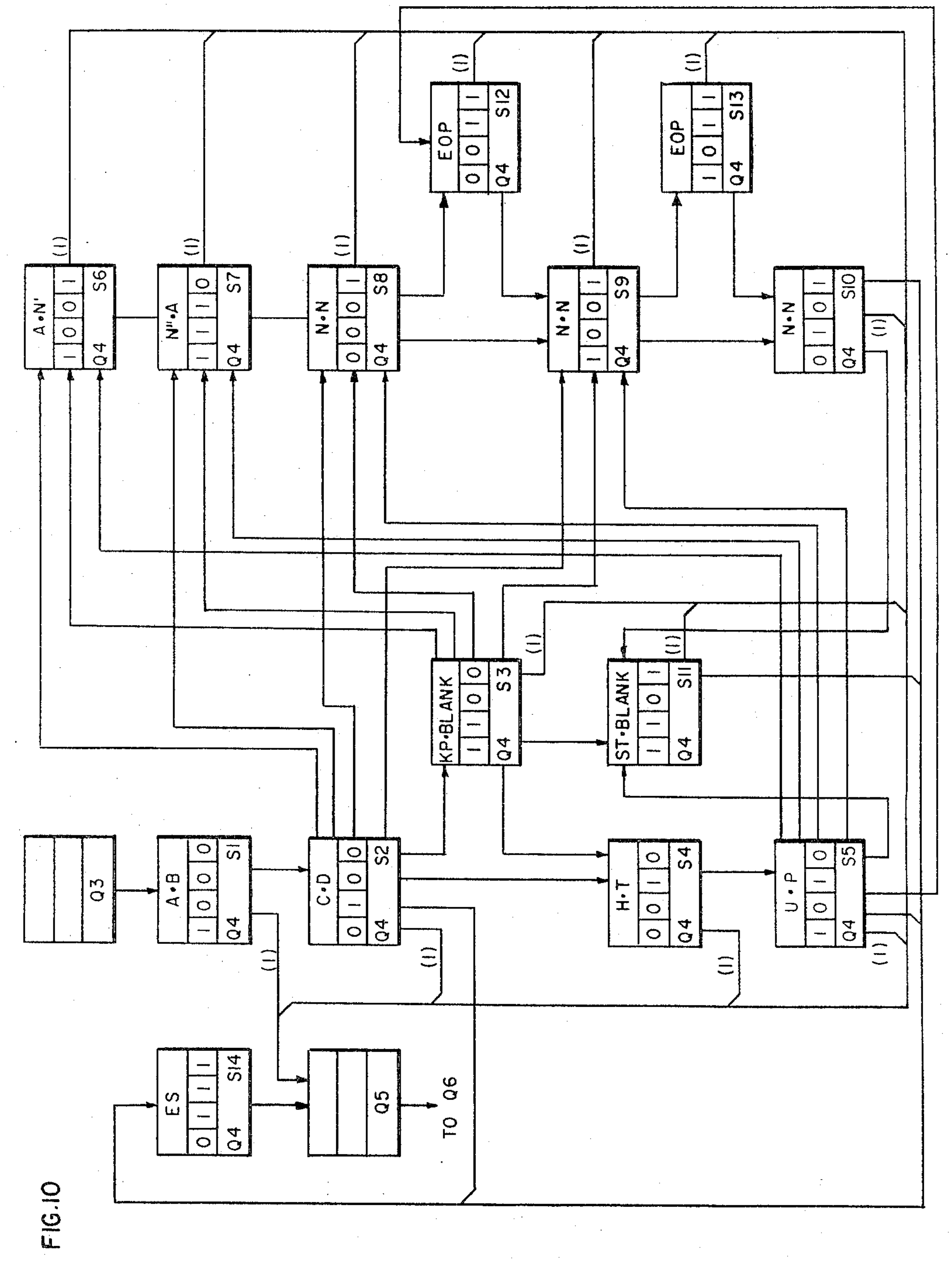
Figure 12:
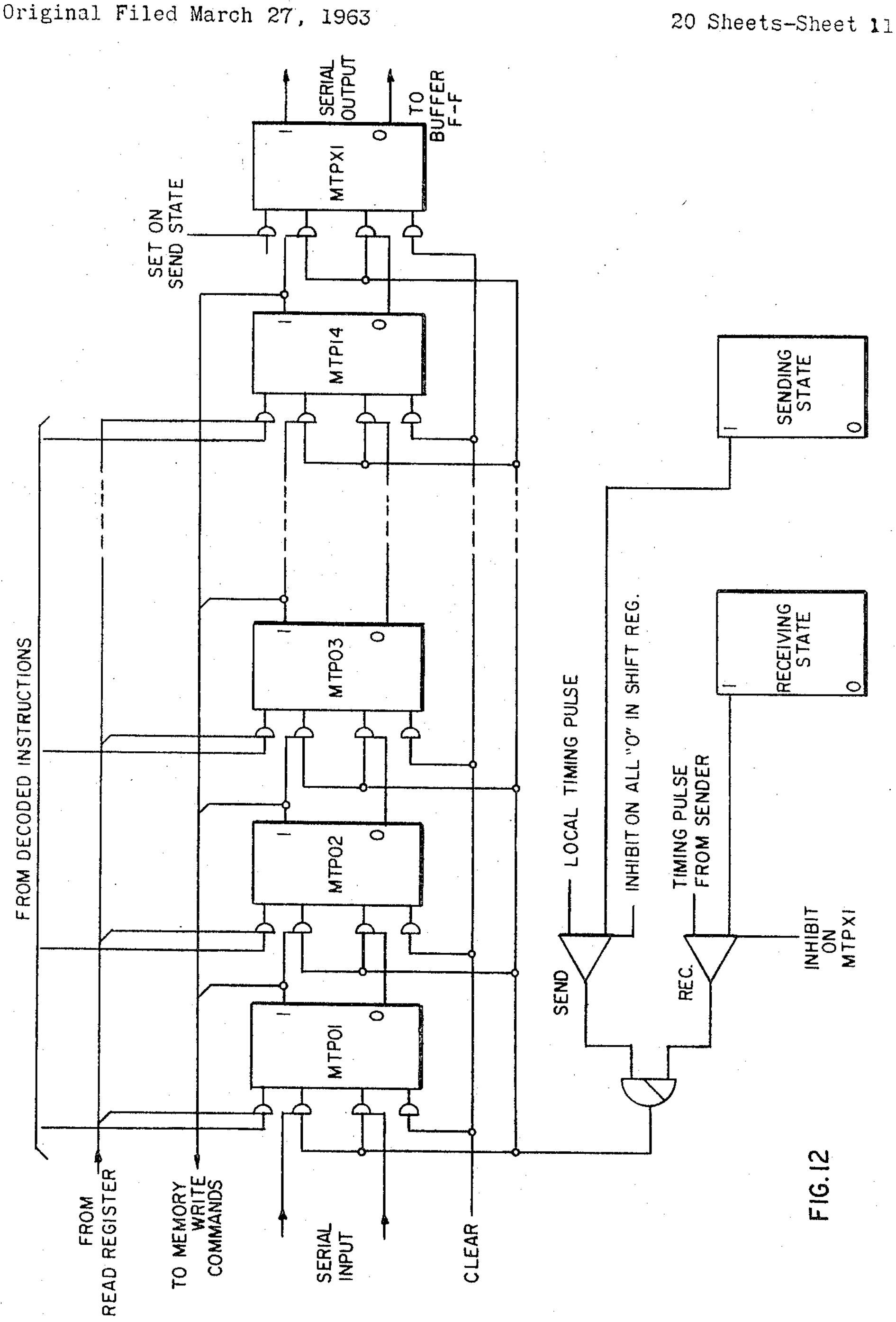
Figure 13:
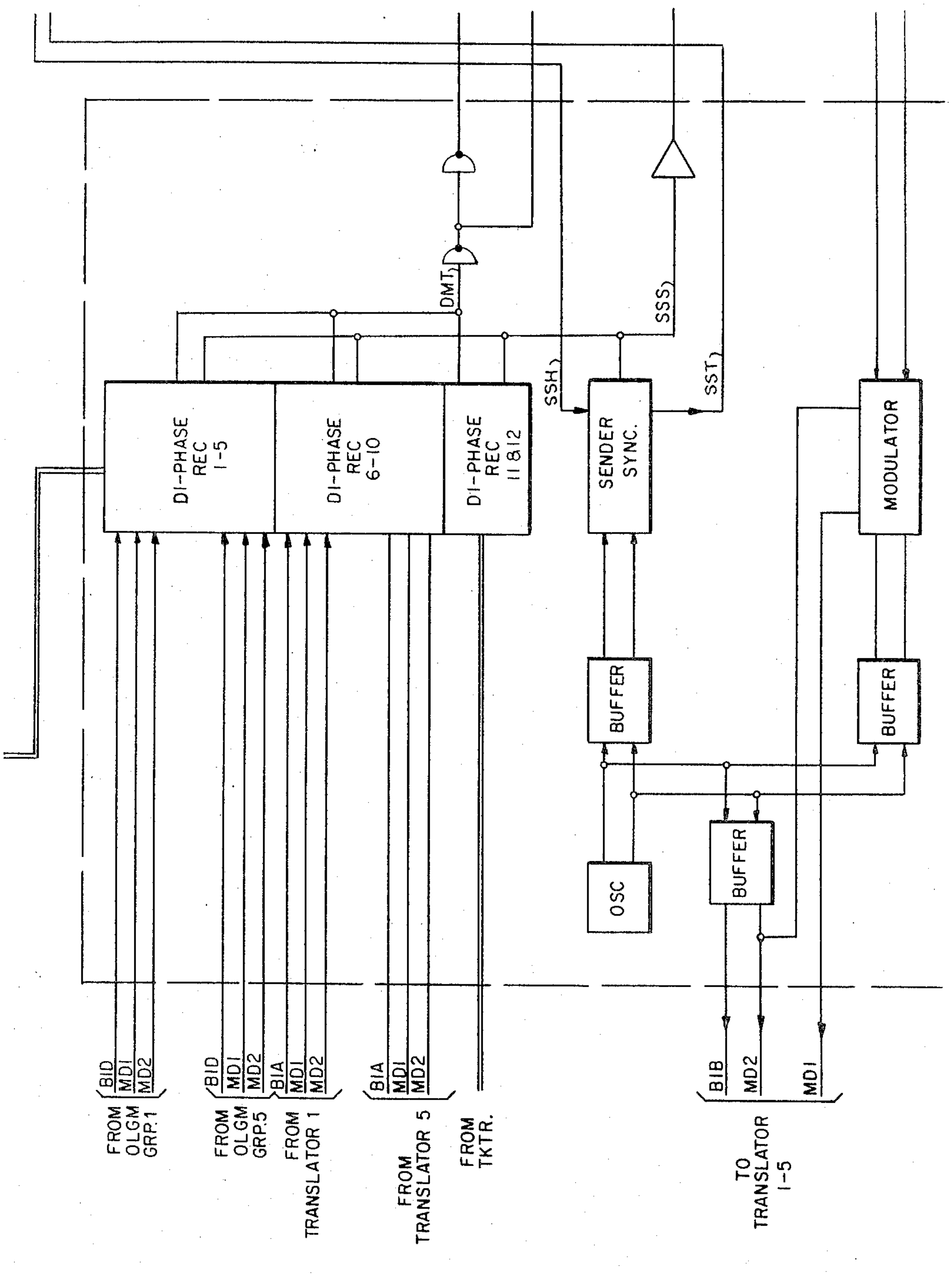
Figure 19:
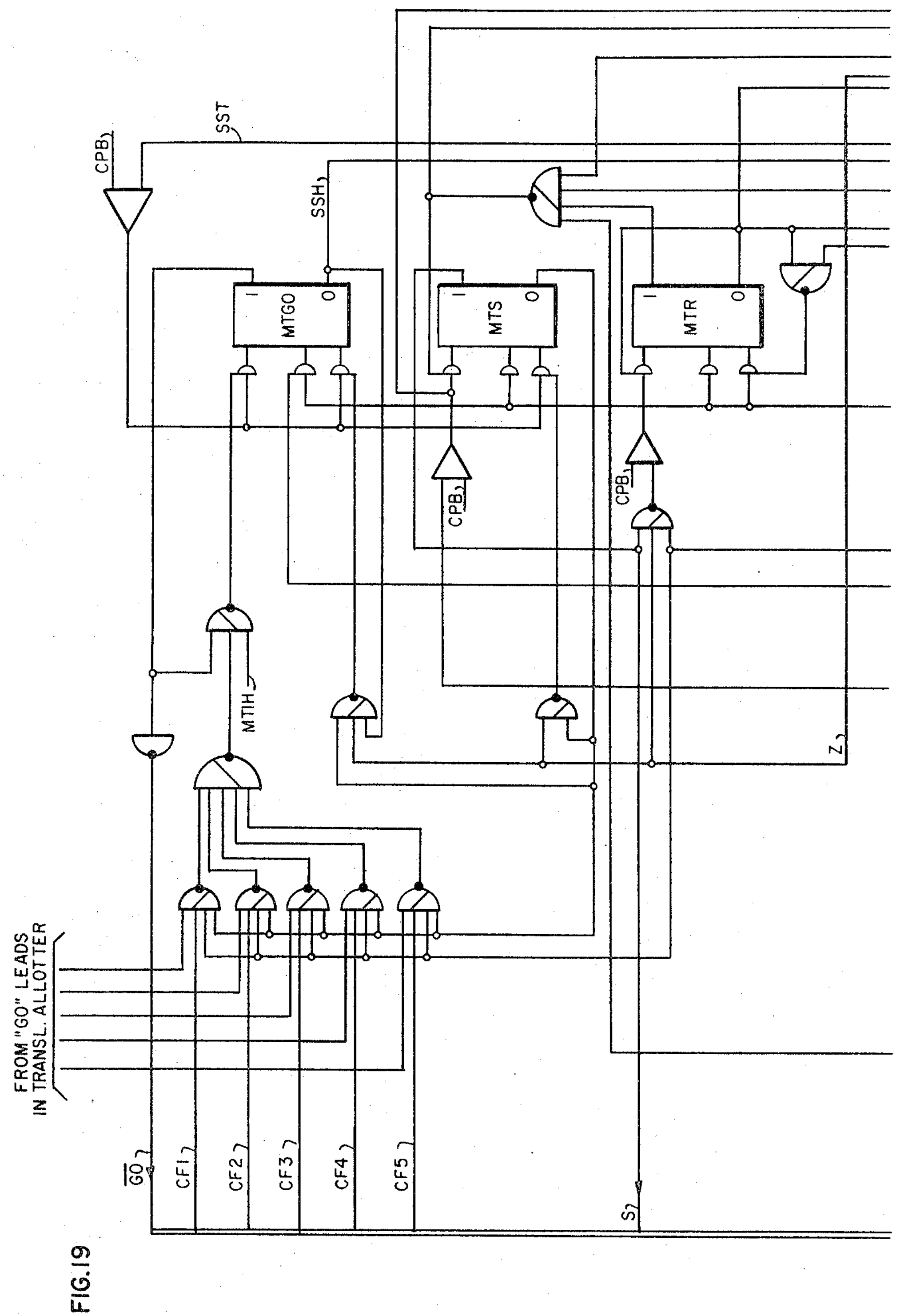
Figures 20, 24, 25:
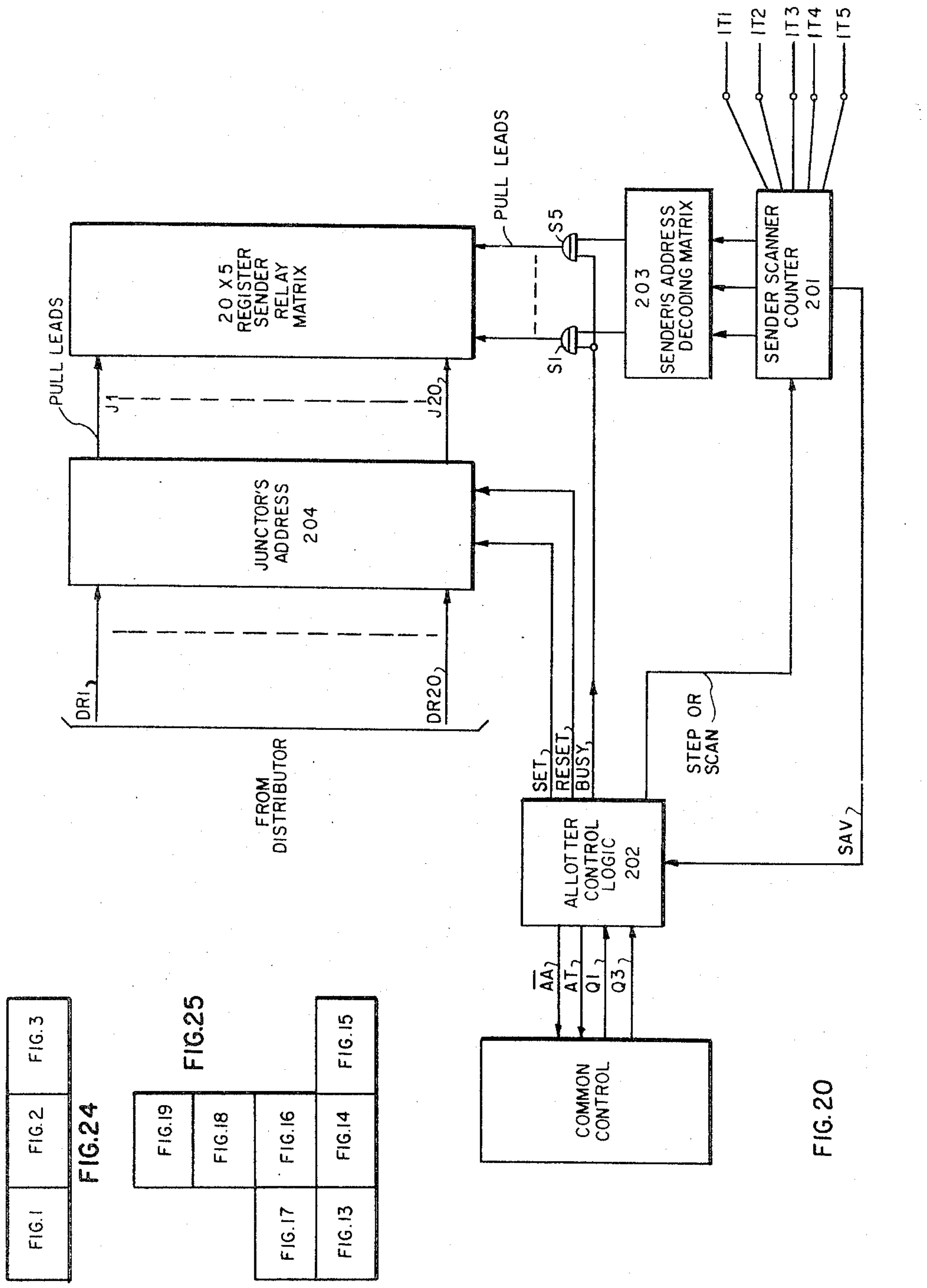
Figure 21:
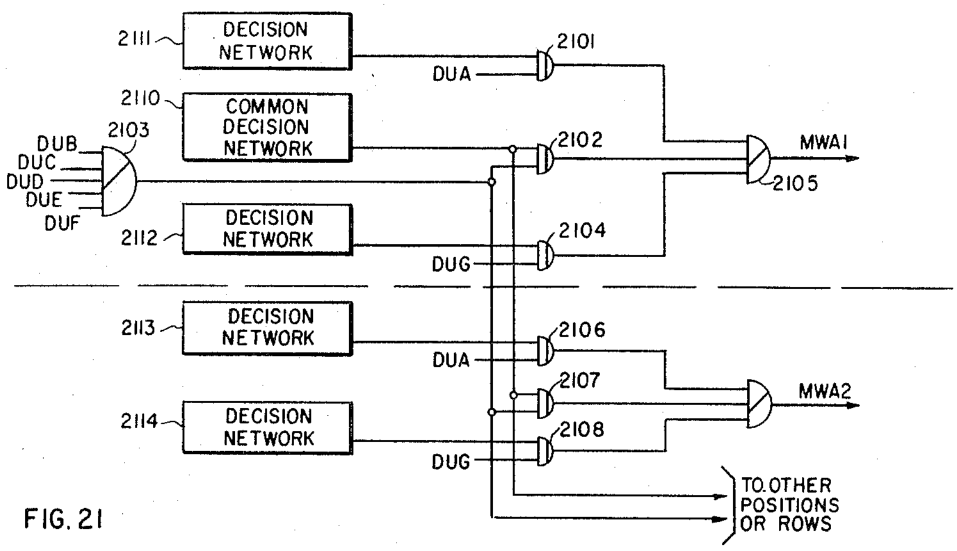
Figure 22:
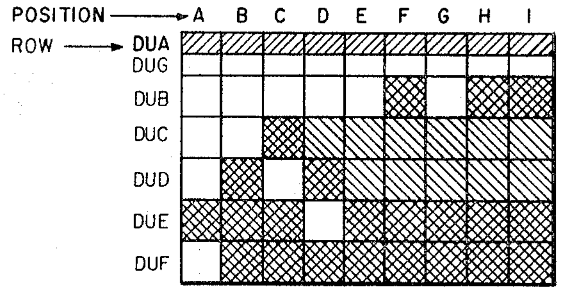
Figure 23:
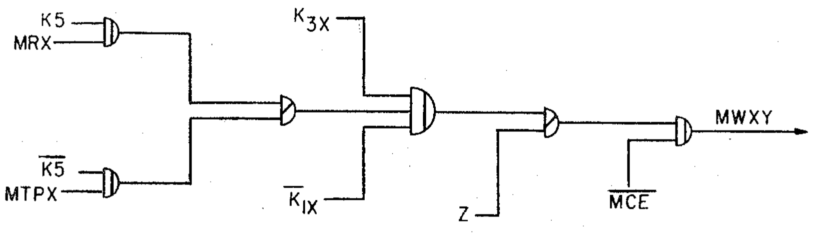

FIGS. 9A, 9B, and 10 are sequence state flow diagrams;

FIGS. 11A and 11B are skeletonized symbolic block diagrams of the read register;

FIG. 12 is a skeletonized symbolic block diagram of the transfer register;

FIGS. 13–19 when arranged as shown in FIG. 25 comprise a symbolic block diagram of the transfer register;

FIG. 20 is a block diagram of the allotter;

FIG. 21 is a skeletonized symbolic block diagram of the common control;

FIGS. 22–23 are respectively a chart and symbolic block diagram which are useful in understanding the operation of the common control;

FIG. 23 shows how FIGS. 1–3 are to be arranged;

FIG. 25 shows how FIGS. 13–19 are to be arranged.

The system is explained according to the following outline:

CHAPTER 1—General System Description
- 1.1 The general trunking diagram
- 1.2 Typical call
- 1.3 General description of the register-sender CHAPTER 2—Symbolism CHAPTER 3—Memory Arrangement
- 3.1 Storage requirements
- 3.2 Logical divisions
- 3.3 Bit arrangement
- 3.4 Detailed bit identifications CHAPTER 4—System Timing
- 4.1 General description
- 4.2 Distributor CHAPTER 5—Register-Sender Sequence States
- 5.1 Register and disconnect sequence states
- 5.2 Sender control
- 5.3 Sender Q states
- 5.4 Sender sequence states CHAPTER 6—Register Junctor and Access Circuitry
- 6.1 Entrance requirements
- 6.2 Disconnect requirements
- 6.3 Coin box and hold circuitry
- 6.4 Multiplexing CHAPTER 7—Numbering Plan Requirements CHAPTER 8—Read Register
- 8.1 Description
- 8.2 Equations CHAPTER 9—Carry Register
- 9.1 Descriptions
- 9.2 Equations CHAPTER 10—Transfer Register
- 10.2 Descriptions
- 10.3 Equations CHAPTER 11—Allotter
- 11.1 General
- 11.2 Operation CHAPTER 12—Sender Register
- 12.1 General
- 12.2 Normal operation
- 12.3 Information transfer
- 12.4 Ticketing operation
- 12.5 General equations CHAPTER 13—Common Control Logic
- 13.1 General description
- 13.2 Write commands—General format
- 13.3 Sender sequence states
- 13.4 Counting logic
- 13.5 Miscellaneous write commands
- 13.6 Decoding logic
- 13.7 Detailed write command logic

CHAPTER 1—GENERAL SYSTEM DESCRIPTION

The system arrangement and the components used are generally similar to those described in the following patent applications:

K. K. Spellnes, Communication Switching System, Serial No. 230,887 filed October 16, 1962, now Patent No. 3,170,041;

M. H. Esperseth et al., Communication Switching Systems, Serial No. 240,497 filed November 28, 1962, now Patent No. 3,275,752;

K. E. Prescher et al., Communication Switching System Common Control, Serial No. 231,625 filed October 19, 1962, now Patent No. 3,173,994;

E. J. Glenner, Translator, Serial No. 231,627 filed October 19, 1962, now Patent No. 3,194,892.

1.1 *The general trunking diagram*

A general trunking block diagram is shown in FIGS. 1, 2 and 3 arranged as shown in FIG. 24. The system consists of four basic system sections; namely, the line groups 1LG1–1LG5, the group selectors 1GS, the register-sender group 200, and the translator group 300. Each of these sections is self-contained and controlled by its own clock circuitry and operates independently and not in synchronism with any other section. A minimum of two register-sender groups 200 will be equipped per office and the translator 300, including its magnetic drum 3MD and logic circuitry, will always be furnished in pairs per 10,000 directory numbers.

Time division techniques are used in the register-sender group 200 and in the translator 300. The line group and selector markers are designed on an electronic basis and semiconductor circuitry is employed throughout the system. A ferrite core memory 2M is used for temporary storage in the register-sender group, whereas the magnetic drum 3MD is used for semipermanent storage. The space division switching elements of the system consist of reed relay matrix assemblies; in which the crosspoints are made up of reed capsules and normally having two windings.

The line groups and group selectors perform the switching by way of reed relay matrix assemblies in crosspoints configurations; each crosspoint comprising reed capsules and normally two windings. This means that the connections are made by reed relays and the control of these relays is performed by electronic circuitry. The line groups 1LG1–1LG5 each perform two way switching for 1000 lines and are graded by means of an intermediate distributing frame IDF for connection to register groups and group selectors.

The group selector 1GS provides one way switching from a total of 360 incoming trunks or originating junctors to a total of 1200 outgoing trunks or terminating junctors. The outlets may be divided into a maximum of 120 levels with a minimum of 10 outlets per level. A group selector is connected to other switching sections by a grading on the IDF.

A register-sender group consists of a maximum of 20 register junctors 2RJ1–2RJ20 and 5 senders 2S1–2S5. The register-sender group 200 is equipped to handle only local originating calls from the local line groups. The 5 senders 2S1–2S5 are equipped to handle all the various kinds of register traffic and are equipped to send dial speed pulsing, MF pulsing and binary code pulsing; the latter being used for intraoffice switching.

The register-sender group also makes connections to the translator 300 for translation of the stored dialed digits.

The translator 300 contains permanently stored information for the directory numbers as well as for area and office codes. The magnetic drums are always furnished in duplicate for safety reasons. There is a pair of these translators each including its own drum for each 10,000 directory numbers.

For handling incoming traffic the complete system also includes sections not shown herein, namely separate incoming register-sender groups, and an incoming trunk group having a crosspoint matrix for connecting these incoming trunks to the incoming register-sender group.

The method of signalling between the system groups is accomplished by a technique called diphase. This method employs a phase shift technique for serial sending and receiving of pulses.

1.2 *Typical call*

As an introduction to the system operation, a brief description of a typical local call as processed through the system is now presented. The block diagram may be followed for tracing the call.

Assume that the subscriber on line L1111 initiates a call by lifting his handset. The line group marker of group 1LG1 goes into action first by detecting the originating call mark, identifying the calling line, and selecting an idle register junctor within the register-sender group. A path is then temporarily established from the calling telephone to the register junctor via three stages in tandem in the switching network through one of the originating junctors such as junctor 10J1, and a cross-point in the R matrix 1RM1, and the subscriber receives dial tone. The dialed digits are stored temporarily, coded, and process is continued as these digits are passed to the translator 300, analyzed for type of originating call, and instructions are selected from the drum memory 3MD and returned to the register-sender group 200 to guide further handling of the call. Upon receipt of the remaining digits, the translator 300 returns switching instructions corresponding to the called number as stored in the drum memory 3MD. The instructions are transmitted from the register-sender 200 via one of the senders 2S1–2S5 and the originating junctor 10J1 of the originating line group to the group selector 1GS. In the group selector 1GS, the instructions are analyzed by the marker, an idle terminating junctor in the terminating line group, and a path established to that line group via crosspoints in tandem in the group selector. The remaining instructions are followed by the line group marker to locate the called line terminals, select and seize a path from the terminating junctor through crosspoints in tandem to the called line. The terminating junctor establishes ringing, answer supervision, and talking battery for both parties when the call is answered.

Since the system is a common control operation, the markers of the line group and group selector function only to serve the assigned portion of the call processing and are then released to serve other calls. The register-sender 200 and the translator 300 are functioning on a time division basis and therefore are processing several calls simultaneously. The temporary signalling and control paths are released for further service while only the talking paths are held through the switching matrices and junctors in FIG. 1.

1.3 *General description of the register-sender*

Referring now to FIG. 2, local register junctors 2RJ1–20 provide subscriber line control such as dial tone, busy tone and coin box control. The subscriber's line loop is extended via multiplex highway P to common logic 2CC from the access circuitry 2MM for analysis and storage of the dialed digits. Provision is made for a path for the senders 2MS to transmit routing information to the markers of line groups 1LG1–5 and for party identification.

The local junctors 2RJ1–20, consisting of relay circuitry, are provided on an individual basis, depending on the amount of traffic. A fully equipped register-sender group has 20 local junctors and thus handles 20 simultaneous calls. Each local junctor is permanently assigned a storage area in ferrite memory 2M.

The distributor 2D provides timing pulses for the register-sender group. A large portion of the register-sender group circuitry (common control 2CC, memory 2M, read register 2MR and sender register 2MS) is time divided to utilize the basic advantage of speed, provided by the use of electronic circuits. The distributor provides these timing pulses, as well as the pulses to multiplex the access to these circuits.

The register-sender cycle time is 8 msec. thus allowing, 8 msec. divided by 20 junctors, 400 microsec. for the common control to service each local junctor. The choice of 8 msec. for the system cycle time is somewhat arbitrary, but can be considered as a compromise between the speed of the standard circuits, the write-read cycle of the memory, and the holding time of the system markers.

Access circuit 2MM provides a means of signalling between common control 2CC and the local junctors, and allows the line group marker access to the register-sender group, for sending the line number identification (LNI).

The ferrite memory 2M is a sequential access, word orientated, temporary storage unit. The memory size is 120 words at 36 bits per word. Each local junctor is assigned, in time sequence, six words for storage of dialed and switching digits, along with logical control information, sequence states, counters etc. The information to be placed in the memory is provided by the common control 2CC, in binary coded decimal form.

The read register 2ML is a buffer storage for the memory readout. The read register by temporarily storing the contents of a memory row provides a means for this information to be transferred to other circuits. Information flows to sender register 2MS, transfer register 2MT and the common control 2CC.

The common control 2CC is a group of circuits which provide the various timing and supervisory controls necessary in the logical operation of the register-sender group. These circuits are time divided and provide the following digital processing services: (1) sequence states, (2) pulse recognition, (3) pulse counting, (4) digit analysis, (5) memory arrangement, (6) time out counters, (7) decision circuits.

On request of the common control, allotter 2A connects one of sender 2S1–5 to a specific register junctor. The identity of the junctor is provided by the common control. The connection established by the allotter is the beginning of the terminating switch train, which is extended by the system switching stages on instructions sent by the sender. The allotter is not time divided and like the transfer register services junctors in a sequential manner.

Register-sender matrix 2MX is a relay matrix and the means by which allotter 2A establishes a connection between the senders and junctors. The matrix size is a function of the number of junctors and senders implemented in the register-sender group.

Sender register 2MS provides to the senders the appropriate switching and, if necessary, dialed digits for the proper routing of the subscriber's call. These digits are obtained by the sender register from the memory read out, read register 2MR, under guidance from the common control. The common control instructs the sender register as to the number and sequence of digits required from memory by the sender. The sender register is time divided and thus available to service all junctors during a system cycle.

Transfer register 2TR provides the register-sender group with the ability to communicate with the system translators (FIG. 3), line group markers (FIG. 1), and ticketer 201. The signalling arrangement employed uses high speed, electronic, serial transfer of information. Transfer shift register 2MT is accessed in either a parallel or serial manner. Information from memory storage is accepted in parallel from the read register, and as mentioned above serial transfer is used when communicating with equipment external to the register-sender group.

The transfer register is not time divided, thus its services are allotted to the register junctors sequentially by the common control.

Senders 2S1–5 inform the system switching markers as to the proper routing of the call by extending to the markers, switching digits obtained from the sender register. The switching markers return to the senders information as to the progress encountered in routing the switch path. Thus the senders request digits from the sender register when the switching stages or trunks indicate that further digits are needed to route the call. The sender's circuitry allows it to code pulse digits within the system and dial pulse or multifrequency pulse digits over trunks on leaving the office.

Originating register-sender group 200 is in an idle state until a request for service is received from one of five line group markers 1LG1–5. When a request for service is received it indicates a marker has established a path from a calling subscriber to one of the twenty register junctors 2RJ1–20, via the originating junctor.

By viewing the outputs of the access circuitry 2MM, the common control 2CC determines which of the five markers is requesting service and which register junctor the marker has seized for extension of the subscriber's line loop. The allocation of junctors to markers is based on a strapped grading plan IDF, dependent on the size of the office. Knowing which junctor has been seized, common control 2CC requests the service of transfer register 2TR, and informs the marker to send the LNI via its "by path" to the transfer register. The LNI then is placed in memory storage in an area allotted to the seized junctor. Two additional digits are sent along with the LNI to the register-sender group. These digits indicate the class of service of the calling subscriber, and are analyzed to determine the type of service available to the subscriber.

The common control informs the register junctor that LNI has been received and whether the call is from a coin box, from the class of service digits. The register junctor, knowing the LNI has been received, allows the marker to release and service other subscribers. At this time the register junctor extends the subscriber's line loop (P) to common control 2CC and returns dial tone to the calling subscriber, assuming coin deposit on coin box calls. Upon the appearance of the first dial pulse on the line loop the register junctor removes dial tone. The first and subsequent line changes are accumulated and stored in ferrite memory 2M, by common control 2CC in an area allotted for digit storage.

The system requirements for the register-sender group, such as early outpulsing, universal numbering plans, multiple office codes, ticketing access codes, etc., necessitate an intimate knowledge of the subscriber's dialing pattern. Thus, as the dial digits are accumulated in the memory they are being constantly viewed and analyzed by common control 2CC. When the common control decides that sufficient digits have been received for a translation, it once more requests the services of transfer register 2TR. The transfer register receives, in parallel, the necessary dialed digits from read register 2MR. Aside from the dialed digits, transfer register 2TR receives an address digit, from common control 2CC, indicating the proper drum for the translation.

The necessary dialed digits are transmitted to the selected translator serially by transfer register 2TR. Translator 300, upon receiving the dialed digits, interrogates its memory for the appropriate switching digits. These switching digits, along with several "sender instruction" digits are then sent serially to transfer register 2TR. The transfer register informs common control 2CC when the switching digits have been received from translator 300. Common control 2CC then places these digits in a memory storage area associated with the seized register junctor.

The sender instruction digits, received from translator 300, inform common control 2CC as to the proper routing of the subscriber's call. If the call is to be terminated within the local office, one of the senders 2S1–5 code pulses the switching digits to the switching stages. When leaving the local office via trunks then multifrequency or dial pulse sending is necessary for interworking with existing exchanges. The switching equipment encountered on leaving the local office is dependent on the location of the office. Thus tandem and terminating switching information should be provided to interwork with crossbar, step by step, or other various switching schemes in existence today, as well as future electronic switching equipment. Tedious site engineering of the register-sender group, to cope with local switching plans, is largely eliminated by programming instruction digits in the translators. These digits, previously referred to as the sender instruction digits, accompany the switching digits sent to the register-sender group on a translation. They provide information as to the mode of sending; dial pulse, code pulse, or multifrequency; whether early outpulsing or ticketing is required; the number of dialed digits to be outpulsed; and the number of switching digits to be utilized.

Common control 2CC analyzes the sender-instruction digits to determine if sufficient dialed digits are available to route the subscriber's call. When the call is to be terminated outside the local office it is not necessary for the register-sender group to await the complete dialing pattern before processing the call. This feature, referred to as early outpulsing, minimizes the time required for completion of extended and foreign area calls when interworking with step by step equipment.

When sufficient dialed digits have been received, common control 2CC seizes, when idle, allotter 2A. The allotter accepts from common control 2CC the identity of the seized local junctor. The allotter then connects an idle sender to the seized junctor via register-sender matrix 2MX, and informs common control 2CC of the identity of the sender. The register-sender matrix closure, aside from connecting a junctor to a sender, also establishes a signalling path by which the sender can communicate with the system switching stages.

The sender, on being connected to the seized junctor, requests group selectors 1GS, and informs sender register 2MS to extend two switching digits. The sender register accepts two digits from read register 2MR, under guidance of common control 2CC, and forwards these digits to the sender. The sender then code pulses the two switching digits to the first group selector to allow the call to be switched through that stage of selection. In offices that require further stages of group selection the sender receives from sender register 2MS sufficient digits to switch the call through these stages.

Local terminating calls are switched to a terminating junctor by a group selection stage. The terminating junctor requests a line group marker to switch the call from the terminating junctor to its destination, the called party. The sender receives four switching digits from the sender register to code pulse to the code receiver of the line group marker. On receiving the switching digits from the sender, the line group marker has the necessary information to terminate the call.

When calls are not to be terminated locally but are to be switched via trunks to another office; the sender is connected to a trunk by a group selection stage. The sender then receives and outpulses sufficient digits to the distant office to enable the call to be routed to its destination.

A sender, by code pulsing the appropriate digits, can be connected to special trunks located on the outputs of the first selection stages. These special trunks provide the equipment necessary for certain calls, as toll ticketing, or metered service, by inserting the equipment in the switching path.

The crosspoint system markers, upon the receipt of switching digits from a sender in a register-sender group, return to that sender information as to the progress encountered in establishing the switch path. Thus the sender is informed of any congestions encountered, as all inlets or trunks busy as well as line busy, by the markers. When the marker is successful in routing the call through a switching stage, it returns a "switch through" signal to the sender. The switch through indication has the additional connotation of line idle when the switch path has reached its destination, the called party.

The sender, on receiving either a busy or line idle signal from a marker, informs the common logic, through the sender register, to begin a disconnect cycle. On a busy signal, the sender requests the originating junctor to return busy tone to the calling party. The sender then releases the switch train established to the point of congestion. On a line idle signal, the sender informs the originating junctor to connect the calling party's switch path to the switch path established by the sender to the called party. Battery feed is furnished by the terminating junctor to both the calling and called parties.

The common control 2CC on receiving a disconnect signal from the sender register, releases the sender and starts its disconnect cycle. The common logic informs the seized register junctor to disconnect. The register junctor, on a disconnect signal, assuming a coin box call, provides the appropriate coin box supervision. The register junctor then removes its switch path connection to the originating junctor and returns a "down check" (DC) signal to common control 2CC, indicating that it is now idle. On viewing the register junctor's idle signal common control 2CC then erases the allotted memory storage of that junctor, thus returning the logic to an idle state in preparation for processing another call.

The major duties of the register-sender group are considered to be: (1) recognition, storage, and analysis of the subscriber dialing pattern; (2) obtaining the proper routing digits from the translators and (3) extension of the necessary dialed and switching digits to the switching stages and trunks. The register-sender group, having the ability to communicate with the system switching stages and translators and to receive the subscribers dialing pattern, can accumulate the following information: (*a*) the called party's directory number (from the dialing pattern), (*b*) the called party's, if local, terminal location (from translators), (*c*) the calling party's terminal location (from line group markers), (*d*) the calling party's directory number (from translators), and (*e*) the calling party's class of service (from markers).

CHAPTER 2—SYMBOLISM

Telephone switching systems are required to perform a large number of complex functions. It is necessary to specify these functions and the method of accomplishing them in exacting detail to integrate them into the system. However, it is necessary that a link exists between the required features and the specific means for implementing them in the system. This link is provided in the form of detailed "sequence charts."

Before system sequence charts can be made, a language must be established. Since the charts describe the operation of a specific system, their form is somewhat tailored to the characteristics of that system. It is convenient to refer to locations, logic functions, units of equipment, and other items in abbreviated form. Hence, certain symbols, with some logic connotation, are deemed necessary in the design of the register-sender group. The language, or symbols, chosen to represent certain functions or lead designations are always prefixed by a letter, or a group of letters, in an attempt to indicate their origin.

With the exception of four units of equipment (allotter, distributor, sender, and test circuitry), all the equipment and circuitry in the register-sender group is prefixed with an M. This prefix denotes any circuit associated with the register-sender memory, but has been extended to include any of the common logic circuitry or equipment controlled by common control 2CC. Hence, but for the exceptions noted above, all the circuits in the register-sender group are prefixed with an M.

Following the prefix M is a second letter used to denote the circuit in question. For example, the carry register (located in common control 2CC) has a two-letter prefix of MC, the C denoting carry register; the read register 2MR has a two-letter prefix of MR, the R denoting read register; the write commands have a two-letter prefix of MW, the W to denote write. Several of the circuits have a prefix of three letters. These circuits, in general, are parts of some larger circuit; for example, MWJ and MWK are parts of the write commands. Hence, the MW signifies write command; whereas the J or K denotes the particular portion of the write commands.

In total, including test features, there are some nineteen different prefix designations employed in the register-sender group, as shown in Table I.

Table I

| Circuit: | Symbol |
|---|---|
| Allotter | A |
| Distributor | D |
| Carry register | MC |
| Coin-box register | MCB |
| Hold register | MH |
| Memory indicator | MI |
| Miscellaneous logic | ML |
| Local register digit identification | MLZ |
| Lead multiplexing | MM |
| Marker to register-sender group access | MNI |
| Read register | MR |
| Sender register | MS |
| Transfer register | MT |
| Memory write commands | MW |
| Common quantities | MWJ |
| Sender sequence states | MWK |
| Write command test | MWT |
| Sender | S |
| Test circuitry | T |

List of symbols.—The following is a complete list of all functions, leads, logic commands, and units of equipment contained in the register-sender group.

A—Allotter:

(1) AA—Command indicating that the allotter is available.

(2) AT—Command indicating trouble in the allotter.

(3) ASA1, ASA2, ASA3—Three leads indicating the chosen senders identity to the common control.

(4) APR1 to APR20 inclusive and APS1 to APS5 inclusive—The "pull" leads from the allotter to the register-sender matrix.

D—Distributor:

(1) DR1 through DR20—Local register-junctor's time slots.

(2) DUA through DUG—Memory rows time slots within the local register-junctor's time slots.

(3) DIA through DIG—Intervals within memory rows time slots.

(4) CPA and CPB—Pulses used to generate distributor functions and to provide timing for logical operations.

(5) DIGA—The suffix A denoting a delay in interval DIG of one half of an interval width.

MC—Carry register:

(1) MCADD—Flip-flop used to add one to the counters in rows DUC and DUD.

(2) MCD—Flip-flop indicating that a translation has been requested.

(3) MCE—Flip-flop used to erase a register's memory.

(4) MCF—Flip-flop indicating an interdigital pause.

(5) MCFTO—Flip-flop indicating a fast time out to the counters.

(6) MCO1, MCO2, MCO4—Three binary weighted flip-flops used to transfer the address of a local office.

(7) MCRDC—Flip-flop indicating that a register junctor wishes to disconnect.

(8) MCSDC—Flip-flop indicating that a sender wishes to disconnect.

(9) MCTOA—Flip-flop indicating that the counter in DUA has timed out.

(10) MCTS—Flip-flop indicating trouble in the sender.

(11) MCW1—Flip-flop indicating that the first two digits of the station number are placed in memory storage.

(12) MCW2—Flip-flop indicating that the subscriber has finished dialing.

(13) MCXIN—Flip-flop indicating an X instruction in DUA.

(14) MCX2, MCX4, MCX8—Three binary weighted flip-flops used to transfer the X instructions.

(15) MC24—Flip flop indicating which register junctor is working with the MT register.

MCB—Coin box register:

MCB1 through MCB20—Twenty signal leads to the local junctors indicating a coin box call.

MH—Hold register:

Twenty hold leads to the local junctors.

MI—Memory indicator:

A circuit used as a visual display of the information contained in the various registers of the register-sender group.

ML—Miscellaneous logic:

(1) ML (A+B)—Logic command indicating that an originating line group marker is attempting to seize a junctor register.

(2) MLADD—Logic command indicating the recognition of one of the pulses in a dialed digit.

(3) MLBN-7—Logic command indicating that seven digits have been dialed.

(4) MLC1—Eight millisecond pulse with a 300 millisecond repetition rate.

(5) MLC2—Eight millisecond pulse with a 1.2 second repetition rate.

(6) MLDR-3—Logic command indicating that three digits have been dialed.

(7) MLE—Logic command indicating erase all the presently stored in a junctor register's memory, see Chapter 9.

(8) MLF—Logic command indicating an interdigital pause in the dialed digits.

(9) MLFUT—Lead, that when true, indicating that the future numbering plan is in use.

(10) MLGO—Lead simulating the release command from a trouble recorder.

(11) MLP—The synchronized multiplexed "P" highway.

(12) MLTOA—Logic command indicating that the counter in row DUA has timed out.

(13) MLTOB—Logic command indicating that the counter in row DUB has timed out.

(14) MLVX—Logic command indicating that the junctor register is in some disconnect state.

(15) MLRDA-?—Logic command indicating that the decoded decimal equivalent of position A is equal to ?.

(16) MLRDB-?—Logic command indicating that the decoded decimal equivalent of position B is equal to ?.

(17) MLRDC-?—Logic command indicating that the decoded decimal equivalent of position C is equal to ?.

(18) MLRDD-?A—Logic command indicating that the decoded decimal equivalent of position D for row DUA, only, is equal to ?.

(19) MLRDD-?B—Logic command indicating that the decoded decimal equivalent of position D for row DUB, only is equal to ?.

(20) MLRDG-?—Logic command indicating that the decoded decimal equivalent of position G is equal to ?.

(21) MLRDH-?—Logic command indicating that the decoded decimal equivalent of position H is equal to ?.

(22) MLRDI-?—Logic command indicating that the decoded decimal equivalent of position I is equal to ?.

(23) BL-MRA—Logic command indicating that position A is blank.

(24) BL-MRC—Logic command indicating that position C is blank.

(25) BL-MRD—Logic command indicating that position D is blank.

(26) BL-MRE—Logic command indicating that position E is blank.

(27) BL-MRF—Logic command indicating that position F is blank.

(28) BL-MRG—Logic command indicating that position G is blank.

(29) BL-MRH—Logic command indicating that position H is blank.

(30) BL-MRI—Logic command indicating that position I is blank.

(31) BL-MTIN—Logic command indicating that the MTIN flip-flops in the MT register are blank.

(32) BL-MTPA—Logic command indicating that the MTPA flip-flops in the MT register are blank.

(33) RSTRF—Lead from some source indicating a heavy traffic condition.

(34) TRRGO—Lead from trouble recorder to release the register junctor from the trouble recorder state.

MLZ—Local register digit identification:

(1) MLZ1—Logic command indicating that the first dialed digit is a prefix zero.

(2) MLZ2—Logic command indicating that the first dialed digit is a prefix one.

(3) MLZ3—Logic command indicating that the first three dialed digits are a ticketing prefix.

(4) MLZ4—Logic command indicating that the dialed digits are to a local office.

(5) MLZ5—Logic command indicating a special service call.

(6) MLZ6—Logic command indicating a foreign area call.

(7) MLZ7—Logic command indicating an operator call.

(8) MLZ8—Logic command used for the present numbering plan to indicate an extended area call.

(9) MLZ9—Logic command indicating a local, foreign area prefix.

(10) MLZ10—Logic command indicating MLZ3 or MLZ10.

(11) MLZ11—Logic command indicating a revertive call.

(12) MLZ12—Logic command used in the future numbering plan to indicate an extended area call.

(13) MLY1 through MLY5—Five logic commands indicating which local office has been dialed.

MM—Lead multiplexing:

(1) MMP—Multiplexed P highway.

(2) MMDC—Multiplexed "down-check" lead.

(3) MMSA through MMSD—Multiplexed party leads.

MNI—Marker to register-sender group access circuitry:

(1) HWY-1 through HWY-5—Five time divided leads (one per marker) used to seize an idle register junctor.

(2) RJA1 to RJA20 inclusive and RJB1 to RJB20 inclusive—Forty seizure leads per register-sender group from the various markers that are capable of accessing that group.

(3) M1S12 to M5S12—Lead per marker used as the final seizure command. When true, this lead allows one of the forty seizure leads to seize a junctor-register.

MS—Sender register:

(1) MSAD1, MSAD2, MSAD3—Three binary weighted flip-flops used to store the address of a sender.

(2) MSDA1 through MSDA4 and MSDB1 through MSDB4—Two pair of four binary weighted flip-flops used to store two digits to be sent to a sender.

(3) MSDEL—Flip-flop used to delete the digit stored in MSDA1 through MSDA4.

(4) MSDP-S—Flip-flop indicating to a sender that dial-pulse outpulsing is required.

(5) MSDPS-S—Flip-flop to inform the sender to expect a "dial pulse stop" indication.

(6) MSES-S—Flip-flop to inform a sender that end of sending is true.

(7) MSH-RS—Flip-flop to inform a sender that the common logic is starting a disconnect cycle.

(8) MSIN1 through MSIN4—Four binary coded flip-flops indicating the sequence state of the MS register.

(9) MSMF-S—Flip-flop to inform a sender that multi-frequency outpulsing is required.

(10) MSTI-S—Flip-flop to inform a sender to expect the J, T, and I digits.

(11) MSTI-RS—Flip-flop to inform a sender that one of the J, T, and I digits have been stored in the memory.

(12) MSTIC1, MSTIC2, MSTIC3—The flip-flops used to identify the J, T, and I digits.

(13) MSTID-RS—Flip-flop indicating to a sender that a J, T, or I digit has been received.

(14) MSTID1, MSTID2, MSTID3, MSTID4—Four binary coded leads used to transfer the J, T, and I digits to the memory from the MS register.

(15) SA—Flip-flop indicating that a sender is requesting two digits.

(16) SR—Flip-flop indicating that a sender is connected.

(17) CPMS1 through CPMS5—Timing leads to the five senders.

(18) SD1 through SD16—Shorthand notation for MLRDH-1 through MLRDH-15 plus BL-MRH for Row B, see ML logic.

(19) ID1 through ID16—Shorthand notation for MLRDI-1 through MLRDI-15 plus BL-MRI for Row B, see ML logic.

MT—Transfer register:

(1) MTAD1, MTAD2, MTAD3, MTAD4—Four binary weighted flip-flops used to store the address of an originating line group marker or of a translator.

(2) MTC—Flip-flop indicating that the operation of the MT register is complete.

(3) MTGO—Flip-flop indicating a go command has been received from a translator.

(4) MTIN1, MTIN2, MTIN3, MTIN4—Four binary weighted flip-flops used to store the X instruction.

(5) MTL—Flip-flop indicating that the MT register has received information from the memory.

(6) MTPO1, MTPO2, MTPO3, MTPO4, MTPA1, MTPA2, MTPA3, MTPA4, MTPB1, etc., through MTPI4 plus MTPX1 and MTPX2—Forty-two flip-flops arranged as a serial shift register.

(7) MTR—Flip-flop indicating that the MT register is in the receive state.

(8) MTRC—Flip-flop indicating that the shift register has received information.

(9) MTS—Flip-flop indicating the MT register is in the send state.

(10) MTT—Flip-flop indicating trouble in the MT register.

(11) GO1-A, GO1-B, GO2-A, etc., to GO4-B—Four paired leads from the translators to indicate state of transmission from the MT register to a translator.

(12) TC-1A, TC-1B, TC-2A, etc., to TC-4B—Four paired leads used as call signals to the translators.

(13) TO-OLGM1, TO-OLGM2, etc., to TO-OLGM5 inclusive—Go commands to the five markers.

MW—Memory write commands:

MWA1, MWA2, MWA3, MWA4, MWB1, etc., to MW14, inclusive—The total write commands for all 36 memory bits, exclusive of the test features.

MWJ—Memory write commands common quantities:

Circuit used to generate the common quantities for the write commands. The outputs of this circuit are designated as J-X.

MWK—Sender sequence states write commands:

Circuit used to generate the sender-sequence-state write commands.

MWT—Memory write commands test circuit:

MWTA1, MWTA2, MWTA3, MWTA4, MWTB1, etc., to MWTI4, inclusive—The final write commands to all 36 memory bits including the test features.

S—Sender:

(1) S1A to S5A, inclusive—Lead per sender indicating, when true, that the sender is requesting two digits.

(2) S1R to S5R, inclusive—Lead per sender indicating, when true, that the sender is disconnecting.

(3) S1TID1 to S5TID1, inclusive; S1TID2 to S5TID2, inclusive; S1TID3 to S5TID3, inclusive; S1TID4 to S5TID4, inclusive—Four leads per sender over which the J, T, and I digits are available from each sender.

T—Test circuit:

(1) TMTRS—Push button used to manually clear all registers in a register-sender group.

(2) TTO—Logic command used to write the information contained on the test panel switches into the memory whenever the test circuitry is in the "memory test" state.

(3) TWR—Logic command that, when true, forces the common logic to continually rewrite when the test circuitry is in the memory test state.

CHAPTER 3—MEMORY ARRANGEMENT

Ferrite memory 2M in register-sender group 200 has a capacity of 4320 bits. It is divided into 120 words of 36 bits per word. Each local junctor is allotted 6 words, in time sequence, for storage of information relating to the call being processed by that junctor.

The divisions and factors affecting the memory arrangement, along with the detailed listing of the individual bits explaining their relationship to the system, comprise the main topics of this chapter.

3.1 *Storage requirements*

To provide for storage of the dialed digits, line number identification, class of service, switching digits from the translator, sequence states, counters, timers, special features, and allowance for future expansion; it becomes apparent that a rather large amount of storage is required in the ferrite core memory. One way in which the amount of storage per junctor could be reduced would be to provide a separate, random access, storage area for the sender's memory word. However, the amount of storage per junctor would still be more than is convenient for a ferrite core memory word.

A solution to the large storage required per junctor lies in providing several words of smaller bit capacity in time sequence. This has the effect of "folding" a large word into several smaller words or rows. If the junctor's memory word is folded several advantages are obtained. An increase in the number of words allotted to a junctor does not appreciably increase the amount of memory circuitry. This allows a sender word to be stored per junctor; eliminating any random access requirements while providing for future expansion in the number of senders employed in the register-sender group. Storage can be made available for the line number identification of the calling subscriber, thus providing a centralized storage area for ticketing. Decoding logic can be more efficiently used by the ability to analyze several digits during a junctor's time allotment, assuming the digits to be situated in the same location but in different words or rows. Reducing the length of a memory word, while increasing the number of words, allows a more efficient use of the memory drive and sense circuitry.

3.2 *Logical divisions*

Ferrite-core memory 2M is a ferrite-core matrix with the necessary amplifiers. The ferrite-core array has 36 columns and 120 rows. Six rows are allocated for each register storage area. Switching digits and calling subscriber's line terminal identity digits are stored on a per junctor basis. Six memory words, each of 36 bit capacity, are provided per junctor for storage. Since the register-sender group has 20 junctors the memory size becomes 4320 bits. The first memory word appearing during a junctor's time slot being the register control word. Each junctor word provides the following storage:

*Rows DUA and DUG.*—The register control word stores information pertaining to the local junctor logis as; sequence states, pulse recognition, interdigital timing, along with translator and trouble recorder instructions.

*Row DUB.*—The sender control word stores information pertaining to the allotted sender as; sequence states, time out controls, sender identity digits and sender instruction digits.

*Rows DUC and DUD.*—These rows store the subscribers dialed digits. Because of the amount of storage required for the various dialing patterns, the station number, last four dialed digits, is separated from the office and area codes. Thus row DUC stores the office and area codes, while row DUD stores the station number of the called party.

*Row DUE.*—This row stores the LNI of the calling party, received from the line group markers. If a translation is required for the calling party's directory number (LNT) then the LNI is erased to allow room for the LNT. Storage for both LNI and LNT is not necessary.

*Row DUF.*—This row stores the switching digits obtained from the translators.

3.3 *Bit arrangement*

One of the difficulties in designing logic, with a multi-word storage, is in nomenclature. Thus, some method is required to easily identify each of the 216 bits, associated with a local junctor. If the rows are named alphabetically as DUA, DUB, DUC, DUD, DUE, and DUF and the bits within a row are numerically designated 1 through 36, then each bit has a unique designation. Thus, for example, DUB–24 indicates the 24th bit of row DUB.

When dealing with rows DUC, DUD, DUE, and DUF; the memory is usually storing digits, encoded in a binary decimal form. The numbering of bits within a row from 1 to 36 does not lend to discussion of storage on a digit basis, thus a grouping of bits within a row could clarify explanations. If the bits within a row are divided into groups of four and the groups called positions, then a position can signify a digit location. FIG. 4 then illustrates the final bit arrangement of the junctor's memory word, which shows the information contained in each register storage area.

3.4 *Detailed bit identification*

The following is a brief description of the memory's contents, and can be correlated with the chart given in FIG. 4.

I. Row DUA:

Pos. A (1–4) A count of sixteen used to:

(a) Time the delay before the appearance of the subscriber highway in the register.

(b) Time the appearance of the first subscriber dial pulse in the local junctor.

(c) Time the interdigital pause, and off-hook condition after pulsing begins.

(d) Time the on hook condition after pulsing begins.

(e) Time the register junctor relay release on a disconnect cycle.

Pos. B (1–2) Mode of count for the counter in position A, mode changes cyclically i.e., M0 and M1 and M2 M0.

(a) Mode 0 (00) causes counter to count at 8 msec. rate.
(b) Mode 1 (10) causes counter to count at 300 msec. rate.
(c) Mode 2 (01) or (11) causes counter to count at 1 sec. rate.

(3) Spare bit.

(4) P stores condition of subscriber's line loop during previous appearance of subscriber's time slot.

Pos. C (1–3) Rx: Register sequence states:

R1 (100) Designates idle register.
R2 (010) Working with the line group marker; receiving information (LNI) via transfer register from line group marker by-path highway.
R3 (110) Have received LNI.
R4 (001) Subscriber has started to dial.
R5 (101) Subscriber has finished dialing and all digits are stored properly.

(4) Spare Bit.

Pos. D. (1–2) Vx: Register-sender disconnect states.

V1 (100) Either the subscriber register or the sender has requested a disconnect but not both.
V2 (010) Both the subscriber's register and the sender have requested a disconnect. The normal sequence will cause disconnect of the register-sender and a return to the idle condition (R1) will follow.
V3 (110) Trouble with the register junctor relays, subscriber's register electronic controls and processing equipment, or with the sender. Request is made for the trouble recorder.

(3) FT: Fast time out used when the subscriber dials the digit 0 used for interdigital timeout.

(4) TRR: Trouble with register junctor relays.

Pos. E (1) W1: Two more digits will be received from subscriber. This is used as a guard when early outpulsing to the sender.

(2) W2: Last two digits have been dialed and are properly stored.

(3) SDC: The sender wishes to disconnect.

(4) RDC: The subscriber's register wishes to disconnect.

Pos. F (1) TR: Trouble in the electronic portion of the subscriber's register.

(2) TS: Trouble in the allotter or sender.

(3) D: Initial request for translation of dialed digits, have X instruction.

(4) 24: This subscriber is working with the transfer register.

Pos. G (1) CB: The call being processed is a coinbox call, pre-pay station.

(2–4) Spare bits.

Pos. H (1–4) X Instruction: The instructions used to route the LNI, LNT, DNT and ticketing digits. The following is a listing of the X instructions:

X=0 (0000) Idle condition
X=1 (1000) Ticketing (3rd access)
X=2 (0100) Line number translation
X=3 (1100) Ticketing (2nd access)
X=4 (0010) Directory number translation
X=5 (1010) Call transfer
X=6 (0110) Line number identification
X=7 (1110) Ticketing (1st access)
X=8 (0001) Code translation one digit (0)
X=9 (1001) Alternate route translation
X=10 (0101) Repertory dialing
X=11 (1101) Not used
X=12 (0011) Code translation three digits
X=13 (1011) Spare
X=14 (0111) Code translation six digits
X=15 (1111) Spare Pos. I (1–4) Translator or line group marker address or J digit. During the initial phases of the routing of the call this position contains the LGM or translator address. When the call must be routed out of the exchange this position receives the J trunk identity digit.

A—Address:

(1) (1000) Identification of LGM #1
(2) (0100) Identification of LGM #2
(3) (1100) Identification of LGM #3
(4) (0010) Identification of LGM #4
(5) (1010) Identification of LGM #5
(9) (1001) Identification of Translator #1
(10) (0101) Identification of Translator #2
(11) (1101) Identification of Translator #3
(12) (0011) Identification of Translator #4
(13) (1011) Identification of Translator #5

B—J digit—decoding values have, as yet, not been determined.

II. Row DUB:

Pos. A (1–4) A count of sixteen used to time the operation of the sender.

Pos. B (1–2) Mode of count—used to direct the count interval for the counter in position A.

M0 (00)—8 msec. interval
M1 (10)—300 msec. interval
M2 (01) or (11)—1 sec. interval (3–4) Spare bits.

Pos. C (1–4) Sx sender sequence states. Each state is associated with the sending of two digits to the sender.

S0 (0000)—Idle condition
S1 (1000)—A, B
S2 (0100)—C, D
S3 (1100)—KP, blank
S4 (0010)—H, T
S5 (1010)—U, P
S6 (0110)—A, N'
S7 (1110)—N'', A
S8 (0001)—N1, N2
S9 (1001)—N3, N4
S10 (0101)—N5, N6
S11 (1101)—ST, Blank
S12 (0011)—EOP (Early out pulsing)
S13 (1011)—EOP
S14 (0111)—ES (End of send)
S15 (1111)—Not used Pos. D (1–3) Qx Q states used to sequence register-sender allotter.

Q0 (000)—Idle state
Q1 (100)—Request allotter
Q2 (010)—Allotter seized
Q3 (110)—Release allotter
Q4 (001)—Working with sender
Q5 (101)—Sender finished sending
Q6 (011)—Disconnect sender
Q7–Q8—Spare (4) Spare bit.

Pos. E (1–3) Trunk identity digits (JTI) appearance count.

(a) (111)—No digits received
(b) (110)—Have received "J" digit
(c) (100)—Have received "I" digit
(d) (000)—Have received "T" digit (4) Saved for TOB (sender's time out).

Pos. F (1–4) Spare bits.

Pos. G (1–3) The address of the sender (one of five) being used by the register to send switching information.

(4) Spare bit.

Pos. H (1–4) Sender "S" digit (SD), is obtained from the translator and used by the senders as instructions for sending.

(1) (1000)—CP(ABCD), MF(called number), ES
(2) (0100)—CP(ABCD), DPS(called number), ES
(3) (1100)—CP(ABCD), DP(called number), ES, EOP
(4) (0010)—CP(ABCD), CP(H, T, U, P), ES
(5) (1010)—CP(ABCD), MF(HTUP and called number), ES
(6) (0110)—CP(ABCD), DP(HTUP and called number), ES, EOP
(7) (1110)—CP(ABCD), DPS(HTUP and called E), ES
(8) (0001)—Sending instructions indicated by I digit
(9) (1001)—TI, CP(ABCD), MF(called number), ES
(10) (0101)—TI, CP(ABCD), DPS(called number), ES
(11) (1101)—TI, CP(ABCD), DP(called number), ES, EOP
(12) (0011)—TI, CP(ABCD), CP(HTUP), ES
(13) (1011)—TI, CP(ABCD), MF(HTUP and called number), ES
(14) (0111)—TI, CP(ABCD), DP(HTUP and called number), ES, EOP
(15) (1111)—TI, CP(ABCD), DP(HTUP and called number), ES
(16) (0000)—Blank Pos. I (1–4) Sender I digit (ID), is obtained from the translator to be used for sender and register control.

(1) (1000)—Delete A
(2) (0100)—Delete A N'
(3) (1100)—Delete A N' N''
(4) (0010)—Delete A N' N'' A
(5) (1010)—Delete A N' N'' A N
(6) (0110)—Delete A N' N'' A N N
(7) (1110)—Delete called number
(8) (0001)—CP(ABCD), ES
(9) (1001)—CP(ABCD), CP(HTUP), CP(NN, NN), EOP
(10) (0101)—Spare
(11) (1101)—CP(ABCD), Ring down, ES
(12) (0011)—Line number translation
(13) (1011)—Unsuccessful line number translation
(14) (0111)—Inhibit charge trunk sequence
(15) (1111)—Spare
(16) (0000)—Blank (idle)

III. Row DUC:

Pos. A(1–4) During the time the subscriber is dialing, previous to a decision, this position contains a count of 16 used to accumulate the pulse count of each digit dialed. After a decision has been made and if a charge trunk is used, this position receives the I digit from the group selector stage.

Pos. B (1–4) Receives the T digit from the group selector stage.

Pos. C (1–4) This position contains the seventh digit dialed if the call is a local call with the present numbering plan; or a local, extended area, or foreign area call with the future all number calling plan. This position would be blank if the call is an extended area or foreign area call with the present numbering plan.

Pos. D (1–4) The sixth digit dialed is placed here if the call is local or foreign area call with the present numbering plan, or a local, or foreign area call with the future all number calling plan. This position would be blank if the call is an extended area call under the present or future numbering plan.

Pos. E (1–4) The fifth digit dialed after all special service and ticketing digits have been deleted will be placed here if the call is a local or foreign area call under the present numbering plan or a local or foreign area call under the future all number calling plan. A blank is placed here for an extended area call under the present or future numbering plan.

Pos. F (1–4) The same as above for the fourth digit.

Pos. G (1–4) This position contains the third digit dialed, after all special service and ticketing digits have been deleted, for all cases both present and future.

Pos. H (1–4) Same as Pos. G (1–4) for the second digit dialed.

Pos. I (1–4) Same as Pos. G (1–4) for the first digit dialed.

IV. Row DUD:

Pos. A (1–4) Contains the same counter as Pos. A (1–4) of row C and contains duplicate information for use in row D.

Pos. B (1–4) Spare position.

Pos. C (1–4) Z digit—contains the coded memory of the special service and ticketing digits received from the calling party. The Z digit is written before the special service or ticketing digits are deleted from Pos. G, H and I of row C and D.

Pos. D (1–4) This position contains the units digit of the called party's directory number.

Pos. E (1–4) This position contains the tens digit of the called party's directory number.

Pos. F (1–4) This position contains the hundreds digit of the called party's directory number.

Pos. G (1–4) This position contains the thousands digit of the called party's directory number.

Pos. H (1–4) This position is blank when all the digits dialed have been stored.

Pos. I (1–4) The first digit, after the special service and ticketing digits have been deleted, is stored here.

V. Row DUE:

Pos. A (1–4) K digit—A class of service digit received from the line marker.

Pos. B (1–4) Y digit—A class of service digit received from the line marker.

Pos. C (1–4) Blank unless a line number translation is made and then this position contains the units digit of the calling party's directory number.

Pos. D (1–4) This position contains the party digit of the calling party unless a line number translation is made, and then it contains the tens digit of the calling party's directory number.

Pos. E (1–4) This position contains the units digit of the calling party's line identification number unless a line number translation is made and then the hundreds digit of the calling party's directory number is stored here.

Pos. F (1–4) This position contains the calling party's line identification number unless a line number translation is made and then the thousands digit of the calling party's directory number is stored here.

Pos. G (1–4) This position contains the hundreds digit of the calling party's line identification number, unless a line number translation is made, and then the last digit of the calling party's directory number office code is stored here.

Pos. H (1–4) This position contains the calling party's marker identity digit unless a line number translation is made and then it contains the second digit of the calling party's directory number office code.

Pos. I (1–4) This position contains the calling party's marker identity digit unless a line number translation is made and then it contains the first digit of the calling party's directory number office code.

VI. Row DUF:

Pos. A (1–4) A count of sixteen with a fixed total time of 300 msec.$\times 15 \approx 4$ sec. Used to time out the transfer register.

Pos. B (1–4) This position contains the party's identification digit of the called subscriber.

Pos. C (1–4) This position contains the units switching digit used to connect the called subscriber.

Pos. D (1–4) The tens switching digit used to connect the called subscriber is placed here.

Pos. E (1–4) The hundreds switching digit used to connect the called subscriber is placed here.

Pos. F (1–4) D—A group selector stage switching digit used to select the called subscriber.

Pos. G (1–4) C—A group selector stage switching digit used to select the called subscriber.

Pos. H (1–4) B—A group selector stage switching digit used to select the called subscriber.

Pos. I (1–4) A—A group selector stage switching digit used to select the called subscriber.

CHAPTER 4—SYSTEM TIMING

System timing is derived from two separate clock pulses generated from a 125 kc. clock circuit in distributor 2D. The clock pulse trains are designated as CPA and CPB. Using CPA and CPB as timing pulses three ring counters connected in tandem, called the distributor, produces the local junctor register's time slot DRX, the units' time slot DUX and the interval's time slot DIX respectively. The distributor outputs DRX and DUX are used to address the junctors and memory rows.

4.1 *General description*

Figure 5:
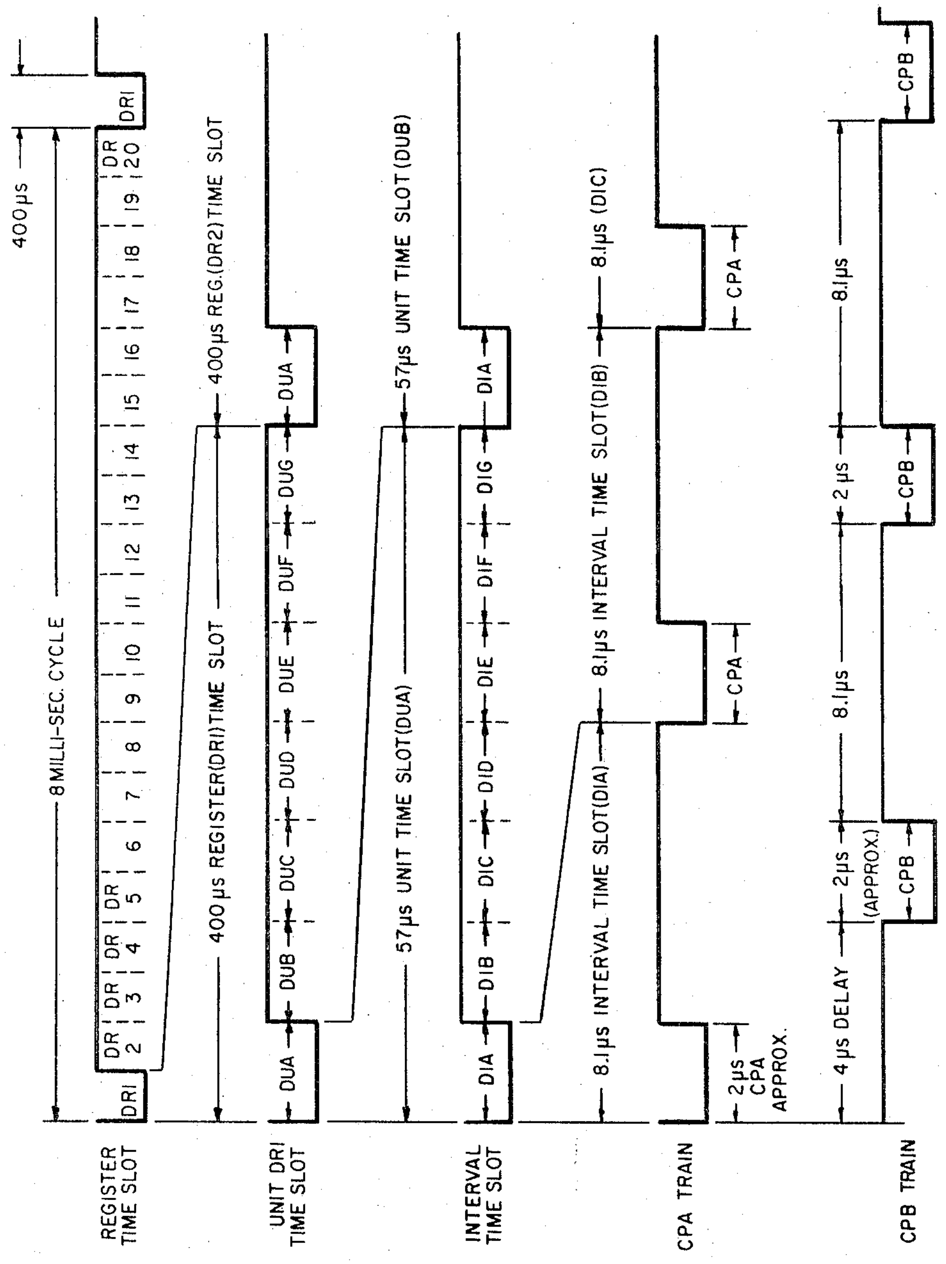
Figure 6:
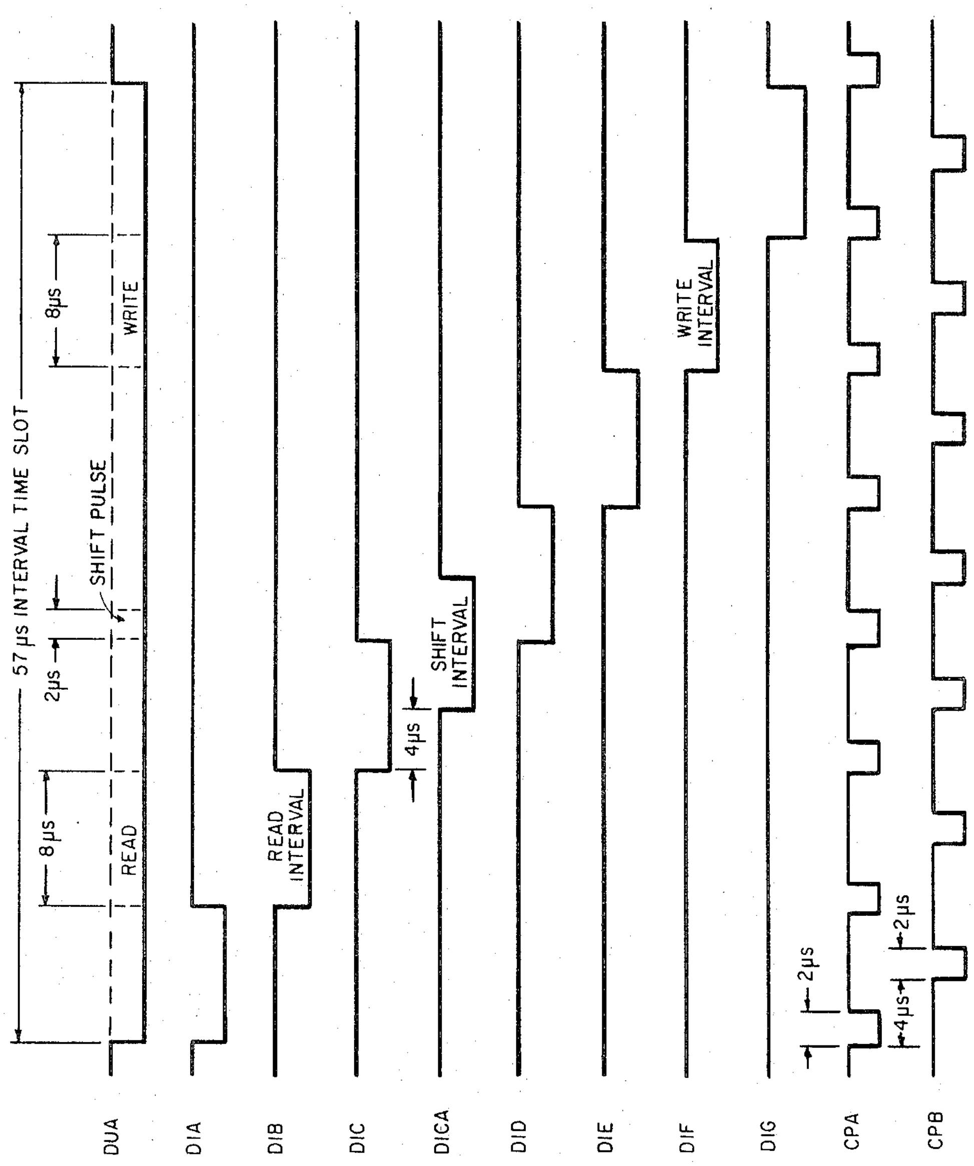

Referring now to FIGS. 5 and 6, the 125 kc. clock circuit is a free running multivibrator producing CPA pulse train and CPB pulse train of approximately eight microsecond duration period and two microsecond pulse width, CPB being delayed from CPA by four microseconds.

The system cycle time is eight milliseconds as seen from the timing chart, FIG. 5. Since there are twenty local junctor registers in a register-sender group, each junctor register (DRX) is assigned a 400 microsecond time slot, 8 millisecond/20=400 microsecond.

Each memory row is assigned a unit time slot (DUX) of approximately 57 microseconds. There are seven unit time slots per junctor register corresponding to the memory rows DUA, DUB, DUC, DUD, DUE, DUF and DUG (400 microseconds/7$\approx$57 microseconds). Normally six memory rows are used to record information as explained in chapter three, Memory Arrangement. The seventh row DUG is the reoccurrence of row DUA, and is needed to pass information between rows as explained in chapter nine, Carry Register.

The unit time slot is further divided into seven interval time slots (DIX) of approximately 8.1 microsecond duration (57 microseconds/7$\approx$8.1 microsecond). The interval time slots are used to generate commands and perform logic for each memory row. Major operations occur in the interval to read out of the memory (DIB), in the interval to shift information (DICA), and in the interval to write into the memory (DIF). In the interval timing explanation, FIG. 5, CPB is delayed by four microseconds from CPA. Each interval is triggered from CPA with the exception of the shift interval (DICA) which is triggered from CPB. This delays the shift interval by four microseconds. The shift interval (DICA) is gated with CPA to obtain a shift pulse of approximately 2 microseconds while the read and write intervals are approximately 8 microseconds' duration. In any unit time slot the logic remains active for a period of time from the read interval to the write interval. With the introduction of the shift pulse the period of activity for the logic is from the shift pulse to the write intervals which is considerably shorter.

Any time period within a cycle can be identified by the designation (DRX) (DUX) (DIX).

4.2 *Distributor*

Figure 7:
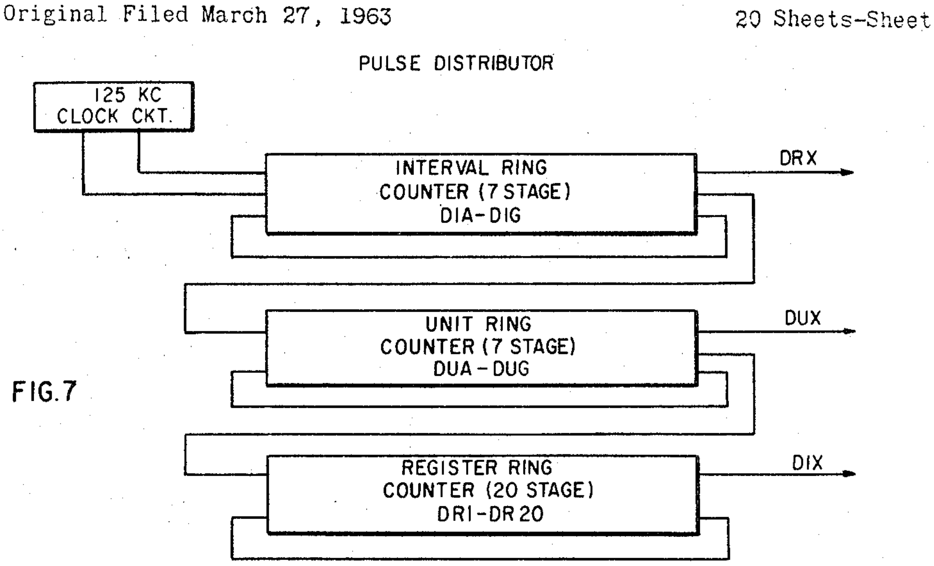
FIGS. 7–8 are symbolic block diagrams of the memory.

The 125 kc. clock circuit provides clock pulses CPA and CPB to distributor 2D (three ring counters which are connected in tandem) as shown in FIG. 7. These ring counters provide the interval time slot (DIX), the unit time slot (DUX), and the register junctor time slot (DRX) respectively. The seven stage interval ring counter produces time slots DIA, DIB, DIC, DID, DIE, DIF, and DIG (approximately 8.1 microsecond duration per slot). The seven stage unit ring counter produces time slots DUA, DUB, DUC, DUD, DUE, DUF, and DUG (approximately 57 microsecond duration per slot). The twenty stage junctor register ring counter produces DR1 through DR20 time slots (400 microseconds per slot). All counters are of the ring type in which the outputs of one stage are connected to the D.-C. set, and the D.-C. reset of the succeeding stages. Also a feedback loop is provided from the output of the last stage to the input of the first stage.

Figure 8:
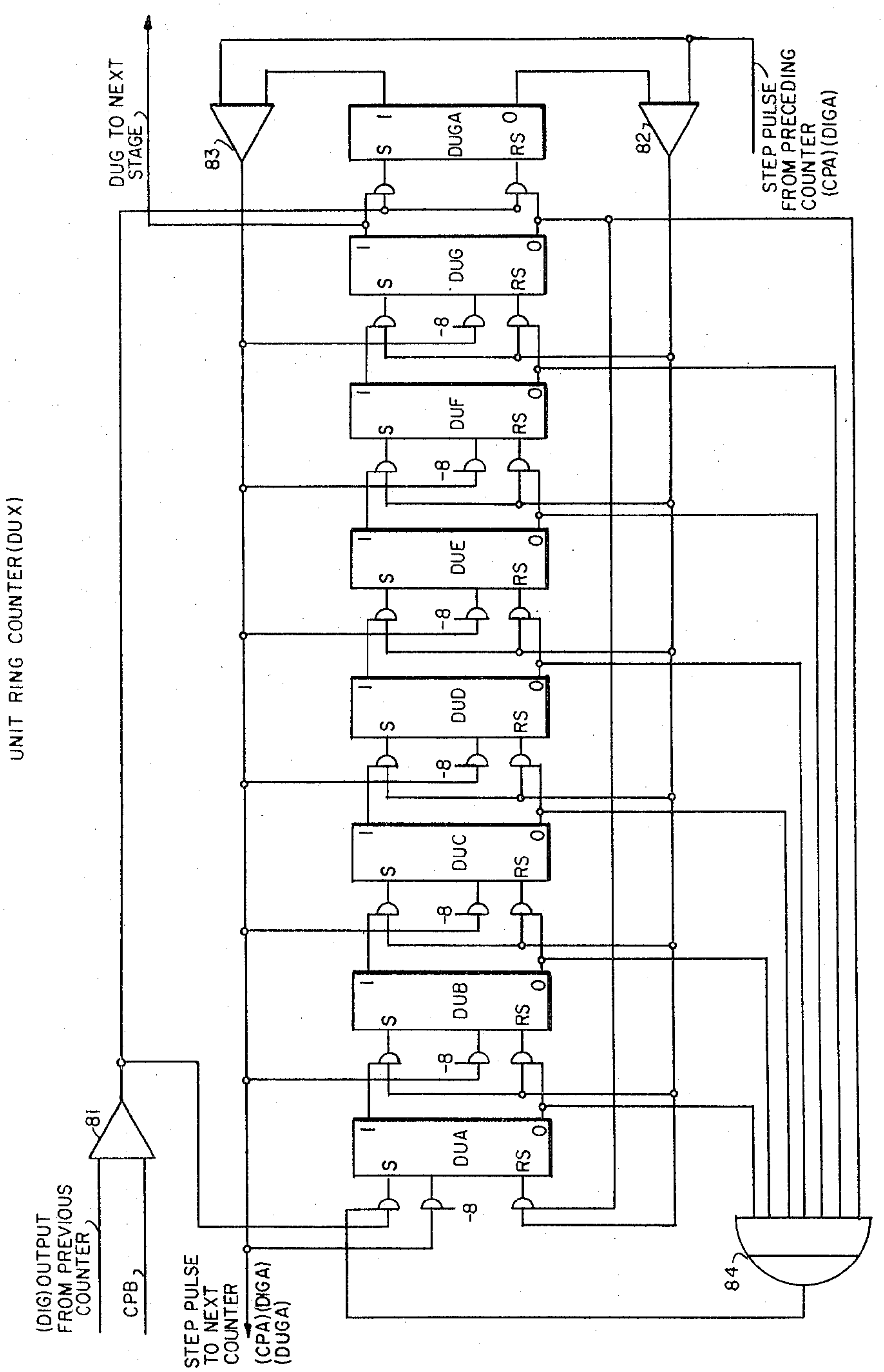

Each of the three counters have a slave flip-flop connected to the last stage in the respective counters. The slave flip-flop, depending on its state, permits information to be shifted through the ring counter or provides a self clear feature while stepping the next counter. This means of operation is shown in FIG. 8 using the unit ring counter as an example. The slave flip-flop DUGA receives the D.-C. set and reset commands from DUG and $\overline{DUG}$ respectively. The A.-C. set and reset pulses are obtained from GPA (1) which has CPB gated with the output from the previous counter (DIG). If the units slave flip-flop (DUGA) is in the "zero" state, then the step pulse from the previous counter (CPA) (DIGA) is gated with $\overline{DUGA}$ in GPA (2) providing the necessary A.-C. set and reset pulses to the units ring counter. The command (CPA) (DIGA) (DUGA) allows the information to be shifted in the counter. If the slave flip-flop is in the "one" state and there is a step pulse from the previous counter (CPA) (DIGA), gated pulse amplifier (3) will allow clock pulses to reset stages DUB, DUC, DUD, DUE, DUF, DUG and will set stage DUA. (CPA) (DIGA) (DUGA) is the clear command for the unit counter, and is also the stepping clock pulse to the next counter (DRX).

When power is applied if all stages of any ring counter are in the "zero" state, a command is provided to place the first stage of the respective counter in a "one" state. This command provided by multi-input nor gate 84 in FIG. 8 for the unit counter is ($\overline{DUA}$ $\overline{DUB}$ $\overline{DUC}$ $\overline{DUD}$ $\overline{DUE}$ $\overline{DUF}$ $\overline{DUG}$). For the interval counter (DIX) the command is ($\overline{DIA}$ $\overline{DIB}$ $\overline{DIC}$ $\overline{DID}$ $\overline{DIE}$ $\overline{DIF}$ $\overline{DIG}$). The command for the register junctor counter (DRX) is ($\overline{DR1}$ $\overline{DR2}$ . . . $\overline{DR19}$ $\overline{DR20}$).

CHAPTER 5—REGISTER-SENDER SEQUENCE STATES

In any system where the operation is sequential, it is convenient for logical operations to designate each sequence as a state. It is then possible to describe the operation of the system as a function of these sequence states. This chapter explains: (*a*) the register and disconnect sequence states, (*b*) the sender Q states, and (*c*) the sender sequence states.

5.1 *Register and disconnect sequence states*

Referring now to FIG. 9A and Tables 5–1 and 5–1*a*, the register and disconnect sequence states are stored in the register control word (row DUA) of each junctor register. The register sequence states are stored, in a binary weighted code, in the first three bits in position C. The disconnect sequence states are stored, in a binary weighted code, in the first two bits in position D.

The register junctor can be in any one of eight sequence states which determines what functions are being performed. These eight states are:

R1—Idle.

R2—Marker seizure; receiving the line number identification (LNI) from the originating line group marker (OLGM).

R3—Pre-dialing; analyze the LNI to see if the call has originated from a coin box and inform the local junctor.

R4—Dialing; receive dialed digits, and if necessary, obtain a translation, seize a sender, and outpulse in the cases of early outpulsing.

R5—Dialing complete; obtain a translation of the dialed digits if not previously performed, seize a sender and outpulse for cases that are not early outpulsing.

V1—Predisconnect; the initial disconnect state once the junctor register has sequenced to the dialing state. When the junctor is in R4 or R5, it may have engaged a sender, and decisions to disconnect can be made by either unit. This state is required to check that a disconnect request by one unit is acceptable to the other.

V2—Disconnect; request release of the connection between the originating and local junctors.

V3—Request trouble recorder; trouble in the junctor register or the sender, or because of failure of "down check" to become true in state V2.

The foregoing described the various states and the reason for their existence. The following discussion considers how the transition between these states occur.

The junctor register will sequence from R1 to R2 upon the command (R1) ($\overline{MCE}$). This command becomes true when the line group marker seizes the local junctor as described in chapter 6. The register junctor remains in R2 until the MT register indicates that the LNI has been successfully received, or until a trouble indication arises, as denoted by MRF1. Since the register junctor is no longer in the idle state (R1), a disconnect exist must be provided from each new state the register junctor may assume. For this case, the register junctor will sequence to disconnect state V2 upon the command (R2) (MRF1).

When the LNI is successfully received, as denoted by the command (R2) (MC24)(MTC), the register junctor will sequence from R2 to R3. While in state R3, the register junctor will: (*a*) mark a CB lead if the call is from a coin box, (*b*) mark an H lead if the call is not from a coin box, (*c*) time the arrival of the P highway.

The register junctor sequences from R3 to R4 upon the command (R3) (MLP). The register junctor sequences from R3 to V2 if the P highway was not received in four or twenty seconds (depending upon traffic conditions) and the call was from a coin box (as denoted by MRG1), or if the P highway was not received within 120 milliseconds and the call was not from a coin box.

While in state R4, the register junctor accumulates and stores the subscriber's dialed digits and requests a translation when necessary, seizes a sender and outpulses the translated digits for the case of early outpulsing. The normal sequence from R4 is to state R5 upon the command (R4) [(MCW2)+(MCTOA)]. This command indicates that the subscriber has completed dialing or that the subscriber has been timed out between digits.

If the command MCTOA advanced the sequence state from R4 to R5, the register junctor waits 32 milliseconds for the finished dialing indication (MCW2). This is to distinguish between an operator call or the case where the subscriber takes too much time between dialing digits. If the subscriber dials operator (0) the register junctor allows 4 seconds for the subscriber to dial another digit. After the 4 seconds time, and if no further digits were dialed, MCTOA becomes true and the sequence state advances to R5. The finished dialing command is then artificially forced to become true to distinguish this type of call from the too-long-between-digits case. While in R5, the register junctor performs all the remaining functions required to complete the call.

The command to sequence from either R5 or R5 to V1 is (MCRDC)+(MCSDC); which means that the register junctor or the sender is requesting a disconnect. This pre-disconnect state V1, is used to recognize that either unit wishes a disconnect, and it prevents a complete disconnect until both units concur on the disconnect request. This state also allows the register junctor time to provide ticketing service on a sender disconnect request if the call is a charge call. Thus, ticketing information is available from the register-sender group during sequence state V1. When both units acquiesce the disconnect, and the MT register is not servicing the register junctor, the disconnect state may advance. Hence, the command to sequence from V1 to V2 is (V1) (MCRDC) (MCSDC) (MC24).

State V2 is the normal disconnect state. While in V2, the register junctor removes the mark on the H lead and then times the arrival of the "down check" (MMDC) indication. The register junctor sequences to idle (R1) upon the command (V2) (MMDC) [(MRF1)+(MRF2)]

which means down check is true and there is no trouble in either the register junctor or the sender. The register junctor sequences to V3 for the following reasons:

(a) upon the command (V3)($\overline{\text{MMDC}}$) (MRG1) (4 seconds); which means that the down check is not true for a coin box call after 4 seconds (b) upon the command (V2) ($\overline{\text{MMDC}}$) ($\overline{\text{MRG1}}$) (32 ms.); which means that the down check is not true for a non-coin box call after 32 milliseconds (c) upon the command (V2) (MMDC) [(MRF1)+(MRF2)]

which indicates down check is true but previous trouble has been incurred in the system.

State V3 is the request trouble recorder state and the register junctor remains in this state until released by the trouble recorder. After the trouble recorder has been accessed and the necessary information has been transferred to it, the trouble recorder releases the register junctor by making the lead TRRGO true. Hence, the command to return to idle is (V3) [(TRRGO)+(MLGO)]

where MLGO is a switch, temporarily employed, to release the register junctor from state V3.

5.2 *Sender control*

While the register junctor is processing a call, it is continuously analyzing the digits dialed by a subscriber. At some time, the register junctor must send the dialed digits to the translator via the MT register. The numbering plan in use and the type of call (i.e. local, extended area, or foreign area) in progress, determines when the translation takes place and which dialed digits are to be sent to the translator. The translator returns switching digits to the MT register along with the sender instruction digits (i.e., the S and I digits). The switching digits are then stored in row DUF and the S and I digits are stored in positions H and I respectively of row DUB. The translation may take place while the subscriber is still dialing or not until he is finished dialing.

The fact that a translation has been received is determined in the sender control word, row DUB, by the indication that position H is no longer blank (i.e. BL–MRH). By decoding this position (S digit or SD) it is determined whether early outpulsing is required. If the SD=3, 6, 11, or 14, early outpulsing is required and the sender control word initiates the action to seize a sender by advancing the Q state from Q0 to Q1. In the case of no early outpulsing, a sender is not seized until both a translation has been received ($\overline{\text{BL–MRH}}$) and the subscriber has finished dialing (MCW2).

The action between the register junctor and the sender is controlled by the Q states and the sender sequence states.

5.3 *Sender Q states*

Referring now to FIG. 9B and 5–2, any of the 20 register junctors may access any of the five senders. It is, therefore, necessary to have an intermediate operation whereby the senders are allocated to the register junctors. This allocation is accomplished by allotter 2A (see chapter 11) under the control of the sender Q states. The Q states are stored in the sender control word (row DUB) of each junctor register in the first three bits of position D.

The sender control word can be in any one of seven Q states, which determines what functions are being performed. These seven states are:

Q0–Idle

Q1—Request allotter; this state indicates that the register junctor requires a sender and is requesting an allotter to assign a sender to the register junctor.

Q2—Have allotter; this is a transitory state that allows an extra 8 milliseconds for the matrix connection.

Q3—Disconnect allotter; the allotter should have made the connection between the register junctor and a sender and therefore may be released.

Q4—Working with sender; the normal state of the sender control word during outpulsing.

Q5—Disconnect sender; the sender release state when the sender has completed outpulsing, the sender has been timed out, or if the register junctor requests a disconnect.

Q6—Sender idle; this state is needed since the allotter can assign this same sender to another register junctor while the original register junctor is releasing it. If this state were not present, it would be possible for the same sender to be allotted to one register junctor while the original register junctor was in the process of releasing it, and hence, the connection to the second register junctor would be released. The sender control word will remain in this Q state until the register junctor returns to idle.

When a register junctor is not requesting or working with a sender, the Q state indicates idle—Q0. When the register junctor wishes to seize a sender, as described in section 5.2, the Q state advances from Q0 to Q1 upon the command (Q0)

[(SD=3, 6, 11, 14)+(MCW2)($\overline{\text{BL–MRH}}$)]

This command means that the state is idle and the S digit indicates early outpulsing (regardless of whether the subscriber has finished dialing), or the subscriber has finished dialing and there is an S digit in position H of row DUB.

The state Q1 is request allotter. If another register junctor is not working with the allotter, and there is an idle sender, the allotter available lead-AA is true; hence, the command to advance from Q1 to Q2 is (Q1) (AA). During state Q1, the allotter provides the pull commands to establish the matrix connection between the idle sender and the local junctor.

Q2 is a transitory state used only to provide an extra eight milliseconds for the matrix connection. The command to advance from Q2 to Q3 is simply (Q2).

There are two exits from Q3. The first is to "Working with sender" (Q4) upon the command (Q3) ($\overline{\text{AT}}$) which means there is no trouble in the allotter while in sequence state Q3. This is the normal exit. The second exit from Q3 is to "Disconnect sender" (Q5) upon the command (Q3) (AT) which indicates trouble in the allotter. AT becomes true if the relay did not pull, which prevents the sender from working with the local junctor. If this is the case, the Q states will return to idle via Q6.

When in Q4 the register junctor is working with a sender. The sequence advances to (Q5) Disconnect sender upon the command (Q4) (SR+MLTOB+MCRDC)

This command means that the sender wishes to disconnect ($\overline{\text{SR}}$), or that the sender has been timed out (MLTOB), or that the register junctor wishes to disconnect (MCRDC).

Disconnect state (Q5) releases the relay matrix between the register junctor and sender, and sequences directly to (Q6)—"Sender idle." If this state were not present it would be possible for another register junctor to connect to the sender which is being released and thus be disconnected by the action of Q5—releasing the relay matrix.

5.4 *Sender sequence states*

Referring now to FIG. 10 and Table 5–3, when the register junctor is working with a sender (Q4), the S states are generally used to tell the MS register where to find the digits to be transmitted to the sender. These digits are taken in groups of one or two at a time. The mode of transmission is determined by the value of the S digit in position H of row DUB. There are a total of fourteen S states and these states and their significance are listed below:

S1—take A and B digits from positions I and H in row DUF
S2—take C and D digits from positions G and F in row DUF
S3—create KP (multifrequency-start) digit
S4—take H and T digits from positions E and D in row DUF
S5—take U and P digits from positions C and B in row DUF
S6—take dialed digits A and N′ from positions I and H in row DUC
S7—take dialed digits N″ and A from positions G and F in row DUC
S8—take dialed digits N and N from positions E and D in row DUC
S9—take dialed digits N and N from positions G and F in row DUD
S10—take dialed digits N and N from positions E and D in row DUD
S11—create ST (multifrequency-stop) digit
S12—await first two digits of station number when early outpulsing
S13—await last two digits of station number when early outpulsing
S14—inform the sender to disconnect by setting the ES–S (end of send) flip-flop in the MS register.

The transitions between these sequence states is a function of (a) the present S state.
(b) the value of the S and I digits.
(c) the request from the sender that digits are required. The request for digits is (SA) (SR). The (SA) is the actual request for digits and the (SR) indicates the sender has not disconnected. The S state should not be confused with the S digit. The S state is the sequence state of the sender and is always abbreviated with the letter S followed by a number (e.g. S8 is sequence state 8). The S digit is the sender instruction digit received from the translator at the time of translation. The S digit is abbreviated SD and is always followed with an equal sign (e.g. SD=8 is the S digit equal to 8). The I digit is similar to the S digit and is abbreviated as ID.

The transitions between S states are shown in FIG. 10 and the equations to advance are shown in Table 5–3. It should be remembered, that these transitions take place only while in state Q4. In only one instance can two exit commands be true simultaneously; this case is when some normal exit command is true at the same time that command #1 is true. For this condition, regardless of the normal exit command the sender Q state is forced to sequence from Q4 to Q5 directly. All the exit commands from any sequence state are shown in Table 5–3. By looking at Table 5–1*a*, the exit command number, from any state, is easily determined. The exit command may then be determined by looking for that number in Table 5–1*a* and reading the exit command directly opposite that number. For example, the transition from S8 to S9 takes place when command #17 is true; in this case (S8) (SR) (SA) $\overline{(SD=3,6,11,14)}$. The transition from S9 to S10 also takes place when command #17 is true; in this case (S9) (SR) (SA) $\overline{(SD=3, 6, 11, 14)}$. Hence, when command #17 is true, the S state will advance from S8 to S9 if the present state is S8, or the state will advance from S9 to S10 if the present state is S9. In all cases, when no exit command from a certain state is true, the state will remain unchanged.

To illustrate the operation, the sequence states for two calls will be explained.

Example #1: Local call:

For this case SD=4 and ID=0

From chapter 3, it is seen that for these S and I digits, the sender code pulses the digits A,B,C,D,H,T,U,P and then proceeds to end of send. With reference to FIG. 10 and Tables 5–1*a* and 5–3 the following sequences occur.

| State | Digits Sent | Command | Satisfies |
|---|---|---|---|
| S1 | A,B | (S1) (SA) (SR) | #2 |
| S2 | C,D | (S2) (SA) (SR) (SD=4) | #4 |
| S4 | H,T | (S4) (SA) (SR) | #2 |
| S5 | U,P | (S5) (SA) (SR) (SD=4) | #7 |
| S14 | | (Q4) $\overline{(SR)}$ | #1 |
| Q5 | | (Q5) | |
| Q6 | | MCE | |
| Q0 | | | |

Example #2: MF call:

For this case SD=1 and ID=2

From chapter 3, it is seen that for this S digit, the sender will code pulse the digits A,B,C,D, then multifrequency the called number (i.e. A,N′,N″,A,N,N, N,N,N,N), and then proceed to end of send. However, the ID=2 indicates to delete the A and N′ (first two digits of the called number). With reference to FIG. 10 and Tables 5–1*a* and 5–3, the following sequences occur.

| State | Digits Sent | Command | Satisfies |
|---|---|---|---|
| S1 | A,B | (S1) (SA) (SR) | #2 |
| S2 | C,D | (S2) (SA) (SR) (SD=1) | #5 |
| S3 | KP,Blank | (S3) (SA) (SR) (SD=1) (ID=2) | #26 |
| S7 | N″,A | (S7) (SA) (SR) | #2 |
| S8 | N,N | (S8) (SA) (SR) $\overline{(SD=3,6,11,14)}$ | #17 |
| S9 | N,N | (S9) (SA) (SR) $\overline{(SD=3,6,11,14)}$ | #17 |
| S10 | N,N | (S10) (SA) (SR) (SD=1) | #19 |
| S11 | ST,Blank | (S11) (SA) (SR) | #2 |
| S14 | | (Q4) $\overline{(SR)}$ | #1 |
| Q5 | | Q5 | |
| Q6 | | MCE | |
| Q0 | | | |

TABLE 5–1.—REGISTER AND DISCONNECT SEQUENCE STATES

| From | To | Command |
|---|---|---|
| R1 | R2 | R1 $\overline{MCE}$ |
| R2 | R3 | R2 MC29 MTC |
| R2 | V2 | R2 MRF1 |
| R3 | R4 | R3 MLP |
| R3 | V2 | R3 $\overline{MLP}$ [MRG1 (4+[illegible]0 sec.)+$\overline{MRG1}$ 120 ms.] |
| R4 | R5 | R4 (MCW2+MCTDA) |
| R4 | V2 | MCRDC+MCSPC |
| R5 | V1 | MCRDC+MCSPC |
| V1 | V2 | V1 MCRDC MCSDC $\overline{MC24}$ |
| V2 | V3 | $\overline{MMDC}$ MRG1 4SEC V2 |
| V2 | V3 | $\overline{MRG27}$ 32 ms. $\overline{MMDC}$ V2+V2 MMDC (MRF1+MRF2) |
| V2 | R1 | MMDC V2 $\overline{(MRF1+MRF2)}$ |

TABLE 5–1*a*.—DEFINITIONS

Number: Command

1—$\overline{SR}$+MLTOB+MCRDC
2—SR SA
3—SR SA [(SD=8) (ID=8, 10) +(SD=2, 3, 10, 11) (ID=7)]
4—SR SA [(SD=4, 6, 7, 12, 14, 15) +(SD=8) (ID=9)]
5—SR SA (SD=1, 5, 9, 13)
6—SR SA (SD=2, 3, 10, 11) (ID=0, 1)
7—SR SA [(SD=4, 12) +(SD=6, 7, 14, 15) (ID=7)]
8—SR SA (SD=8) (ID=9)
9—SR SA (SD=5, 6, 7, 13, 14, 15) (ID=0, 1)
10—SR SA (SD=5, 13)

Table 5-1a.—Definitions—Continued

Number: Command—Continued

11—SR SA (SD=1, 9) (ID=0, 1)
12—SR SA (SD=2, 3, 10, 11) (ID=2, 3)
13—SR SA (SD=2, 3, 10, 11) (ID=4, 5)
14—SR SA (SD=2, 3, 10, 11) (ID=6)
15—SR SA (SD=1, 9) (ID=6)
16—SR SA (SD=1, 9) (ID=7)
17—SR SA ($\overline{SD=3, 6, 11, 14}$)
18—SR SA (SD=3, 6, 11, 14)
19—SR SA (SD=1, 5, 9, 13)
20—SR SA [SD=2, 3, 6, 7, 10, 11, 14, 15) +(SD=8) (ID=9)]
21—MCW1
22—MCW2
23—SR SA (SD=5, 6, 7, 13, 14, 15) (ID=2, 3)
24—SR SA (SD=5, 6, 7, 13, 14, 15) (ID=4, 5)
25—SR SA (SD=5, 6, 7, 13, 14, 15) (ID=6)
26—SR SA (SD=1, 9) (ID=2, 3)
27—SR SA (SD=1, 9) (ID=4, 5)
28—SR SA (SD=5, 13) (ID=7)

TABLE 5-2.—SENDER Q STATES

| From | To | Command |
|---|---|---|
| Q0 | Q1 | Q0 [(SD=3,6,11,14)+MCW2 $\overline{BL-MRH}$] |
| Q1 | Q2 | A Q1 |
| Q2 | Q3 | Q2 |
| Q3 | Q4 | Q3 $\overline{AT}$ |
| Q3 | Q5 | Q3 AT |
| Q4 | Q5 | Q4 ($\overline{SR}$+MLTOB+MCRDC) |
| Q5 | Q6 | Q5 |
| Q6 | Q0 | MCE |

TABLE 5-3.—SENDER SEQUENCE STATES

| From | To | Command | From | To | Command |
|---|---|---|---|---|---|
| Q3 | Q4 S1 | Q3 $\overline{AT}$ | Q4 S5 | Q5 | S5 1 |
| Q4 S1 | Q4 S2 | S1 2 | Q4 S6 | Q4 S7 | S6 2 |
| Q4 S1 | Q5 | S1 1 | Q4 S6 | Q5 | S6 1 |
| Q4 S2 | Q4 S3 | S2 5 | Q4 S7 | Q4 S8 | S7 2 |
| Q4 S2 | Q5 | S2 1 | Q4 S7 | Q5 | S7 1 |
| Q4 S2 | Q4 S14 | S2 3 | Q4 S8 | Q4 S9 | S8 17 |
| Q4 S2 | Q4 S4 | S2 4 | Q4 S8 | Q4 S12 | S8 18 |
| Q4 S3 | Q4 S4 | S3 10 | Q4 S8 | Q5 | S8 1 |
| Q4 S3 | Q4 S6 | S3 11 | Q4 S9 | Q4 S10 | S9 17 |
| Q4 S3 | Q4 S7 | S3 26 | Q4 S9 | Q4 S13 | S9 18 |
| Q4 S3 | Q4 S8 | S3 27 | Q4 S9 | Q5 | S9 1 |
| Q4 S3 | Q4 S9 | S3 15 | Q4 S10 | Q4 S11 | S10 19 |
| Q4 S3 | Q5 | S3 15 | Q4 S10 | Q4 S14 | S10 20 |
| Q4 S4 | Q4 S5 | S4 2 | Q4 S10 | Q5 | S10 1 |
| Q4 S4 | Q5 | S4 1 | Q4 S11 | Q4 S14 | S11 2 |
| Q4 S5 | Q4 S6 | S5 9 | Q4 S11 | Q5 | S11 1 |
| Q4 S5 | Q4 S7 | S5 23 | Q4 S12 | Q4 S9 | S12 21 |
| Q4 S5 | Q4 S8 | S5 24 | Q4 S12 | Q5 | S12 1 |
| Q4 S5 | Q4 S9 | S5 25 | Q4 S13 | Q4 S10 | S13 22 |
| Q4 S5 | Q4 S11 | S5 28 | Q4 S13 | Q5 | S13 1 |
| Q4 S5 | Q4 S12 | S5 8 | Q4 S14 | Q5 | S14 1 |
| Q4 S5 | Q4 S14 | S5 7 | | | |

CHAPTER 6.—REGISTER JUNCTOR AND ACCESS CIRCUITRY

Any common controlled equipment must be seized before it may perform its function in the overall system scheme. Upon completion of that function, the equipment must be released so other portions of the system may access it. This chapter describes the entrance and disconnect sequence of operations for the originating register-sender group and the circuits that control these operations.

6.1 *Entrance requirements*

On finding a path to the register junctor, the originating line group marker pulls the crosspoints which connect the subscriber to the junctor. At the same time the crosspoints are pulled, the originating line group marker "marks" the A or B lead to the preseized junctor register. Each register junctor in a register-sender group receives two A and B leads from the originating line group marker. There are twenty-four A and B leads from any originating line group marker and they are designated as MA1 to MA12 and MB1 to MB12.

After marking of the A or B lead, the register junctor sequences out of the idle state (see Chapter 5A). The register junctor then requests the originating line group marker to transmit the line number identification (LNI) of the subscriber. Once LNI is received, the register junctor advances to the next sequence state and analyzes the class of service digit to see if the call is from a coin box.

If the call is from a coin box the following sequence of operations occurs:

(a) The register junctor marks a lead called CB. Each register junctor in a register-sender group has two leads to the local junctors. These two leads are called CB (coin box) and H (hold). The mark on the CB lead occurs in the register junctor's time slot.

(b) The register junctor then awaits an off hook condition on the P (pulse) highway. The register junctor waits four or twenty seconds, depending upon traffic conditions, for the appearance of the P highway before beginning a disconnect cycle.

(c) Upon the appearance of the P highway, the register junctor marks the H (hold) lead to the local junctor. This mark remains on the H lead until the disconnect cycle. After marking the H lead, the junctor register advances to the next sequence state and awaits the first dialed digit. The register junctor once more waits four or twenty seconds, depending upon traffic conditions, before beginning a disconnect cycle.

(d) When the first pulse of the first dialed digit occurs, the register junctor removes the mark on the CB lead.

(e) After removing the CB mark the register junctor continues to accumulate and store the dialed digits.

If the call is not a coin box call the following sequence of operations occurs:

(a) The register junctor marks the H (hold) lead to the local junctor. This mark on the H lead remains until the disconnect cycle.

(b) The register junctor then awaits the appearance of the P highway. If the P highway does not appear within 140 milliseconds a disconnect cycle is initiated.

(c) When the P highway does appear (off hook condition) the register junctor advances to the next sequence state and awaits the first dialed digit. The register junctor waits four or twenty seconds for the first pulse of the first dialed digit.

(d) After the first pulse of the first dialed digit the junctor register continues to register and store the dialed digits.

6.2 *Disconnect requirements*

Once a register junctor or a sender in a register-sender group has been seized and has sequenced out of the idle state, a disconnect sequence must be available so that each may return to the idle state.

Since the senders are not permanently assigned to the register junctors, but are available to any register junctor in the same register-sender group, there must exist some method of communicating between a register junctor and the sender it has seized. This communication is necessary so that a register junctor can inform a sender or a sender can inform a junctor register that either is beginning a disconnect sequence. This communicating link is the MC register (Chapter 9) and the particular flip-flops concerned are MCRDC and MCSDC.

The register control word of the junctor initiates a disconnect cycle under the following conditions:

(a) The register junctor fails to seize the MT register (Chapter 10) within a period of four seconds when it wants to receive or when it is going to transmit information.

(b) Failure of the P highway to appear (off hook condition) in the prescribed amount of time.

(c) Off hook condition between dialed digits is too long (4 or 20 seconds depending on traffic conditions).

(d) On hook condition appears for 140 milliseconds. This is an indication that the subscriber has hung up.

(e) The register junctor is in the finished dialing sequence state and the finished dialing indication, (MCW2) is not true after 32 milliseconds, see Chapter 5.

(f) The sender has disconnected and the register junctor does not have, or is not attempting to seize, the MT register.

(g) There is trouble in the register as indicated by the memory bit MRF1 in the register junctor's control word (DUA).

The sender control word of the junctor initiates a disconnect cycle under the following conditions:

(a) The sender has completed its function by indicating $\overline{SR}$.

(b) The sender has been timed out (20 seconds) by the sender control word (DUB).

(c) There is trouble in the allotter as indicated by flip-flop MCTS in the MC register, see Chapter 9.

(d) Although not provided in this design, an allotter timeout circuit could, and probably should, initiate a register disconnect cycle.

If the call is not a coin box call there are two possible disconnect sequences. The two methods of disconnecting depend on whether the P highway is received by the junctor register.

(a) If the P highway is not received, the register junctor sequences to state V2 after waiting 140 milliseconds.

(b) If the P highway has been received, the register junctor sequence to state V1. The register junctor remains in disconnect state V1 until the sender has also indicated a disconnect. When both MRE3 and MRE4 in the register junctor's control word are true (sender and register disconnect), the junctor register sequences to state V2.

(c) When in the disconnect state V2, the register junctor removes the mark placed on the H lead during the entrance sequence.

(d) There is a DC (down check) lead from each local junctor to each register junctor. Minus 8 volts on the DC lead indicates all relays are in the "released" state or a down check is true. Ground on the DC lead for more than 32 milliseconds during disconnect state V2, is an indication of trouble in the local junctor's relays.

(e) If the junctor's DC lead is minus 8 volts in disconnect state V2, the register junctor's memory storage is erased (by action of MCE in the MC register, Chapter 9) and the junctor register returns to the idle state.

(f) If the DC lead is ground in disconnect state V2 for more than 32 milliseconds, the register junctor indicates trouble with the local junctor's relays by writing in memory bit position MRD4 of the register junctor's control word. The register junctor then proceeds to disconnect state V3 and requests a trouble recorder.

(1) There is a time divided lead per originating register-sender group, viz. TRRGO, which is marked when the trouble recorder has accepted the necessary information from the register junctor. The arrival of the trouble recorder is not timed.

(2) After the information is transferred to the trouble recorder, the register junctor's memory storage is erased (by action of MCE) and the register junctor returns to the idle state.

If the call is a coin box there are also two possible disconnect sequences. The two methods of disconnecting are again dependent upon whether the P highway is received by the register junctor.

(a) If the P highway is not received by the register junctor after marking the CB lead in the entrance sequence and waiting for a period of 4 or 20 seconds, then the register junctor sequences to disconnect state V2.

(b) If the P highway has been received, the register junctor sequences to state V1. The register junctor again remains in disconnect state V1 until the sender has also indicated a disconnect.

(c) When in the disconnect state V2, the register junctor removes the H mark.

(d) While in disconnect state V2, the register junctor times the ground potential on the DC lead with a 4 second time out.

(e) If the DC lead changes to −8 volts within the 4 seconds, the register junctor erases its memory storage (by action of MCE) and proceeds to the idle condition (4 seconds are required to insure the coin is returned).

(f) If the DC lead remains at ground potential for 4 seconds, the register junctor indicates trouble with the local junctor's relays by writing in memory bit position MRD4 of the register junctor's control word.

(g) The register junctor then advances to disconnect state V3 and again marks the H lead and requests a trouble recorder. The H lead is marked to clear the coin flash relays.

(h) The release from the trouble recorder is identical as mentioned above.

6.3 *Coin box and hold circuitry*

The common control must inform the local junctor when LNI has been received, whether the call is from a coin box, and when the register junctor is initiating a disconnect sequence. The CB and H registers provide these functions as well as being the connecting link between the space divisions concept of the local junctors and the time division concept of register junctors.

The local junctors require a continuous signal from the register junctors when the common control is working with them. The maximum time the common control is available to any local junctor is only 400 microseconds out of every 8 milliseconds or one-twentieth of the total time. Hence, the CB and H registers are two 20-bit buffer storage units whose inputs are time divided and whose ouputs are space divided.

The CB register informs the local junctors whenever the call originates from a pre-pay station. A mark on the CB lead indicates coin box supervision is required.

The H register informs the local junctors when the common control is working with them. If the call is not from a coin box, it informs the local junctor that the LNI of the calling subscriber has been received and that the subscribers line loop (P highway) should be extended to the common control. If the call has originated from a coin box, it informs the local junctor that the P highway has been received by the common control. The removal of the mark on the H lead indicates to the local junctor that the common control is disconnecting and waiting for the local junctor to disconnect. If the H lead mark is removed when disconnecting a coin box call and the local junctor fails to disconnect after 4 seconds, as indicated on the DC lead, the mark is placed on the H lead again. This remarking of the H lead is required to stop the coin flashing relays.

The following is a list of the set and reset commands for the CB and H registers:

SET CB–X=(DR–X) (MLRDC–3) (MRG1) ($\overline{MLVX}$) (DUA) (DIG) (CPB)

RESET CB–X=(DR–X) [(MLRDC–1)+(MLRDD–2A)+(MLRDC–4) ($\overline{MLVX}$) (MCADD)] (DUG) (DIG) (CPB)

SET H–X=(DR–X) [(MLRDC–3)($\overline{MRG1}$) ($\overline{MLVX}$) (DUA)+(MLRDC–3) ($\overline{MLVX}$) (MLP) (DUG) +(MLRDD–3A) (MRD4) (MRG1) (DUG)] (DIG) (CPB)

RESET H–X=(DR–X) (MLRDC–1)+(MLRDD–2A) (DUG) (DIG) (CPB)

6.4 *Multiplexing*

The local junctors each extend six leads to the common logic. The six leads include the P (pulse) highway, the DC (down check) lead, and four party identification leads. Since the local junctors are on a space division concept and the common logic is time divided, each of these leads from all the local junctors must be multiplexed onto one cable.

The P highway leads are designated RJP1 through RJP20 to indicate from which local junctor they originate. Each junctor register is assigned a time slot DR1 through DR20. Since each of the local junctors is permanently assigned a storage area in the common control ferrite memory, a register junctor, every P highway lead must be gated with its assigned register junctor's time slot. The assignment is on a sequential numerical basis; thus, RJP1 is gated with DR1 and etc. through RJP20 gated with DR20. The time allocated P highways are then gated together to form one common multiplexed output (MMP).

The four party leads from each of the local junctors are designated RJS1A to RJS20A, RJS1B to RJS20B, RJS1C to RJS20C, and RJS1D to RJS20D inclusive. The number designated from which local junctor the party lead emanates and the A, B, C, or D distinguish which of the four party leads. The party leads are assigned and gated in the same manner as the P highways to form the four multiplexed party leads MMSA, MMSB, MMSC, and MMSD.

The DC leads from the local junctors are designated as RJCD1 through RJDC20 inclusive to indicate from which local junctor they originate. The DC leads are assigned and gated in the same manner as the P highways except that the final output is also gated with DUA. The final multiplexed output is an indication that the local junctor relays are activated, or, in other words, down check is not true.

In viewing signals from a nonsynchronous circuit (as the local junctors) the common control must be assured that a signal level will not change while logical operations are being performed with that signal. Since a signal can be the basis for several logical operations, with different propagation times, if the signal level changes in the vicinity of the write interval it is possible to have an erroneous decision written into memory storage. For this reason the down check signal level is stored on a flip-flop. The P highway indication is also stored on a flip-flop.

The party lead signals are continuously available after the first dialed digit. Since the party digit is never stored until a translation is required, the signal levels on these leads do not change and thus, need not be stored on flip-flops.

CHAPTER 7—NUMBERING PLAN REQUIREMENTS

The universal numbering plan covers all the dialed digits that the originating register-sender group will be expected to receive. The plan is divided into three distinct parts; the National Numbering Plan presently employed, the Ultimate National Numbering Plan referred to an ANC (all number calling), and the Intermediate National Numbering Plan covering the period of time between the present and the future systems. The three plans are similar in the type of calls that will be dialed but differ in the method used to recognize the calls. Only one plan should exist at any time because of the conflicts between various listed numbering plans.

In addition to receiving dialed digits the local register must extract pertinent information from them. The information will then be analyzed and acted upon by the register common logic. The local register digit identification is accomplished by the MLZ commands.

Present numbering plan is the National Numbering Plan as it exists today, having the following definitions:

0—the number zero.

N—any number from 0 to 9.

A—any number from 2 to 9.

B—any number from 1 to 9.

*t*—indication that timing after a certain digit is necessary.

X'—0 or 1.

X''—any number from 0 to 9 when (X'=0) and any number from 0 to 9 except 1 when (X'=1).

0 (prefix)—when a zero is used as a prefix in a call it is considered as a P.P.C.S. call. The term P.P.C.S. means an operator has been requested for assistance since the call can be person to person, collect, credit card, or special handling.

1 (prefix)—the prefix one indicates a station to station call prepaid by the dialing subscriber.

0 or 1 ticketing prefix—common all offices.

11N ticketing prefix—strapped per office.

Special service calls are of two types; A11 and 11N.

The operator call requires a dialed zero digit followed by a timing indications (*t*).

There are three types of local office or extended area seven digit calls:

AAN–NNNN (the normal call)
1–AAN–NNNN (normal call prefixed by 1)
0–AAN–NNNN (normal call prefixed by 0)

On local office calls the 0 or 1 prefix is allowed as a subscriber mistake, not an indication of ticketing. On extended area calls the 0 or 1 prefix will be treated as a home area toll call.

There are six types of home area seven digit toll calls:

AAN–NNNN (normal call)
1–AAN–NNNN (1 ticketing prefix)
0–AAN–NNNN (0 ticketing prefix)
11N–AAN–NNNN (11N ticketing prefix)
11N–1–AAN–NNNN (11N–1 ticketing prefix)
11N–0–AAN–NNNN (11N–0 ticketing prefix)

There are six types of foreign area ten digit toll calls:

AX'X''–AAN–NNNN
1–AX'X''–AAN–NNNN
0–AX'X''–AAN–NNNN
11N–AX'X''–AAN–NNNN
11N–1–AX'X''–AAN–NNNN
11N–0–AX'X''–AAN–NNNN

The intermediate number plan is the same as the present number plan except that all local office codes ending in zero will be used as area codes.

The future numbering plan will have office codes in the form ANN–$NNNN_t$ and area codes in the form ANN–ANN–$N_t$NNN. The only way to distinguish an office code from an area code is by timing after the seventh digit. It should be noted that there are 18 types of calls in the intermediate and future numbering systems. The calls are the same type as listed under the present numbering plan.

The problem of digit identification is in the arrangement of dialed digits. Aside from operator (0), there are at least three digits in every type of acceptable call, and it is from these digits that the register logic will make decisions. If the three possible prefix codes (0, 1, 11N) are disposed of, all calls will have either three, seven, or ten digits. Once digit arrangement has been achieved, digit recognition can easily follow.

Although the prefix digits are deleted the purpose of the digits is recorded in memory row D position C. This is the space allotted to the Z digit as part of the arrangement of the dialing pattern. Two bits in the memory, MRC1 and MRC2, do the encoding leaving bits MRC3 and MRC4 reserved for future deletions. The following table shows the storage arrangement and the types of deletions that have taken place.

TABLE 7-1

| MRC1 | MRC2 | MRC3 | MRC4 | Operation |
|---|---|---|---|---|
| 1 | 0 | ----- | ----- | have deleted a 0 prefix. |
| 0 | 1 | ----- | ----- | have deleted a 1 or 112 prefix. |
| 1 | 1 | ----- | ----- | have deleted a 0 and 112 prefix. |
| 0 | 0 | ----- | ----- | no deletion. |

The three dialed digits (MLDR3) are read out of the memory into buffer stores MRI, MRH, and MRG, where three decoding matrices transform the digits from binary to decimal form. The digits in the decimal form are then gated to form the twelve MLZ commands from which the local register can identify the dialed digits.

The twelve Z commands are listed in Table 7–2 as follows:

ister, MLZ2 is the command to write MRC1 in time slot DUD, and to delete position (I) of the MR register in time slot DUC and DUD. The equation for MLZ2 is three dialed digits, and decoded decimal one in position (I), and position (H) does not contain a decoded decimal one. (MLDR3) (MLRDI–1) ($\overline{\text{MLRDH–1}}$).

MLZ3 is the Z command for a ticketing prefix. When three dialed digits are in position G, H, and I of the MR register and time slot DUD appears, MLZ3 is the command to write MRC1 and to make MLZ10. The equation for MLZ3 can be stated as three dialed digits, and decoded decimal one in position (I), and decoded decimal one in position (H), and in position (G) there is a decoded strapping function. (MLDR3) (MLRDI–1) (MLRDH–1) (MLRDG–?) [1].

MLZ4 is the Z command for a local office code. There are five local office codes (XP2, XP5, XP6, XP7, XP8); each indicating a different drum. The recognition of the

TABLE 7-2

| "Z" Command | Meaning | Action | When | Where | Equation |
|---|---|---|---|---|---|
| MLZ1 | prefix "0" | write MRC2<br>delete all of MRI | MLDR3<br>MLDR3 | DUD<br>DUC and DUD | (MLRDI-10) (MLDR3) |
| MLZ2 | prefix "1" | write MRC1<br>delete all of MRI | MLDR3<br>MLDR3 | DUD<br>DUC and DUD | (MLRDI-1) ($\overline{\text{MLRDH-1}}$) (MLDR3) |
| MLZ3 | ticketing prefix. | write MRC1<br>make MLZ10 | MLDR3<br>MLDR3 | DUD | (MLRDI-1) (MLRDH-1) (MLRDG-?) (MLDR3) |
| MLZ4 | local office code. | write X=4<br>write address | MLBN7 DUC<br>MLBN7 DUC | MC | (MLY1+MLY2+MLY3+MLY4+MLY5) (MLDR3) |
| MLZ5 | special service. | write Z+12 | MLDR3 DUC | MC | Independents<br>(MLRDL-1) (MLRDH-1) ($\overline{\text{MLZ3}}$)<br>($\overline{\text{MLZ11}}$) +<br>Bell<br>(MLDR3) (MLRDH-1) (MLRDG-1) |
| MLZ6 | foreign | write X=14 | MLBN7 DUC | MC | [($\overline{\text{MLRDI-1}}$) ($\overline{\text{MLRDI-10}}$) ($\overline{\text{BELL}}$)]<br>[(MLRDH-1)+(MLRDH-10)] (MLZ9)<br>(MLDR3) |
| MLZ6 (optional). | foreign area code intermediate. | write X=14 | MLBN7 DUC | MC | [($\overline{\text{MLRDI-1}}$) ($\overline{\text{MLRDI-10}}$) ($\overline{\text{BELL}}$)]<br>[(MLRDH-1)+(MLRDH-10)+<br>(MLRDG-10)] ($\overline{\text{MLZ9}}$) (MLDR3) |
| MLZ7 | operator | write X=8 | DUC | MC | (MLRDI-10) (BL-MRH) (BL-MRG) |
| MLZ8 | extended area code present. | write X=12 | MLDR3 DUC | MC | ($\overline{\text{MLZ1}}$) ($\overline{\text{MLZ2}}$) ($\overline{\text{MLZ3}}$) ($\overline{\text{MLZ4}}$)<br>($\overline{\text{MLZ5}}$) ($\overline{\text{MLZ6}}$) ($\overline{\text{MLZ9}}$)($\overline{\text{MLDR3}}$) |
| MLZ9 | local foreign area code. | make MLZ10 | avail. MLDR3 used MLBN7. | DUC | (MLRDI-?) (MLRDH-?) (MLRDG-?) |
| MLZ10 | ticketing + local foreign area code. | delete all of MRI, MRH, MRG. | MLDR3 | DUC and DUD | (MLZ3+MLZ9) |
| MLZ11 | revertive calling. | write X=12 | MLDR3 DUC | MC | (MLRDI-1) (MLRDH-1) (MLRDG-?) (MLDR3) |
| MLZ12 | extended area code future. | write X=12 | MLBN7 DUC | MC | (MLFUT) (MLBN7) ($\overline{\text{MLZ4}}$) (MCTOA) |

NOTE.—MLRDX–? indicates a strapping function.

The following is an explanation of the Z commands:

MLZ1 is the Z command for a prefix zero. When three dialed digits are in position G, H, and I of the MR register, MLZ1 is the command to write MRC2 in time slot DUD, and to delete position (I) of the MR register in time slot DUC and DUD. The equation for MLZ1 is (MLDR3) (MLRDI–10) which states that there are three dialed digits and a decoded decimal ten in position (I).

Example MLRDI–10:

ML=misc. logic
R=register
D=decode binary to decimal
I=position in MR register
10=decimal equivalent MLZ2 is the Z command for a prefix one. When three dialed digits are in position G, H, and I of the MR register, particular local office is accomplished by commands MLY1, MLY2, MLY3, MLY4, and MLY5, which are developed by five separate strapping fields. Since the local office codes are a function of the equipment location, strapping fields become necessary. When seven digits have been dialed and time slot DUC appears, the command MLZ4 writes X=4 (directory number translation), and writes the address of the particular drum in the MC register. The equation for MLZ4 is three dialed digits, and drum one, or drum two, or drum three, or drum four, or drum five. (MLDR3)

(MLY1+MLY2+MLY3+MLY4+MLY5)

MLZ5 is the Z command for special service. When three digits have been dialed and time slot DUC appears,

[1] MLRDX–? indicates a strapping function.

the command MLZ5 writes Z=12 (three digit code translation) in the MC register. The equation for independents special service is ($\overline{\text{MLZ3}}$), and ($\overline{\text{MLZ11}}$), and decoded decimal one in position (I), and decoded decimal one in position (H), (MLRDI-1) (MLRDH-1) ($\overline{\text{MLZ3}}$) ($\overline{\text{MLZ11}}$). For Bell special service the equation is three dialed digits, and decoded decimal one in position (H), and decoded decimal one in position (G). [(MLDR3) (MLRDH-1) (MLRDG-1)]. The entire special service equation therefore, is $$[(\text{MLRDI-1})\ (\text{MLRDH-1})\ (\overline{\text{MLZ3}})\ (\overline{\text{MLZ11}})] + [(\text{MLDR3})\ (\text{MLRDH-1})\ (\text{MLRDG-1})]$$

MLZ6 is the Z command for foreign area code present number plan. When seven digits have been dialed and time slot DUC appears, MLZ6 is the command to write X=14 (six digit code translation) in the MC register. The equation for MLZ6 is:

$$[\overline{\text{MLRDI-1}})\ (\overline{\text{MLRDI-10}})\ (\overline{\text{BELL SPECIAL SERVICE}})]\ [(\text{MLRDH-1})+(\text{MLRDH-10})]\ (\overline{\text{MLZ9}})\ (\text{MLDR3})$$

MLZ6 (optional) in the Z command for the foreign area code, intermediate numbering plan. The command is very similar to MLZ6 with the exception that a decoded decimal ten in position (G) of the MR register is the option when the intermediate plan is called for. The command for MLZ6 (optional) is:

$$[(\overline{\text{MLRDI-1}})\ (\overline{\text{MLRDI-10}})\ (\overline{\text{BELL}})]\ [(\text{MLRDH-1})+(\text{MLRDH-10})+(\text{MLRDG-10})]\ (\overline{\text{MLZ9}})\ (\text{MLDR3})$$

MLZ7 is the Z command for an operator. When time slot DUC appears MLZ7 is the command to write X=8 (one digit code translation) in the MC register. The equation for command MLZ7 is: position (H) blank, and position (G) blank, and decoded decimal 10 in position (I). (MLRDI-10)(BL-MRH)(BL-MRG).

MLZ8 is the Z command for an extended area code present numbering plan. When three digits have been dialed and DUC appears, MLZ8 is the command to write X=12 (3 digit code translation) in the MC register. The equation for MLZ8 is:

$$(\overline{\text{MLZ1}})(\overline{\text{MLZ2}})(\overline{\text{MLZ3}})(\overline{\text{MLZ4}})(\overline{\text{MLZ5}})(\overline{\text{MLZ6}})(\overline{\text{MLZ9}})(\text{MLDR3})$$

or in effect it is not any of the other possible codes.

MLZ9 is the Z command for "home foreign area code." Its function is to make up command MLZ10 and is available after the third dialed digit and used after the seventh dialed digit in time slot DUC. The equation is: strapping function in position (I), and in position (H), and in position (G).

(MLRDI-?)(MLRDH-?)(MLRDG-?)

MLZ10 is the Z command for the ticketing or local foreign area code. When there digits have been dialed the command MLZ10 will delete all of MRI, MRH, and MRG in the time slots of DUC and DUD. The equation for MLZ10 is: (MLZ3)+(MLZ9).

MLZ11 is the Z command for revertive calling. When three digits have been dialed and DUC appears the command MLZ11 will write X=12 (three digit code translation) in the MC register. The equation for command MLZ11 is: three dialed digits, and decoded decimal one in position (I), and decoded decimal one in position (H), and a strapping function in position (G).

(MLRDI-1) (MLRDH-1) (MLRDG-?) (MLDR-3)

MLZ12 is the Z command for extended area code future numbering plan. When seven digits have been dialed and DUC appears, the command MLZ12 will write X=12 (three digit code translation) in the MC register. The equation for MLZ12 is:

$$(\text{MLFUT})(\text{MLBN7})(\overline{\text{MLZ4}})(\text{MCTOA})$$

where MCTOA indicates timing was employed for recognition of the area code.

The first eleven commands (MLZ1-MLZ11) will be identical for the present numbering plan and for the intermediate numbering plan except that all local codes ending in zero (intermediate plan will be used as area codes). However, when the future numbering plan is considered a few changes will occur in the local office, extended area, and foreign area codes. These changes are listed in Table 7-3, and explained below.

TABLE 7-3

| Code Recognition | Present Numbering Plan | Intermediate Numbering Plan | Future Numbering Plan |
|---|---|---|---|
| Local Office | MLZ4 | MLZ4 | (MLZ4) (MLBN7) (MCTOA) |
| Extended Area | MLZ8 | MLZ8 | MLZ12 |
| Foreign Area | MLZ6 | MLZ6 (optional). | (MLBN7) (MCADD) |

The command MLZ12 which is the extended area code (future) will replace MLZ8 the extended area code present numbering plan. The foreign area code for the present plan MLZ6, and MLZ6 (optional) for the intermediate plan must be changed to (MLBN7)(MCADD) to accommodate the future plan. Also the local office code is changed from MLZ4 (present and intermediate plan) to (MLZ4)(MLBN7)(MCTOA) for the future numbering plan.

CHAPTER 8—MR REGISTER

The register-sender is a time shared, common control device employing a ferrite core memory. It is therefore, necessary to provide temporary storage for information from a memory row with which the common logic may work. This is the first function of read register 2MR, and this is done for each row.

The second function of the MR register is to direct the arrangement of the dialed digits for storage in the memory as they are accumulated in position A of the memory in rows C and D.

8.1 *Description*

The memory employs a folded word per junctor register time slot. Each fold is called a row consisting of 36 bits. Since one row at a time is presented to the common logic, 36 flip-flops are required as a temporary storage area. These 36 flip-flops are divided into nine positions (A through I) with four bits per position. The bits per position are designated MRA1, MRA2, MRA3, and MRA4 for position A, and etc., to MRI1, MRI2, MRI3, and MRI4 for position I.

When the MR register is used as a buffer store for the memory, it receives information in parallel during the "read" interval. The MR register is also connected as a shift register for the transfer of dialed digits from one position in the memory to another. Thus, the MR register has both parallel and serial inputs.

A judicious placement of the dialed digits in rows C and D facilitates: (a) the recognition of types of calls, and (b) the acquisition of digits from the MR register for transmission to other parts of the system. To this end, the office and area codes are stored in row C, and the station number is stored in row D.

Since the operation of the MR register as a memory buffer store is straight forward, i.e., information from the memory is read out and transferred to the MR register in interval DIB, and then cleared in DIG, the preponderance of the remaining discussion will be centered on the accumulation and storage of dialed digits.

TABLE 8-1 SEQUENTIAL ORDER OF DIALED DIGITS FOR ROW C

| DIGIT RECOG. | | | | | | PREFIX AND TYPE OF CALL RECOGNITION | | | |
|---|---|---|---|---|---|---|---|---|---|
| "A" | "B" | "C" | "D" | "E" | "F" | "G" | "H" | "I" | |
| | | | 6 | 5 | 4 | 3 | 2 | 1 | |
| | | BL | BL | BL | BL | BL | BL | "0" | OPERATOR |
| | | BL | BL | BL | BL | 1 | 1 | A | SPECIAL SERVICE |
| | | BL | BL | BL | BL | N | 1 | 1 | SPECIAL SERVICE |
| | | N | N | N | A | X" | X' | A | FOREIGN AREA CALL |
| | | BL | BL | BL | BL | N | N | A | NUMBER GROUP CALL |
| | | BL | BL | BL | BL | N | N | A | EXTENDED AREA CALL |

TABLE 8-2 SEQUENTIAL ORDER OF DIALED DIGITS FOR ROW D

| DIGIT RECOG. | | | | | | | | | |
|---|---|---|---|---|---|---|---|---|---|
| "A" | "B" | "C" | "D" | "E" | "F" | "G" | "H" | "I" | |
| | | | 6 | 5 | 4 | 3 | 2 | 1 | |
| | | BL | BL | BL | BL | BL | BL | "0" | OPERATOR |
| | | BL | BL | BL | BL | BL | BL | N | SPECIAL SERVICE |
| | | BL | BL | BL | BL | BL | BL | 1 | SPECIAL SERVICE |
| | | | N | N | N | N | BL | A | EXTENDED AREA CALL |
| | | | N | N | N | N | BL | A | NUMBER GROUP CALL |
| | | | N | N | N | N | BL | A | FOREIGN AREA CALL |

Tables 8–1 and 8–2 indicate the method whereby dialed digits are shifted in rows C and D. However, before any digits can be shifted, the line loop changes must be counted which represents the dialed digit. Position A of rows C and D temporarily stores the accumulation of the line loop pulses.

Since the rows of a memory word are separated in time, and it is necessary to transfer some information from one row to another, a buffer store called the MC register (see Chapter 9) accomplishes this task. Thus information from row A can be held in time for rows C and D. One application of this is the command MCADD which has its beginning in row A. This is the command that allows the logic to step the count in position A in the memory of rows C and D. It becomes true when there is a line loop change. Thus, a line loop change initiates MCADD, and MCADD in turn advances the count in position A of rows C and D. Another command initiated in row A and used in rows C and D is MCF. This command becomes true when the interdigital pause is recognized. MCF means, therefore, that the count read out in position A of rows C and D is the same as the dialed digit. It may now be removed from position A and shifted to another location in the MR register.

The first digit is always shifted from position A to position G in rows C and D. The first digit, with the exception of an operator call, is shifted to position H when the second digit arrives in position G from position A. This process continues until positions G, H and I are filled. At this time digit recognition takes place; the prefix digits and the home area code (if dialed) are deleted. Digits continue to shift into positions G, H and I until these positions are filled and all prefixes are deleted. At this time positions G and H are deleted in row D only. This happens for every type of call and after the prefixes have been deleted.

If the first dialed digit is a ten, it could mean that it is either a prefix or an operator call. To solve this problem the digit is shifted, as usual, from position A to position G. Once the ten is in position G the logic initiates a four second time out. If another digit appears before four seconds the ten is considered as a prefix and deleted after it shifted to position I. If no digit appears within four seconds, the ten is shifted to position I and the logic recognizes this as an operator call.

Returning now to the point where the MR register had positions G, H and I filled in row C and position I filled in row D; the next digit from position A shifts to position C in row C, and subsequently shift to D, E, and finally to position F every eight milliseconds. However, to shift from one position to another in positions C through F, the next position must be blank. Once the digit has shifted, the position previously occupied will reset to all zeros.

If the type of call requires an area code translation the contents of position D through I in row C is transferred although not all of the positions have digits stored in them. In the case of an extended area call (a three digit translation), a command MCD becomes true after three digits have been dialed excluding the prefix digits. MCD prevents further shifting of digits in row C. Thus, only positions G, H and I have information although positions D through I are sent for a translation. If the call is to a foreign area, MCD does not become true until after seven digits have been dialed. The area code will be in positions G, H, and I; and the office code in positions D, E, and F. Therefore, prohibiting any shifting of digits in row C for an extended area call prevents confusion between a foreign area call and an extended area call.

In row D the operation is somewhat different. After positions G and H have been deleted, position I has a digit and the following digit is shifted from position A to position D and subsequently shift to position G via positions E and F every eight milliseconds. The function of row D is to store the station number in positions D, E, F, and G whether the call be local, extended area, or foreign area. As previously mentioned positions G and H are deleted after any prefixes are deleted in row D. This assures that positions D through G will contain the station number for an area or local call. For a foreign area call this would not be sufficient because of the extra three dialed digits. Therefore, after the logic decides that the call is to a foreign area, and after positions G and H have been deleted, positions E, F, and G are deleted allowing the station number to be stored in positions D through G.

Since the read interval of the memory is DIB, the shift interval is DICA to allow enough time for propagation through the logic before DIF which is the write interval. DICA indicates a 4 μsec. delay of waveform DIC, see system timing (Chapter 4) for further explanation.

In the preceding paragraphs, the discussion showed generally how the digits were shifted both as to location and timing. However, the following will attempt a more explicit discussion of circuit implementation which will then be followed by the shifting equations.

There are two different methods of shifting employed in the MR register. The first method is that a digit does not shift from one position to another until MCF is true meaning the next digit is accumulated in position A. This refers to positions G, H, and I of rows C and D, as shown in FIG. 11A, which is a simplified shifting representation arranged to shift upon the appearance of the next digit. Notice that both the set and reset commands are provided to the next position. At the same time a digit is shifted into position G, the contents of G are transferred to H, and the contents of H are shifted to I.

The second method is that a digit is shifted from one position to another every eight milliseconds. This refers to positions C, D, E, and F of row C and positions D, E, F, and G of row D as shown in FIG. 11B, which is a simplified shifting representation arranged to shift on an eight millisecond basis. When a digit is shifted from one position to another, only the one side of the flip-flop is transferred. This is possible since the next position must be blank for a shift pulse to occur. When the shift occurs, the position from which the digit is shifted resets to a blank. This process continues every eight milliseconds (once a system cycle) until the digit is shifted to position F of row C or to position G of row D. Thus, the next digit shifts from position A to position C, to position D and reset C, and etc. to position E, or row C. The same method is employed in row D except that the shift is from position A to position D and etc., to position G as mentioned previously. Notice that position G takes information from both positions A and F during DUD, but only from position A during DUC. Thus position G employs both methods of shifting, resulting in more complex logic for that position.

8.2 *Equations*

The equations to be presented pertain only to the shifting of digits. Since an entire position (four bits) is transferred in parallel to the next position, the equations for one bit in a position, the equations for one bit in a position applied also to the remaining bits of that position with the appropriate substitution.

As stated earlier, position G receives information from position A for both rows C and D. It receives information from position F only during row D. Therefore, the command to set G on the D.-C. set is:

(1) (DUD) ($\overline{\text{BL–MRI}}$) (BL–MRG) (MRF1)
(2) +(MRA1) (BL–MRI) MCF

The command (1) states that during row D's time slot position G takes information in position F when information is in position I, but not in G and H. This occurs after positions G and H are deleted as mentioned previously or when a foreign area call is true and positions E, F, and G have been deleted.

The command (2) states take the contents of A when no information is stored in position I, and the interdigital pause MCF is true. That is, the digit in position A is the digit dialed.

The A.-C. set command to say "when" is

[(DUC)+(DUD)] (DICA) CPA

That is during interval (DID) and during row C or D the information is transferred into position G upon the occurrence of the A.-C. set command CPB.

The D.-C. reset command for position G is the same as (1) except that (MRF1) is replaced by ($\overline{\text{MRF1}}$), and is the same as (2) except that (MRA1) is replaced by ($\overline{\text{MRA1}}$). The A.-C. reset command is identical to the A.-C. set command for shifting.

The A.-C. set command for position H is (DICA) CPA [(DUC)+(DUD)].(BL–MRI) (MCF)+(MCTOA) MLRDG=10

This says provide the A.-C. set command during interval DICA during row C and D's time slot if there is no information in position I and MCF (interdigital pause) is true or when time out MCTOA is true and position G=10. (MCTOA) (MLRDG–10) provides a shift for an operator call. The D.-C. set command is MRG1. Therefore, the information is taken from position G when the above commands are true.

The A.-C. reset command for position H is identical with that of the A.-C. set command, the D.-C. reset command being $\overline{\text{MRG1}}$.

The A.-C. set command for position I is (DICA) CPA [(DUC)+(DUC)] (BL–MRI) [MCF+MLRDH=10 (BL–MRG)]

This command says that during interval DICA of row C or row D's time slot, and if position I is blank, take the contents of position H (D.-C. set and reset commands) when MCF is true or when there is an operator call.

In row C, the contents of position A is transferred to position C when position I has information. Therefore, the D.-C. set for MRC1 is MCF MRA1 DUC. The A.-C. set command is ($\overline{\text{BL–MRI}}$) (BL–MRC) $\overline{\text{MCD}}$ DICA CPA. Thus information is transferred to position C from position A if the interdigitial pause (MCF) is true, no decision ($\overline{\text{MCD}}$) is true, and position C is blank during row C. Position C resets when the digit in C is transferred to position D.

As mentioned previously, position D receives information from position C in row C and from position A of row D. The D.-C. set command for position D is

DUD MRA1 MCF+DUC MRC1

The A.-C. set command is (BL–MRD) DICA (BL–MRI) (DUD BL–MRH +DUC $\overline{\text{MCD}}$) CPA This command requires that position D takes information from position C during row C if D has no information, and from position A of row D when the interdigital pause (MCF) is true and when three digits (excluding prefix digits) have been dialed.

The D.-C. set command for position MRE1 is MRD1. The A.-C. set command is (B1–MRE) DICA CPA (DUC DUD)

Position E, therefore, takes information from position D for both rows provided that it contains no information.

The D.-C. set command for position MRF1 is MRE1. The A.-C. set command is

BL–MRF DICA CPA (DUC+DUD)

Position MRF1 takes information from MRE1 for both rows if it contains no information.

The command DIGA and CPA resets the entire MR register so that it is clear for the following memory read interval in the next row.

CHAPTER 9—CARRY REGISTER

The folded memory word which is used in the register-sender leads to the problem of passing information between memory rows. Information that a translation is possible is determined by the type and number of digits in storage which exists during the dialed digit logic time DUC. This information must be passed to the register junctor's control word DUA, which initiates the action required for translation. The same problem is encountered when information must be transferred from the register junctor's control word to any other memory row. The means of solving this problem is the use of a buffer store called the MC register, located in common control 2CC, and the reoccurrence of the register junctor's control word in time slot DUG. Information contained in row DUA may be placed in the MC register during DUA, thus making that information available to any other row (DUB, DUC, DUD, DUE, or DUF). Since the junctor register's control word also appears in time slot DUG, any of the other rows in the register junctor's memory storage may also pass information to the control word by means of the MC register.

9.1 *Description*

The MC register is a nineteen bit buffer storage with associated control logic. The logic is arranged such that information may be placed in the MC register during all memory rows. Thus, information can be transferred between rows within a junctor's time slot (DUA through DUG).

The following is a list of the flip-flops in the MC register. The list contains such information as what is it, what does it mean, where is it obtained, and where is it used.

MCADD is a command to advance the count of the dialed digit storage of rows DUC and DUD. The information to ADD is obtained in row DUA from analysis of the P highway.

MCF is an indication of an interdigital pause, stating that the count of the digit in rows DUC and DUD is complete. The information of the interdigital pause is obtained in row DUA from the analysis of the P highway.

MCD indicates a decision has been made. By decision, it is meant that the common logic has "decided," by analysis of the type, and number of dialed digits in storage in row DUC, what type of call is in progress, and that the first translation had been requested. Whenever the X instruction is transferred to the register junctor's control word, the decision bit (MRF3) is also written into the control word. As long as MRF3 is true in the control word, MCD will be set to the one state. This prevents further setting of the X instruction and address flip-flops from row DUC, thus insuring that only one translation of the dialed digits will be requested. MCD is also employed in the MR register as explained in Chapter 8.

MC24 is an indication that the register junctor is using the MT register (Chapter 10). This information is written into row DUA whenever the register junctor seizes the MT register so that the MT register knows which register junctor it is using. This bit, MC24, is available to all rows so that each row may give to or receive from the MT register any information that may be required.

MCXIN indicates that the register junctor has an X instruction in its control word. Whenever the control word has an X instruction, that register junctor is attempting to seize the MT register; and a time-out must be started. The time-out for the MT register is stored in position A or row DUF, and the start command for the counter (MCXIN) must be passed from row DUA to row DUF.

MCTS means either trouble in the allotter or that the sender control word is in an impossible Q state (Q7). Should either of these trouble indications be detected in the sender control word, row DUB, MCTS is set to the one state. This trouble indication is passed to the register control word, via this flip-flop; and is written into memory position MRF2 during DUG. This trouble indication is now available the next time the same register control word is read out again during DUA. If at this time MRF2 is true, MCTS is again set to the one state. When the sender control word is read out again during DUB, and MCTS is true, the sender disconnect flip-flop is set (MCSDC); and a disconnect sequence will be initiated. Since MCTS being true indicates a trouble, the register control word will eventually sequence to disconnect state V3 and request a trouble recorder.

MCE means erase whatever information is in the register junctor's memory storage. This bit is placed in the MC register during the control word's time slot DUA whenever the register junctor is returning to the idle condition from the disconnect states V2 or V3 (see Chapter 5). It is also used to erase any false information that may arise in any row whenever the register junctor is in the idle sequence state R1.

MCTOA means "time-out A." This indication arises when the analysis of the P highway in row DUA indicates no change for a period of four or twenty seconds. This information is then passed to row DUC for the shifting of the operator digit (as explained in Chapter 8) or for the deletion of digits in the write commands (Chapter 13) and allows the writing of the X instruction into the MC register, during DUC, after seven digits have been dialed.

MCFTO signified "fast time-out." This function being true reduces the normal twenty second time-out period to four seconds. If the subscriber has dialed "operator," the normal time-out is reduced to four seconds. Also, in the future numbering plan after seven digits have been dialed, the arrival of the eighth dialed digit is timed to distinguish between extended and foreign area calls. This timing period is also reduced from the normal twenty seconds to a four second time-out. The other case where a fast time-out is required is in timing of the "down-check" lead from the local junctor. The information to set MCFTO is obtained from both rows DUA and DUC and is transported to the control word where it is required by the counter in that memory word.

MCO1, MCO2, and MCO4 are the binary weighted address flip-flops. If the first three dialed digits in row DUC are recognized as a local office, the address of the translator for that office is transported to the register junctor's control word via these flip-flops.

MCX2, MCX4, and MCX8 are the binary weighted X instruction flip-flops which carry the translation instruction from rows DUB and DUC to the register junctor's control word. The X instruction is placed into the MC register from row DUC only when a sufficient number of dialed digits are in storage in row DUC. The placing of the X instruction in the MC register is a request to the register junctor's control word to go for a translation. As previously mentioned, MCD being true prevents any further requests for translation from row DUC. In the case of a ticketing call, a line number translation (LNT) must be performed before the register junctor may request a ticketer. In this case, the sender control word, row DUB, places the proper translation instruction into the MC register when the sender completes its function.

MCRDC and MCSDC are the register disconnect and the sender disconnect flip-flops. Should either the register junctor's logic or the sender wish to disconnect, the other is informed of this disconnect action via these flip-flops so that it, too, may disconnect when possible. The register control word, row DUA, will set MCRDC if the subscriber has disconnected; if there is trouble in the register as indicated by the memory bit MRF1; if the register junctor has been in the finished dialing sequence state for 32 milliseconds, and the finished dialing indication MRE2 is not true; or if the sender has indicated a disconnect, and the register junctor does not have, or is not attempting to seize, the MT register. MCRDC may also be set from row DUF if position A of that row indicates a count of 15. Position A of row DUF is the MT register time-out storage area in the register junctor's memory. The sender control word, row DUB, will set MCSDC if the sender is in state Q5, if the sender is in state Q0 and MCRDC is true, if the sender has been timed out as indicated by the count stored in position A of row DUB, or if there is trouble as indicated by MCTS. When the sender requests a disconnect, and a register requests a disconnect (by the setting of MCSDC or MCRDC), this information is passed to the register control word via these two flip-flops. Thus, when the register control word appears during DUG, these disconnect requests are written into memory bit positions MRE3 and MRE4. MRE3 is the storage bit for the sender disconnect, and MRE4 is the storage bit for the register disconnect. These disconnect requests are now available the next time the same register control word is read out again during DUA. If, at this time, MRE3 and/or MRE4 are true, MCSDC and/or MCRDC is again set to the "one" state. Thus, these disconnect requests are available continuously to all memory rows; and in this manner, the register junctor's logic and the sender's logic are informed as to each others disconnect requests.

MCW1 signifies that the first two dialed digits of the called party's station number are in the register junctor's memory storage. This information is determined by the presence of the digits in positions G and F in row DUD. This information is required in row DUB. Therefore, when MCW1 is set in row DUD, this fact causes the writing of a 1 in memory location MRE1 of the register control word during DUG. When this control word is read out again during DUA and MRE1 is true, this condition sets MCW1 again, which passes the information to the sender control word in DUB.

MCW2 indicates finished dialing or that the final two dialed digits of the called party's station number are in the register junctor's memory storage. This information is usually determined by the presence of the digits in positions D and E of row DUD and is also required for the sender sequence states in row DUB. MCW2 is also set from the information obtained in row DUC for such cases as an operator call, a special service call, or a revertive call. This action is required to prevent the setting of MCRDC for those special cases mentioned above where the subscriber does not dial sufficient digits to fill positions D and E of row DUD. As in the case of MCW1, MCW2 must also be passed to row DUB. In the same manner, a 1 is written into memory location MRE2 of the register control word during DUG whenever MCW2 is true. When this control word is read out again during DUA, and MRE2 is true, this sets MCW2 again, which then passes the information to the sender control word in DUB.

9.2 *Equations*

The following is a list of the set commands for the MS register's flip-flops. The A.-C. and D.-C. set commands have been combined in the equations. The reset command for all the flip-flops is (DUG) (DIG) (CPB). Thus, the MC register is reset on leaving the local junctor's time slot and is available for use by the next local junctor.

MCADD (MLADD)(DUA)(DIG)(CPB)

where

MLADD=(MLRDC–4)($\overline{\text{MLVX}}$)(MLP)($\overline{\text{MRB4}}$)

MCF (MLF)(DUA)(DIG)(CPB)

where

MLF=($\overline{\text{MLRDC–3}}$)(MLRDC–4)(MLP)(MRB4)(MLRDA–15)(MLDRB–0)

MCD (MRF3)(DUA)(DIG)(CPB)

MCW1 (MRE1)(DUA)(DIG)(CPB)+(MCD)($\overline{\text{BL–MRF}}$)(BL–MRG)(DUD)(DIG)(CPB)

MCW2 (MRE2)(DUA)(DIG)(CPB)+{(MCD)[(MLZ5)+(MLZ7)]+(MLZ11)(MCW1)}(DUC)(DIG)(CPB)+(MCD)($\overline{\text{BL–MRD}}$)($\overline{\text{BL–MRE}}$)(DUD)(DIG)(CPB)

MCO1 ($\overline{\text{MCD}}$)(MLZ4)(MLBN7)[($\overline{\text{MLFUT}}$)+(MCTOA)][(MLY1)+(MLY3)+(MLY5)](DUC)(DIG)(CPB)

MCO2 ($\overline{\text{MCD}}$)(MLZ4)(MLBN7)[($\overline{\text{MLFUT}}$)+(MCTOA)][(MLY2)+(MLY3)](DUC)(DIG)(CPB)

MCO4 ($\overline{\text{MCD}}$)(MLZ4)(MLBN7)[$\overline{\text{MLFUT}}$)+(MCTOA)][(MLY4)+(MLY5)](DUC)(DIG)(CPB)

MC24 [(MRF4)+(BL–MT1N)($\overline{\text{BL–MRH}}$)($\overline{\text{MRE4}}$)](DUA)(DIG)(CPB)

MCXIN ($\overline{\text{BL–MRH}}$)(DUA)(DIG)(CPB)

MCTOA (MLTOA)(DUA)(DIG)(CPB)

where

MLTOA=($\overline{\text{MLRDC–3}}$)(MLRDC–4)(MRB4)(MLP)(MLRDA–15)(MRB2)

MCX2 (MLRDD–4B) (MLRDC–14) (MRH4) [(MRH1)+(MRH2)+(MRH3)] (DUB) (DIG) (CPB)+($\overline{\text{MCD}}$) (MLBN7) [($\overline{\text{MLFUT}}$) (MLZ6) +(MLFUT) (MCADD)] (DUC) (DIG) (CPB)

MCX4 ($\overline{\text{MCD}}$) {(MLZ4) (MLBN7) [($\overline{\text{MLFUT}}$) +(MCTOA)]+(MLZ8) ($\overline{\text{MLFUT}}$)+(MLZ5) +(MLZ4) (MLFUT) (MLBN7) (MCTOA) +(MLBN7) [($\overline{\text{MLFUT}}$) (MLZ6)+(MLFUT) (MCADD)]} (DUC) (DIG) (CPB)

MCX8 ($\overline{\text{MCD}}$) {(MLZ7)+(MLZ8) ($\overline{\text{MLFUT}}$) +(MLZ5)+($\overline{\text{MLZ4}}$) (MLFUT) (MLBN7) (MCTOA)+(MLBN7) [($\overline{\text{MLFUT}}$) (MLZ6) +(MLFUT) (MCADD)]} (DUC) (DIG) (CPB)

MCRDC {[(MLRDC–4)+(MLRDC–5)] ($\overline{\text{MRB4}}$) ($\overline{\text{MLP}}$) (MLRA–15) (MLRDB–0)+(MRF1) +(MRE4)+(MLRDC–5) ($\overline{\text{MRE2}}$) (MLRDA–4) +(MLRDD–1A) (MRE3) ($\overline{\text{MRF4}}$) (BL–MRH)} (DUA) (DIG) (CPB)+(MLRDA–15) ($\overline{\text{MC24}}$) (DUF) (DIG) (CPB)

MCSDC (MRE3) (DUA) (DIG) (CPB) +[(MLRDD–5B)+(BL–MRD) (MCRDC) +(MLTOB)+(MCTS)] (DUB) (DIG) (CPB)

where

MLTOB=(MLRDA–15) (MRB2)

MCTS (MRF2) (DUA) (DIG) (CPB)+[(AT) +(MLRDD–7B)] (DUB) (DIG) (CPB)

MCFTO (MLRDD–1A) (DUA) (DIG) (CPB) +(MCF) [(MLRDA–10) (BL–MRG) (BL–MRH) (BL–MRI)+(MLFUT) ($\overline{\text{BL–MRA}}$) (BL–MRC) ($\overline{\text{BL–MRD}}$)] (DUC) (DIG) (CPB)

MCE (MLE) (DUA) (DIG) (CPB)

where

MLE=(MLRDC–1) ($\overline{\text{MLA+B}}$)+(MLRDD–2A) (MMDC) ($\overline{\text{MRF1}}$) ($\overline{\text{MRF2}}$)+(MLRDD–3A) [(MLGO)+(TRRGO)]

CHAPTER 10—TRANSFER REGISTER

The register-sender group must communicate with other subsystems of the EAX system such as the originating line group markers and the translators. Also, each subsystem has its own timing functions not common to each other. The function of the transfer register 2TR is, therefore, the communication (via diphase transmission) between these subsystems and the register-sender group without recourse to common timing pulses. The information received and transmitted to the transfer register is by serial transfer. Thus, the transfer register is basically a shift register which sends and receives and also has parallel inputs from the read register with associated control logic.

10.1 *Description*

Figure 14:
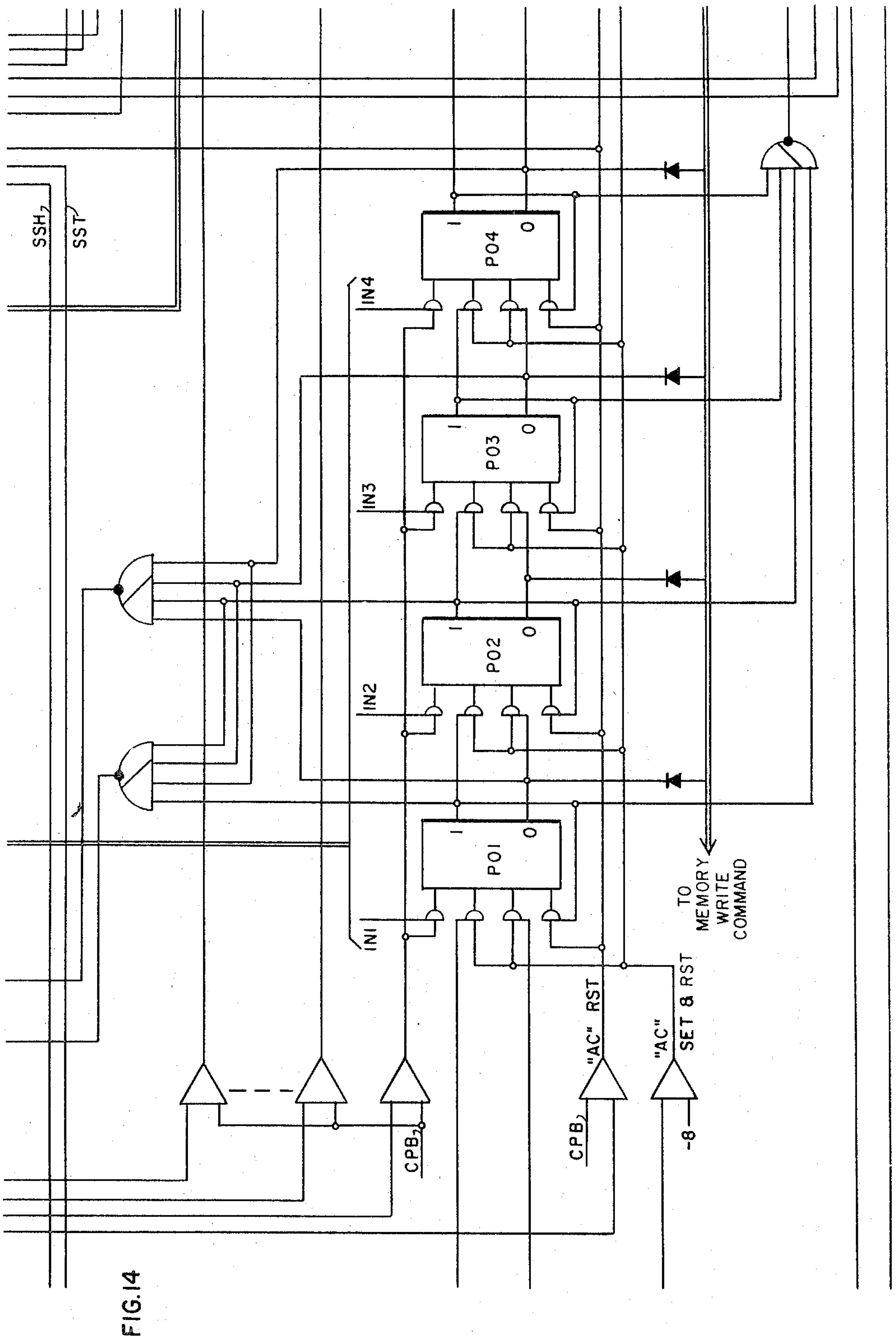
Figure 15:
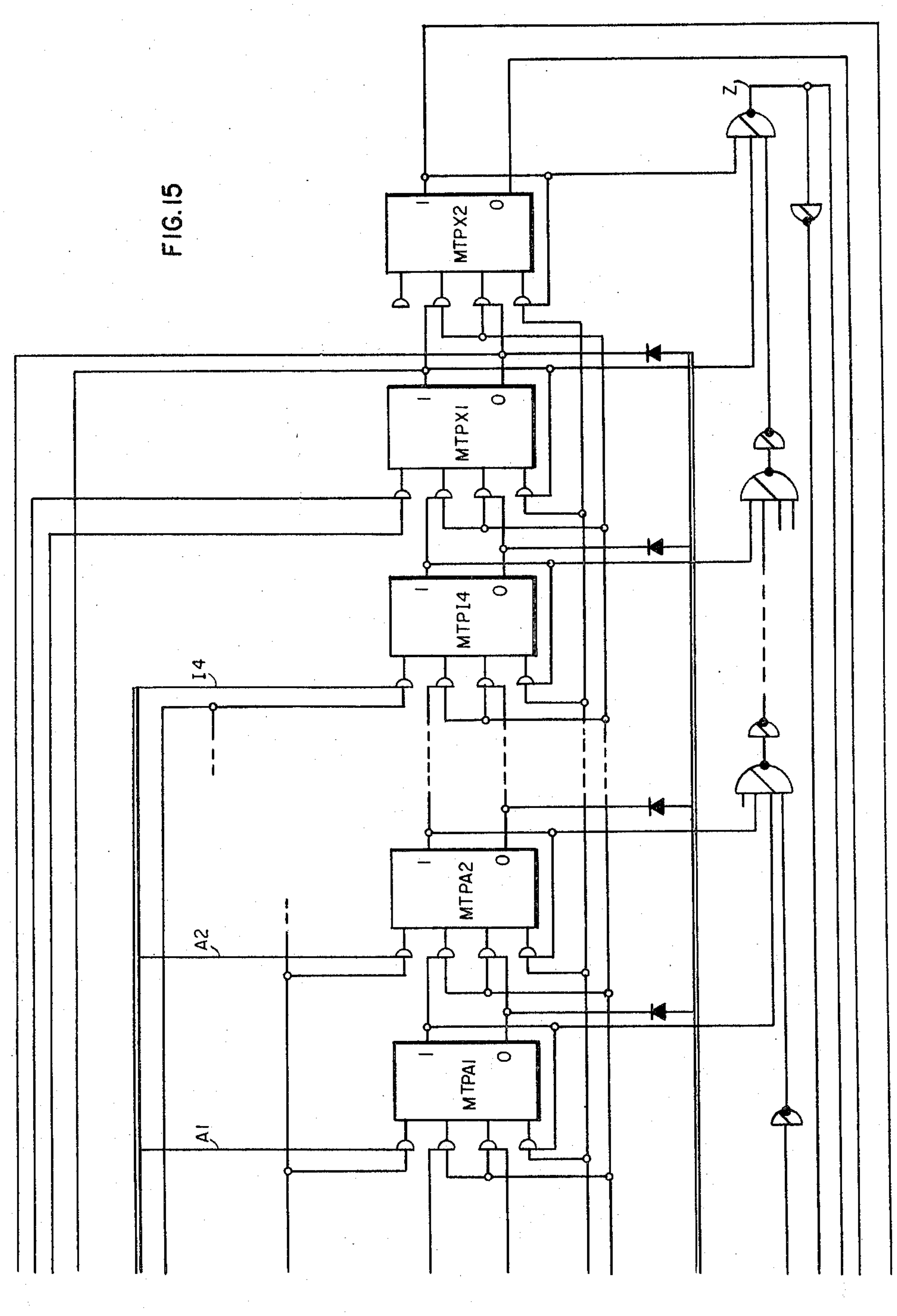
Figure 16:
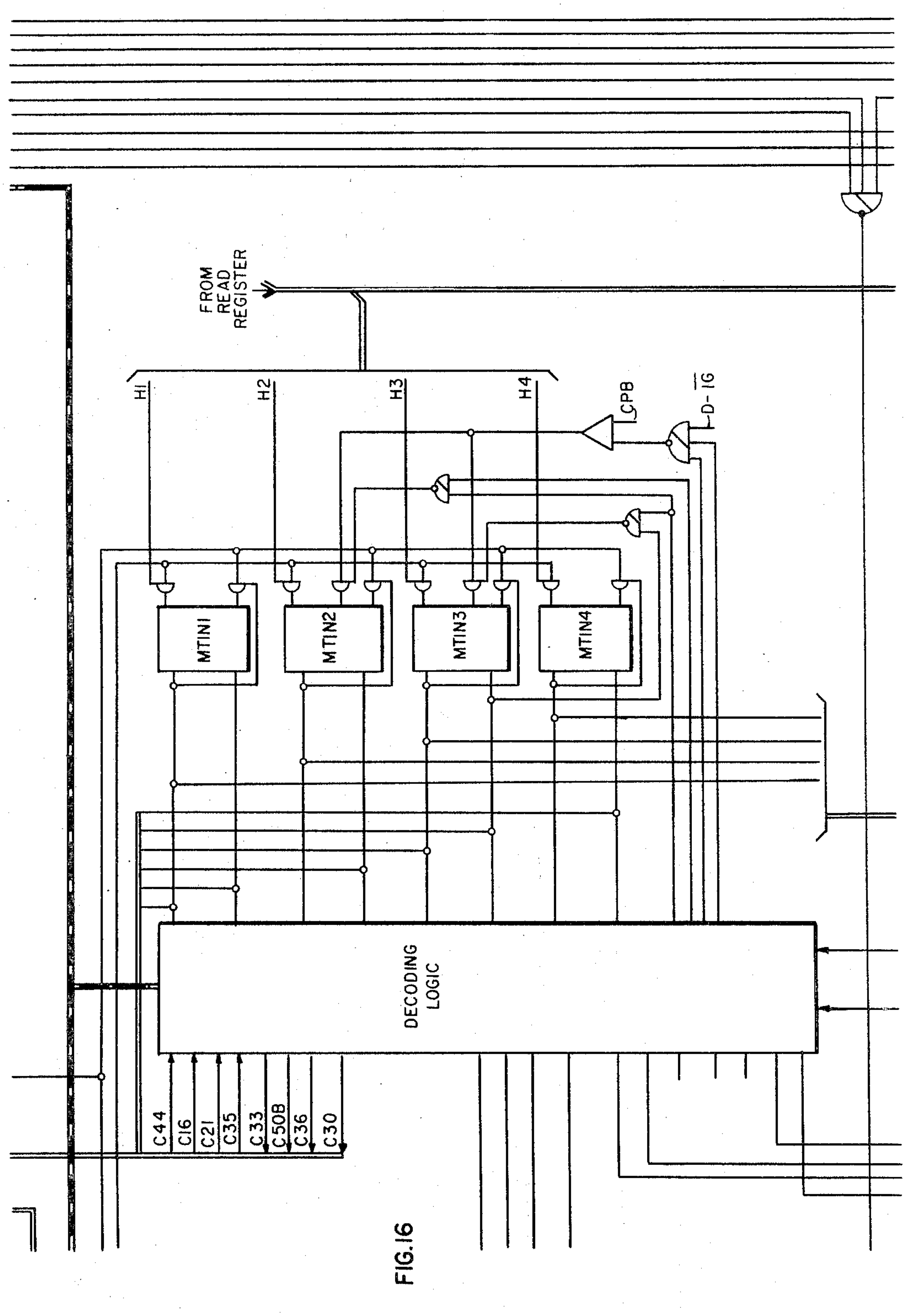
Figure 17:
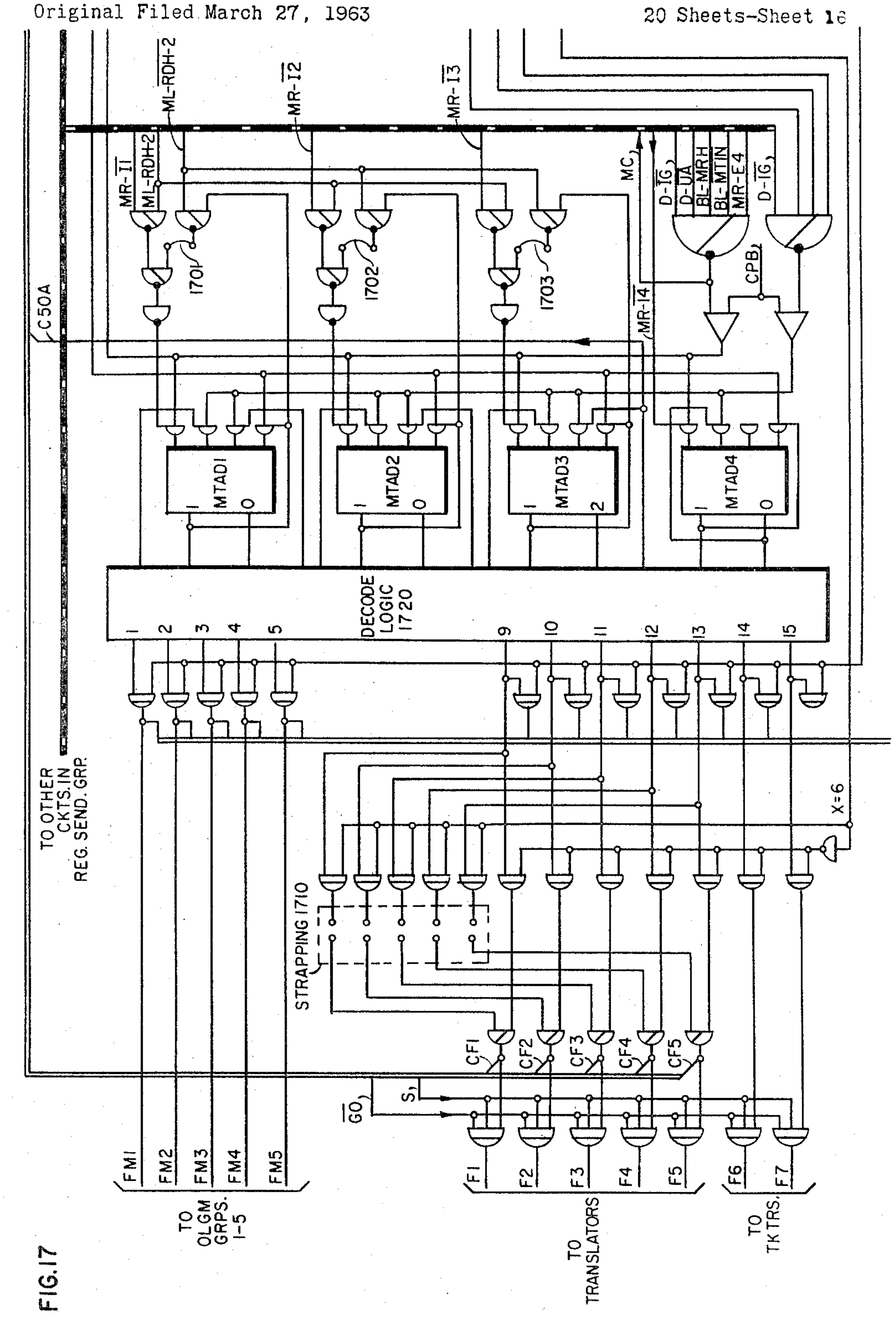
Figure 18:
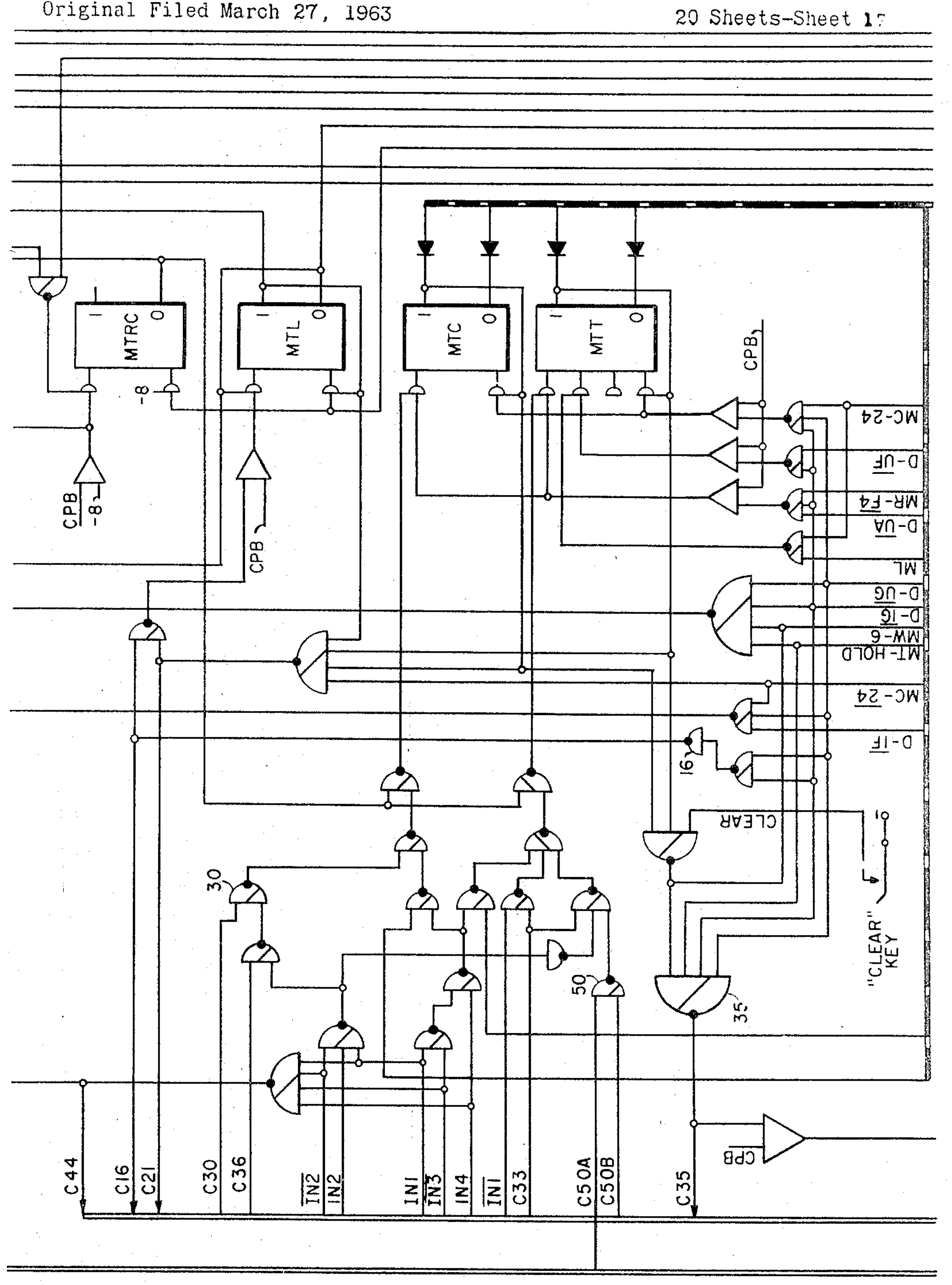

The shift register portion of the transfer register, FIGS. 14 and 15, consists of 42 flip-flops connected in series. It is divided into ten positions with four bits or flip-flops per position plus a prefix flip-flop and a buffer flip-flop. The flip-flops are designated both as to position and as to the bit within the position. The first position is designated position 0. There are four flip-flops in that position; thus, their designations are MTPO1, MTPO2, MTPO3, and MTPO4. The next position is A, and the four flip-flops in that position are designated MTPA1 to MTPA4. This nomenclature continues alphabetically to position I for a total of 10 positions and 40 flip-flops.

Following flip-flop MTPI4 is a flip-flop named MTPX1. This is the prefix flip-flop. When the transfer register is in the receive state and before any information is received, the shift register contains all zeros. All messages either transmitted or received have a prefix bit as a binary one. Thus, the occurrence of a one in MTPX1 during the receive state indicates to the transfer register that the entire message has been shifted into the shift register. This then inhibits the shift pulses and information can be written into the memory of the proper register. The last flip-flop in the shift register designated MTPX2 is merely a buffer between the shift register and the diphase transmission.

FIG. 12 indicates, on a simplified scale, how the shifting is accomplished. When in the "send" state, information from the memory is written into the shift register and a prefix one is also written into bit MTPX1. When the information has been shifted out, the shift register contains all zeros. This is then the command to inhibit the local shift pulses and place the transfer register into the receive state to await incoming information. Information is written in parallel into the shift register from the read register, and is written in parallel to the memory from the shift register. The loading information for the shift register is produced from the decoded instructions (X digit).

Diphase transmission is used between the originating line group markers and the transfer register, and between the translators and the transfer register.

The functions of the transfer register are as follows:

(a) To take the line number identification (LNI) from any one of five originating line group markers for storage into the ferrite-core memory 2M. This same LNI is taken from the memory (on charge calls) and transmit it to the translators, and await the translated information (LNT) for storage into the ferrite-core memory 2M.

(b) To take the dialed information for a local call out of memory storage and transmit it to a designated translator; to await this translated information (translated directory number) for storage into the memory.

(c) To take the dialed information from the memory and transmit it to a translator for translation of calls other than local calls, and to await this translated information for storage into the memory.

(d) To take the directory number of the calling subscriber; the area code, the office code, and the station number of the called subscriber to the translator for ticketing purposes.

Information is transferred serially between the line group marker and the transfer register, and between the translators and the transfer register. The transfer register obtains information from the memory by parallel transfer of the information in the read register. Information from the transfer register to the memory is accepted in parallel for storage.

Referring now to FIGS. 13–19 which are a detailed representation of the transfer register, various flip-flops and commands are given logical symbols for ease of writing equations. The first two letters indicate the location of the function and subsequent letters or numerals are used to differentiate similar functions in the same location.

(1) MTPO1 through MTPX2—The message storage in the transfer register arranged as a shift register.

(2) MTPX1—A prefix one sent with all messages, used by the receiver to indicate end of message.

(3) MTAD1, MTAD2, MTAD3, MTAD4—Four flip-flops in the transfer register control containing a coded address received from the common control. The address tells the transfer register where the message should be sent.

(4) MTIN1, MTIN2, MTIN3, MTIN4—Four flip-flops used to store the X instruction. The X instructions tell the transfer register what to send, and where to store received information.

(5) (BL–MTIN)—An "idle" command indicating that positions MTIN1, MTIN2, MTIN3, MTIN4 do not have a coded instruction.

(6) MTL—Indicates that necessary information has been transferred from memory storage to the transfer register.

(7) MTS—A flip-flop when set to the 1 state places the transfer register in the send state.

(8) MTR—A flip-flop when set to the 1 state informs the transfer register to start receiving information.

(9) MTRC—A command indicating that the "receive" operation of the transfer register has been completed.

(10) MTGO—A command to the transfer register to start transmitting.

(11) MR24—A bit placed in junctor memory storage in position MR24 of DUA to indicate that the transfer register has been seized.

(12) All Zeros—A command indicating that there is no information in the transfer shift register.

(13) MTPX2—A buffer flip-flop used for isolation between the transfer shift register and diphase sender. It allows the storage of information in the transfer shift register without affecting the operation of the diphase sender.

(14) MTC—A flip-flop when in the 1 state indicates to the common logic that the transfer register has completed its task, so that the transfer register can return to the idle state.

(15) MTT—A flip-flop when in the one state indicates trouble in the transfer register.

The general philosophy used with the transfer register is that the receivers give the send command to the senders. Thus, in the case of LNI where the transfer register operates as a receiver, a go command is sent to the line group marker by means of flip-flop MTGO of the control circuitry in transfer control 2TC as shown in FIG. 19. When a translation is necessary, then the transfer register first acts as a sender, and the transfer register sets a "flag" for the translator to seize the transfer register by sending one of the commands F1–5. After the transfer register has been seized by the translator, the translator sends the go command to the transfer register to allow the transfer register to send its information by setting flip-flop MTGO from the GO leads from the translator.

The transfer register is considered idle when $(\overline{MTIN1})(\overline{MTIN2})(\overline{MTIN3})(\overline{MTIN4})$ is true. As mentioned previously, these flip-flops contain the X instruction which was initially stored in position H of DUA. The definition of the X instructions is as follows:

| Decimal Value | Binary Value of X | Instruction |
|---|---|---|
| 4 | 0010 | Go to translator with the directory number and obtain a translation. |
| 2 | 0100 | Go to the translator with the line number and obtain a translation. |
| 8 | 0001 | Go to the translator for a one digit translation—this occurs for an operator call. |
| 12 | 0011 | Go to the translator for a 3 digit translation—this occurs for special services, or extended area codes. |
| 14 | 0111 | Go to the translator for a 6 digit translation—this occurs for foreign area calls. |
| 7 | 1110 | Go to the ticketer with the translated line number for ticketing. |
| 3 | 1100 | Go to the ticketer with the office and/or area code for ticketing. |
| 1 | 1000 | Go to the ticketer with the station number for ticketing. |
| 6 | 0110 | Receive the line number identification of the calling subscriber from the originating line group marker. |

The MTAD1 through MTAD4 flip-flops contain the address of the translator or of the line group marker that is communicating with the transfer shift register. This address is initially stored in position "I" of Row A of the memory. The definition of the binary coded address is as follows:

1000—Accept LNI from line group marker 1LG1
0100—Accept LNI from line group marker 1LG2
1100—Accept LNI from line group marker 1LG3
0010—Accept LNI from line group marker 1LG4
1010—Accept LNI from line group marker 1LG5
1001—Transmit/Receive from number group translator 1
0101—Transmit/Receive from number group translator 2
1101—Transmit/Receive from number group translator 3
0011—Transmit/Receive from number group translator 4

1011—Transmit/Receive from number group translator 5
0111—Transmit/Receive from ticketer 1
1111—Transmit/Receive from ticketer 2

The seizure command for the transfer register is (BL–MTIN) (DUA) ($\overline{\text{BL–MRH}}$), meaning that during time DUA the H position of memory row DUA has an instruction indicating the transfer register is needed, and the transfer register is idle (BL–MTIN) as it does not contain an instruction.

If the seizure command is true during time DUA then the I position (MRI1 to MRI4) is transferred to MTAD1, 2, 3, and 4 of the transfer register; a bit placed into storage in row DUA (MR24) to indicate to a register that it is working with the transfer register; and the H position transferred to the MTIN flip-flops to store the X instructions. The presence of an X instruction in the MTIN flip-flops indicates to other registers that the transfer register is busy. The address readout of the I position and the X instruction readout of the H position during time DUA will not be rewritten if the transfer seizure command is true.

The transfer register acts as a receiver when information is transferred from one of the line group markers to the register-sender group. When a marker marks either one of its two control leads to a register junctor in a register-sender group, the marker's address is written in row DUA as well as X=6. If the transfer register is idle, the address is transferred to the MTAD flip-flops, a binary six transferred into the MTIN flip-flops, and MR24 is written into the memory as previously explained. At the end of the subscribers time slot (DUG) (DIG), flip-flop MTL is set to the one state, allowing flip-flop MTR to be set. One of five diphase receivers associated with the markers then receives an enabling command, and a Go command is generated and sent to the appropriate marker to send LNI.

After the LNI has been received in the transfer shift register, the prefix 1 is present in MTPX1. This is the command to set flip-flop MTRC which in turn resets MTR. At this point, the transfer shift register is neither sending nor receiving, and the diphase receiver connected to the line group marker is inhibited. MTRC being true sets flip-flop MTC. MTC being true transfers the LNI to the memory. After the LNI has been transferred to the memory, all of the flip-flops in the transfer register reset at time (DUG) (DIG). This puts the transfer register to the idle state, and it is free to be seized by the next junctor in time sequence.

The transfer register acts as a sender when information is transferred from the register-sender group to the translators. Assuming that the transfer register has been seized, and X instruction is loaded in the MTIN flip-flops, and an address of a translator is loaded in the MTAD flip-flops. Information from the read register is transferred from memory readout to the transfer register depending upon the X instruction. The command that instructs the transfer register to load information from the read register is MC24 $\overline{\text{MTL}}$. This means that the register junctor that seized the transfer register is available (MC24) and that information has not previously been loaded into the transfer register ($\overline{\text{MTL}}$). Loading of the transfer register will usually occur during rows DUB, DUD, and DUE. Thus, when the register control word DUG occurs loading should be complete. In DUG DIF flip-flop MTS is set to the one state indicating the transfer register is ready to send information, and MTL is set to the one state indicating the transfer register has been loaded. The flag is then set and the translator, if not busy, sends a Go command as mentioned previously. When the information in the transfer shift register has been transferred to the translator, the transfer shift register has all zeros stored in it. This will be the command Z to reset MTS to the zero state; command Z being produced by an AND gate arrangement that produces command Z when each flip-flop in the shift register is in the zero state. MTS being in the 0 state sets MTR to the one state. The transfer register then awaits information from the translator. At this time, the transfer register is still busy, and if no information returns from the translator, it disconnects after a time out occurring in the waiting register.

When information is returned from the translator, MTRC becomes set to the one state and MTR becomes reset. At this point, a number of possibilties exist as to what the next logical step may be. If the instruction was X equal to two (line translation), and the I digit received from the translator was equal to twelve; this indicates to the transfer register that the translator had the translated information for this line number. For this case, MTC becomes set to the one state and the translated information is written into the memory, and the transfer register resets completely putting it in the idle state. If the I digit was equal to thirteen, this indicates to the transfer register that the translator that was communicated with did not have the translated information. In this case MTC is not set, but MTL becomes reset. Resetting MTL allows information to be loaded into the transfer register on the arrival of the time slot of the register junctor that has seized the transfer register. Thus, the command MC24 $\overline{\text{MTL}}$ once more becomes true. On the arrival of the register junctor's time slot the address written in MTAD is stepped once, to a new address, and the transfer shift register becomes reset to all zeros. The same information that was previously sent to the first translator now is transferred again to the transfer shift register and the cycle begins once more. So in effect, the receipt of the I equal to thirteen means try another translator. This process repeats itself until a twelve is obtained and information is written into the memory as previously mentioned, or the trouble flip-flop is set and the transfer register disconnects itself if access to the five translators did not produce an I equal to twelve.

If the X instruction is four, eight, twelve, or fourteen, which are normal translations, the transfer register does not view the I digit for a twelve or thirteen. It merely views the MTPA position of the shift register, and if it contains a digit, the information is transferred to the memory assuming it is correct. This is a valid assumption since the transfer register knew what translator it had to access to receive the translated information, assuming this is not the case for X equal to two (LNT).

If the X instruction is equal to seven, the received information should always contain an I equal to twelve. If it does not, the trouble flip-flop becomes set and the transfer register disconnects going to the idle state. Since the normal case is the receipt of an I equal to twelve when X is equal to seven, this is a command to change the X instruction to three, and also reset all control flip-flops. This instruction brings other information down from the read register to the transfer register to be transferred to the translator. Once more the transfer register awaits an I equal to twelve. Again, if it does not receive a twelve, the trouble flip-flop is set and the transfer register disconnects itself from the translator and goes to the idle state. The I digit being twelve, and when X is equal to three, the instruction changes to X equal to one. Once more different information is brought down from the read register to the transfer register and transferred to the translator. When an I equal to twelve is received when X is equal to one, the transfer register disconnects and goes to the idle state. This last case of X equal to seven, three, and one is for ticketing where the directory number, the office and area code, and the station number must be sent to the translator.

There are two strapping fields associated with the transfer register. Strapping field 1701–3 is used to write different initial addresses into the MTAD flip-flops for an X instruction equal to two. As previously mentioned, the addresses of the translators are designated as 9 to 13. However, if there are less than five translators, then there are some addresses which will not be used. Therefore, if there are two translators, the address written into the MTAD flip-flops will be equal to twelve only for X equal to two. If there are four translators the address written in will be ten, etc. This is done to prevent the transfer register from attempting to access a nonexistent translator with the resultant increase in transfer register holding time when the local office requirement is less than 5 translators.

Strapping field 1710 is used to grade the traffic to the translators for line number translations when more than one register-sender group is employed and when an X=6 condition occurs. That is, each register-sender group can go to a different translator upon the first access for a line translation. Assuming that there are five translators, the address written into the MTAD flip-flops initially will be nine. The strapping field then allows a flag to be set, if wanted, to another translator. Thus, for example, although an address of nine is written into the MTAD flip-flops, a flag may be set for a translator with an address other than nine.

Table 10–1 shows the placement of the digits in the transfer shift register obtained from the read register prior to sending to the ticketer or translator. It also shows the placement when information is received either from the originating line group markers or from the translators. The placement of the digits into the positions of the transfer shift register corresponds to the same position in the read register. For example, the digit in position F of the read register is always transferred to position F of the transfer shift register. The same condition is true, except for the S and I digits, when the digits are written into the memory from the transfer register. This resulted in a minimum number of gates required to transfer information between circuits. Position O, not present in the read register, contains the X instruction when sending. The X instruction informs the translator as to what type of translation is required. The X instruction in the MTIN flip-flops informs the transfer register as to what positions are to be transferred from memory rows, when the load signal MC24 $\overline{MTL}$ is true. Thus, for an X instruction equal to four, positions C through I from DUD, and positions A and B from DUE, are transferred to the corresponding positions in the transfer shift register. Also, the X instruction is written into position 0 from the MTIN flip-flops. A comparison between Tables 10–1 and FIG. 4 shows the relationship between digits in the transfer shift register and the storage of digits in the memory.

TABLE 10–1

| | | MRA | MRB | MRC | MRD | MRE | MRF | MRG | MRH | MRI | |
|---|---|---|---|---|---|---|---|---|---|---|---|
| | MTPO | MTPA | MTPB | MTPC | MTPD | MTPE | MTPF | MTPG | MTPH | MTPI | |
| | 1234 | 1234 | 1234 | 1234 | 1234 | 1234 | 1234 | 1234 | 1234 | 1234 | |
| Directory Trans. | X=4 | K | Y | Z | N | N | N | N | BLANK | BLANK | TO TRANSLATORS OR TICKETERS |
| Line No. Trans. | X=2 | K | Y | Z | P | U | T | H | M | L | |
| 1 Digit Trans. | X=8 | K | Y | Z | BLANK | BLANK | BLANK | BLANK | BLANK | 10 | |
| 3 Digit Trans. | X=12 | K | Y | Z | BLANK | BLANK | BLANK | N | N | N | |
| 6 Digit Trans. | X=14 | K | Y | Z | N | A | A | X" | X' | A | |
| 1st Ticketing Access | X=7 | I | T | $N_U$ | $N_T$ | $N_H$ | $N_{TH}$ | N | L | L | |
| 2nd Ticketing Access | X=3 | I | T | Z | BLANK N | BLANK A | BLANK A | N X" | A X' | A A | |
| 3rd Ticketing Access | X=1 | I | T | BLANK | N | N | N | N | BLANK | BLANK | |

INFORMATION TRANSMITTED

| | | | | | | | | | | | |
|---|---|---|---|---|---|---|---|---|---|---|---|
| From OLGM | BLANK | K | Y | BLANK | BLANK | U | T | H | M | L | LINE NUMBER IDENTIFICATION |
| From Translators | I | S | BLANK | U | T | H | D | C | B | A | TRANSLATED AREA CODE |
| From Translators | I | S | BLANK | $N_U$ | $N_T$ | $N_H$ | $N_{TH}$ | N | L | L | TRANSLATED LINE NUMBER |
| From Translators | I | S | P | U | T | H | D | C | B | A | TRANSLATED DIRECTORY NO. |
| From Ticketer | 12 | — | — | — | — | — | — | — | — | — | ACKNOWLEDGMENT FROM TICKETER |

10.2 *Equations*

The following is a list of some of the more important commands in the MT register:

(1) MTL:

AC SET—(DUG) (DIG) (MC24) ($\overline{MTL}$) ($\overline{MTC}$) ($\overline{MTT}$) CPB DC SET—$\overline{MTL}$ AC RESET—(DUA) (DIG) (MRF4) (MTRC) [(MTIN=2) (MTPO=13)+(MTIN1) (MTPO-12)]+(DUG) (DIG) [(MTC)+(TMTRS) (MTT)] CPB

DC RESET—MTL (2) MTR:

AC SET—(All Zeros) ($\overline{MTS}$) (MTL) CPB

DC SET—$\overline{MTR}$

AC RESET—CPB

DC RESET—(MTRC) (MTR)+(DUG) (DIG) [(MTC)+(TMTRS)+(MTT)]

(3) MTS:

AC SET—(DUG) (DIF) (MC24) CPB

DC SET—($\overline{MTL}$) ($\overline{MTR}$) ($\overline{\text{All Zeros}}$) ($\overline{MTIN=6}$)

AC RESET—CPB

DC RESET—(All Zeros) (MTS)+(DUG) (DIG) [(MTC)+TMTRS+(MTT)]

(4) MTRC:
AC SET—CPB
DC SET—(MTPX1) (MTR)
AC RESET—(DUA) (DIG) (MRF4) (MTRC) [(MTIN=2) (MTPO=13)+(MTIN1) (MTPO=12)]+(DUG) (DIG) [(MTC) +(TMTRS)+(MTT)] CPB
DC RESET—MTRC (MTC+TMTRS)

(5) MTC:
AC SET—(DUA) (DIG) (MRF4) CPB
DC SET—(MRTC) [(MTIN=1)+(MTIN=2)] (MTPO=12)+($\overline{\text{BL-MTPA}}$) [(MTIN=4) +(MTIN=6)+(MTIN=8)+(MTIN=12) +(MTIN=14)]
AC RESET—(DUG) (DIG) (MC24) CPB
DC RESET—(MTC)

(6) MTGO:
AC SET—SSTP
DC SET—(MTL) (MTS) [(MTAD=9) (GO-9) +(MTAD=10) (GO-10)+(MTAD=11) (GO-11)+(MTAD=12) (GO-12) +(MTAD=13) (GO-13)]
AC RESET—CPB
DC RESET—(MTGO) (All Zeros) (MTS)+(DUG) (DIG) [(MTC)+(TMTRS)+(MTT)]

(7) MTT:
AC SET A—(DUA) (DIG) MRF4) CPB
DC SET A—(MTRC) [(MTIN=1)+(MTIN=3) +(MTIN=7)] ($\overline{\text{MTPO=12}}$)+[(MTIN=4) +(MTIN=6)+(MTIN=8)+(MTIN=12) +(MTIN=14)] (BL-MTPA)+(MTIN=2) ($\overline{\text{MTPO=12}}$) [($\overline{\text{MTPO=13}}$)+(MTAD-13)]
AC RESET—(DUG) (DIG) (MC24) CPB
DC RESET—MTT
DC SET B—(MC24) (MLRDA-15)
AC SET B—(DUF) (DIG) CPB (8) MTIN1:
DC SET—(MRH1)
AC SET—(DUA) (DIG) ($\overline{\text{BL-MRH}}$) (BL-MTIN) ($\overline{\text{MRE4}}$) CPB
DC RESET—MTIN1
AC RESET—(DUB)(DIG)(MTC+MTT+MTRS) CPB (9) MTIN2:
DC SET—(MRH2)
AC SET—SAME AS FOR MTIN1
DC RESET—MTIN2
AC RESET—SAME AS FOR MTIN1

(10) MTIN3:
DC SET—(MRH3)
AC SET—SAME AS FOR MTIN1
DC RESET—MTIN3
AC RESET—SAME AS FOR MTIN1

(11) MTIN4:
DC SET—(MRH4)
AC SET—SAME AS FOR MTIN1
DC RESET—MTIN4
AC RESET—SAME AS FOR MTIN1

(12) MTAD1:
DC SET A—(MRI1) ($\overline{\text{MLRDH-2}}$)+($\overline{\text{MTAD1}}$) (MLRDH-2)
AC SET A—(DUA) (DIG) ($\overline{\text{BL-MRH}}$) (BL-MTIN) ($\overline{\text{MRE4}}$) CPB
AC RESET A—(DUG) (DIG) (MTC+MTT +TMTRS) CPB
DC RESET A—MTAD1

(13) MTAD2:
DC SET A—(MRI2) ($\overline{\text{MLRDH-2}}$)+($\overline{\text{MTAD2}}$) (MLRDH-2)
AC SET A—SAME AS FOR MTAD1
AC RESET A—SAME AS FOR MTAD1
DC RESET A—MTAD2

(14) MTAD3:
DC SET A—(MRI3) ($\overline{\text{MLRDH-2}}$)+($\overline{\text{MTAD3}}$) (MLRDH-2)
AC SET A—SAME AS FOR MTAD1
AC RESET A—SAME AS FOR MTAD1
DC RESET A—MTAD3

(15) MTAD4:
DC SET A—(MRI4) ($\overline{\text{MLRDH-2}}$)+($\overline{\text{MTAD4}}$) (MLRDG-2)
AC SET A—SAME AS FOR MTAD1
AC RESET A—SAME AS FOR MTAD1
DC RESET A—MTAD4

(16) MTPX1:
DC SET A—($\overline{\text{MTIN=6}}$) ($\overline{\text{MTR}}$) ($\overline{\text{MTL}}$) (ALL ZEROS)
AC SET A—(DUG) (DIF) (MC24) CPB
DC RESET A—MTPX1
AC RESET A—CPB [(MTIN=2) (MTPO=13) +(MTPO=12) (MTIN=1)] [(MC24) (DUA) (DIG) (MTRC)]+(DUG) (DIG) (MTC+MTT +TMTRS) CPB

CHAPTER 11—ALLOTTER

The register-sender allotter 2A as the name indicates allots an idle sender to a register junctor. In allotting a sender to a register junctor a mechanical connection through relay matrix 2MX is made. This connection is necessary for signalling to group selectors 1GS after switching information has been obtained from translator 300. The allotter is seized for operation when sufficient digits have been dialed indicated by a particular Q sequence state read out of the memory (Chapter 5).

11.1 *General*

Register-sender allotter 2A establishes a connection between one of the register junctors 2RJ1–20 and a particular one of the senders 2S1–5 through relay matrix 2MX. In a register-sender group there are twenty register junctors each having access to any one of the five senders; a possibility of 100 mechanical connections. The connection is made in relay matrix 2MX by marking one of twenty register junctor leads and one of five sender leads thus pulling one of a hundred relays. The commands to mark the junctor and the sender leads are developed during sequence state (Q1).

Referring now to FIG. 20, idle senders are chosen through sender scanner counter 201 by viewing the idle test leads IT1–5 of the sender. If the register sender relay matrix fails to connect a register junctor to a particular sender, in the 16 milliseconds period between allotter seizure and allotter release, then a trouble command is developed informing the logic in the common control to start a disconnect cycle. If there is no indication of trouble the chosen idle test lead changes from an idle condition to a busy condition and the logic proceeds to the next sequence state.

The release of the allotter in sequence state (Q3) is accomplished by step command to the sender scanner counter 201.

11.2 *Operation*

Idle senders are chosen by the sender scanner counter 201. Each of the five senders has an idle test lead (IT1–IT5) in one of two states. Ground on the idle test lead indicates the sender is busy, whereas (−8) volts on the lead indicates the sender is available. An idle sender is found by scanning the idle test leads for an available sender (−8 volts). Clock pulses are supplied to sender scanner counter 201 by the command clock pulse scan [(CPB) (DIG)] [($\overline{B}$) ($\overline{DUB}$) ($\overline{SAV}$)+(Q3) (DUB)]. The normal scanning command is (CPB) (DIG) ($\overline{B}$) ($\overline{DUB}$) ($\overline{SAV}$) which indicates that during interval DIG and CPB the allotter is not busy ($\overline{B}$), the scanner is not looking at an idle sender $\overline{SAV}$, and we are not in memory row DUB. The remaining portion of the equation (CPB) (DIG) (Q3) (DUB) is the scanning command to step the counter when releasing the allotter. The sender scanner counter stops when an idle sender is found.

Sequence state Q1 is read out of the memory indicating that a sender is required. Hence the register junctor must seize the allotter to obtain an idle sender.

The command allotter available (AA) is formed when the allotter is not busy ($\overline{B}$) and a sender is available (SAV). With the allotter available, and sequence state (Q1), and memory row (DUB) gated together with CPB, clock pulses are provided to set one of the flip-flops in the junctor address 204. The time slot of a seized register junctor (DR1–DR20) provides the D.-C. set command to the particular register junctor flip-flop that is seizing the allotter. The twenty register junctor flip-flops allow storage of the particular register's address during the seizure sequence of the allotter. The junctor address flip-flop set to the one state provides the pull command (J1–J20) to mark one of twenty relays on the register portion of the matrix. The same command (DUB) (Q1) (AA) also sets a busy flip-flop which prevents more than one register at a time from establishing a connection to a sender. The output of the busy flip-flop gated with the sender through decoding matrix 203 provides one of the pull commands S1–5 to mark the sender portion of the relay matrix. These two marks allow two relay drivers to pull the appropriate relay establishing the connection between a particular register and a particular sender. When the pull commands are removed this relay connection is held operated by a hold flip-flop located in the seized sender.

Now that the sender has been allotted to a register junctor the sender's idle test lead should be busied within 16 milliseconds, or the allotter control logic 202 indicates allotter trouble (AT). This is an indication that the relay matrix failed to close the crosspoint connecting a sender to a register junctor. An indication of trouble causes the register junctor to proceed to a disconnect state. If the idle test leads have been busied in 16 milliseconds there is no indication of trouble and the release of the allotter (Q3) follows. When releasing the allotter the scanning command to step the counter to another sender address is (CPB)(DIG)(Q3)(DUB). However before the counter steps to another position the present sender's address is recorded in memory row (DUB) position (G). The step command also resets the busy flip-flop, and the junctors address flip-flop releasing the junctor pull command. The matrix connection is held by the hold flip-flop as explained earlier. At this point the cycle of operation for the allotter is completed.

CHAPTER 12—SENDER REGISTER

The sender register 2MS is primarily a buffer register that serves as a communication link between the common control logic and the senders. The MS register accepts readout digits from the memory upon request of the sender. The sender in turn transmits the digits to the switching stages. The information is transferred by parallel transmission between the MS register and the sender.

12.1 *General*

The sender register's functions are listed below:

(a) Provides a means of communication between the senders and the common control logic.

(b) Chooses the proper digits from memory storage to be transferred to the sender which includes switching digits (row DUF), and dialed digits (row DUC and DUD). The digits are stored two at a time in the digit store position of the MS register to await transfer to the sender.

(c) On request of the sender the MS register transfers the above mentioned digits to the sender for outpulsing.

(d) The sender register instructs the sender as to the correct mode of outpulsing desired: multifrequency, dial pulse, or code pulse.

(e) Provides the KP and the ST digits used to activate and deactivate the MF receivers. The KP digit which activates the receivers equals eleven, and is formed during sequence state (S3). The ST digit that deactivates the MF receivers equals twelve, and is formed during sequence state (S11).

(f) Instructs the sender to expect the J, T, and I digits from the group selector if the call is a charge call or requires ticketing. The sender transfers one digit at a time to the MS register for storage in the memory.

(g) The MS register accepts from the sender the J, T, and I digits in turn for storage in ferrite memory 2M. A counter is provided to identify the ticketing digits as they are received from the sender.

12.2 *Normal operation*

After successfully seizing a sender via the allotter, a register junctor provides the command (Q4) (S1) to be written in the memory. The command states that a register junctor has a sender during sender sequence state S1. After one logic cycle later this command is read out of memory 2M onto read register 2M. If a register junctor has a sender (Q4) or is in the process of disconnecting a seized sender (Q5), then the sender address stored in the MR register (position G of row DUB) is transferred to the sender address portion of sender register 2MS. The sender address identifies which sender of five the junctor is working with. The transfer occurs during row (DUB) interval (DIC).

Associated with each sender are two leads designated as SA and SR. These leads are gated with the above-mentioned sender address in interval DID to determine whether the sender is either requesting digits or requesting a disconnect state. The common control logic acts upon the SA and the SR commands in the following manner:

SA SR is the command to deliver two digits to the seized sender and proceed to the next sequence state. SA $\overline{SR}$ is a command to sequence to a disconnect state. $\overline{SA}$ $\overline{SR}$ is also a command to sequence to a disconnect state. SA SR is a command to rewrite the sender state that was read from storage (do nothing condition).

If the command SA SR is true after the sender address has been transferred, then the sender sequence state stored in read register 2MR is transferred to the sender instruction portion of sender register 2MS. The sender sequence states are decoded to form instructions to decide which two digits are needed from storage. As an example, sequence state (S1) from read register 2MR is transferred to the sender register and forms sender instructions MSINS1.

The digits when removed from memory storage on command SA SR are placed in the digit storage portion of sender register 2MS to await transfer to the sender. The two digits to be transferred are stored in flip-flop groups MSDA and MSDB. The decoded sender sequence states (instructions) are gated with the particular digit's position in read register 2MR to decide which digit should be buffer stored. From this gating arrangement the D.-C. set command chooses the particular digit to store in MSDA or MSDB. The A.-C. set command informs MSDA or MSDB when or during which row the digits are taken from. The dialed digits AN′N″–ANN′NNNN are stored in memory row DUC and DUD, while the switching digits ABCDHTUP are stored in memory row DUF. Table 12–1 lists the dialed digits and the switching digits in their digit store position (MSDA or MSDB) before transfer to the sender, and the digit's original position in the MR register. Also listed are the sender sequence states with their corresponding decoded sender instructions.

TABLE 12-1

| Sequence State | Instruction | MSDA Digit | Position | MSDB Digit | Position | Memory Row |
|---|---|---|---|---|---|---|
| S1 | MSINS1 | A | MRI | B | MRH | DUF |
| S2 | MSINS2 | C | MRG | D | MRF | DUF |
| S4 | MSINS4 | H | MRE | T | MRD | DUF |
| S5 | MSINS5 | U | MRC | P | MRB | DUF |
| S6 | MSINS6 | A | MRI | N' | MRH | DUC |
| S7 | MSINS7 | N'' | MRG | A | MRF | DUC |
| S8 | MSINS8 | N | MRE | N | MRD | DUC |
| S9 | MSINS9 | N | MRG | N | MRF | DUD |
| S10 | MSINS10 | N | MRE | N | MRD | DUD |

As an example of digit store in sender register 2MS the command SA SR in sequence state (S1) calls for two switching digits (A) and (B) from memory row DUF. From Table 12–1 decoded sequence state (S1) is the sender instruction MSINS1 for digit (A) in position MRI, and digit (B) in position MRH of memory row DUF. Since digit (A) in position MRI can be either a switching digit (instruction MSINS1) or a dialed digit (instruction MSINS6), both quantities are gated together with position MRI to form the D.-C. set of MSDA. The A.-C. set to MSDA has the instructions gated with the memory row to distinguish between a switching digit row (DUF) and a dialed digit row DUC. Digit (A) is then stored in MSDA. Digit (B), however, appears in position MRH and to distinguish between switching digit (B) (position MRH, memory row DUF) and dialed digit (N') (position MRH, memory row DUC) a gating arrangement for MSDB is needed that is similar to MSDA. With this arrangement digit (B) is stored in MSDB.

At the same time the sender's sequence state in read register 2MR is transferred to sender register 2MS any necessary sender instructions are transferred to sender register at (DUB) (DIG). The sender instruction commands are developed by an analysis of the S and I digit and stored on flip-flops located in the sender control portion of sender register 2MS. These commands are listed below:

MSMF–S is a command to inform a sender that multifrequency (MF) outpulsing is required.

MSDP–S is a command to inform a sender that dial pulse (DP) outpulsing is required.

MSDPS–S is a command to inform the sender to expect a dial pulse stop indication.

MSES–S is a command to inform a sender that sufficient digits have been delivered and end of sending is true.

MSH–RS is a command to inform a sender that the common logic is starting a disconnect cycle.

MSTI–S is a command informing the sender that the call required ticketing therefore to expect the ticketing digits J, T, and I.

MSTI–RS is a command to inform a sender that the three ticketing digits J, T, and I have been received by the sender register for storage in the memory.

MSTID–RS is a command to the sender to erase the ticketing digits from the digit store in the sender STID flip-flops. This command informs the sender that the ticketing digit has been placed in memory storage.

The sender's sequence states are formed by an analysis of positions MRH and MRI during memory row DUB which are the SD and ID digits respectively. The SD digit is a sender instruction as to the correct mode of outpulsing; multifrequency (MF), code pulsing (CP), or dial pulsing (DP). The SD digits nine through sixteen are the instructions needed when the call is ticketing. The ID digit located in memory row DUB position MRI is a sender instruction used primarily for deletion of digits.

When multifrequency (MF) outpulsing is desired (SD=1+7+9+13) two strapped digits KP=11 and ST=12 are needed to activate and deactivate the (MF) receivers respectively. The KP digit is stored in MSDB during sequence state S3 when activating the (MF) receivers, and the ST digit is also stored in MSDB during sequence state S11 when deactivating the (MF) receivers.

Digits are deleted on the delete command from the sender control portion of sender register 2MS. The deletions occur when the ID digit equals one to seven. The delete command inhibits digit storage flip-flop group MSDA preventing the DA digit from being sent to the sender.

12.3 *Information transfer*

The two digits from the memory and the sender instructions are transferred to sender register 2MS during (DUB) (DIG) for temporary storage. The sender's address gated with CPB at time (DUG) (DIG) provides clock pulses (CPMS1–CPMS5) to the respective sender. These clock pulses allow the information from sender register 2MS to be transferred to the seized sender. At time (CPA) (DUG) (DIGA) sender register 2MS is cleared for use by other junctors wishing to communicate with their seized senders.

12.4 *Ticketing operation*

Ticketing or charge calls are recognized by the value of the (SD) digit received by transfer register 2TR from the translators. If the (SD) digit has a value of 9 to 15, then ticketing is assumed.

The sender is informed that the call is ticketed by the instruction MSTI–S occurring during sender sequence state Q4 S2. The command MSTI–S originates in sender register 2MS during sequence state S2 when the (SD) digit has a value of 9 to 15. In effect MSTI–S informs the sender to expect the J, T, or I ticketing digits from groups selector 1GS. The J digit is the drum address of ticker 300. The T and I digits are the trunk identity digits. The sender, instructed that the call is ticketing, receives the J, T, and I digits from group selector 1GS and places these digits one at a time into the sender store. The digits are now ready to be taken by sender register 2MS.

After instructing the sender that the call is ticketing, the common control logic starts a count in MRE of row DUB. Position MRE counts the number of digits accepted for storage by sender register 2MS as follows:

TABLE 12-2

| COUNT | | | COMMAND |
|---|---|---|---|
| MRE1 | MRE2 | MRE3 | |
| 1 | 1 | 1 | No digits received as yet. |
| 1 | 1 | 0 | MS has received the J digits. |
| 1 | 0 | 0 | MS has recived the T digit. |
| 0 | 0 | 0 | MS has received the I digit (final). |

The common control logic steps the MRE counter when there is a ticketing digit available for storage over the sender ticketing leads, and when there is a count in position MRE. When the last digit is received by sender register 2MS command MSTI–RS informs the sender that sender register 2MS has received the three ticketing digits. After changing the write commands of the MRE counter the ticketing digit is placed in memory storage. The location for storage of the received digit is in position (I) row DUG for the J digit. The T and I digits are stored in row DUC position (B) and position (A) respectively. The sender is informed when the digits are stored one at a time in the memory by the MSTID–RS command developed in sender register 2MS. MSTID–RS clears the sender store at time DUG DIG.

A step by step sequence of events for the operation of a ticketing call follows: At the command (SA SR) (Q4 S2) (SD=9+10+11+12+13+14+15) then:

(a) Command MSTI–S developed in the sender register informs the sender to expect the J, T, and I digits.

(b) During DUB the count 111 is written in MRE1, MRE2, and MRE3 stating that no ticketing digits have been received as yet.

When a ticketing digit is available ($\overline{\text{BL–MSTID}}$) and there is a count (111) in MRE during DUB after (Q4) (S2) then:

(c) MSTID–RS is set with ($\overline{\text{BL–MRE}}$) ($\overline{\text{BL–STID}}$) during (DUB) (DIG) (CPB) informing the logic that the digit will be stored in the memory, therefore erase the ticketing digit in the sender store at completion of cycle.

(d) Since digits are now available ($\overline{\text{BL–STID}}$), the MRE counter is gated with this command to change the count in MRE according to Table 12–2. Thus, the write commands of the trunk identity count will vary during DUB, as the J, T, and I digits are transferred to the sender register.

(e) Transfer the previous count in the MRE counter to the MSTIC counter in the sender register which identifies each digit for proper storage in the memory.

(f) Place the ticketing digit in storage as directed by the MSTIC counter. The J digit is stored in row DUG position (I). The T digit is stored in row DUC posirion (B). The final digit I is stored in row DUC position (A).

(g) The sender is informed by command MSTI–RS that the register sender has obtained the three trunking digits, (MRE1) ($\overline{\text{MRE2}}$) during DUB

12.5 *General equations*

The following list of equations covers the logical commands for the sender register and are grouped under the headings of sender control, sender gating, sender storage, sender address, and sender instruction.

All A.-C. reset commands for the sender register are (CPA) (DUG) (DIGA). All D.-C. reset commands are the one output of the respective flip-flops unless otherwise stated.

SENDER CONTROL:

MSMF–S:

D.-C. Set=S3
A.-C. Set=(SR SA) (Q4+Q5) (DUB) (DIG) (CPB)

MSDP–S:

D.-C. Set=(SD3+SD11) (S6+S7+S8+S9) +(SD6+SD14) (S4)
A.-C. Set=(SR SA) (Q4+Q5) (DUB) (DIG) (CPB)

MSDPS–S:

D.-C. Set=(SD2+SD10) (S6+S7+S8+S9) +(SD7+SD15) (S4)
A.-C. Set=(SA SR) (Q4+Q5) (DUB) (DIG) (CPB)

MSDEL–S:

D.-C. Set=(ID1) (S6)+(ID3) (S7)+(ID5) (S8)
A.-C. Set=(SA SR) (Q4+Q5) (DUB) (DIG) (CPB)

MSES–S:

D.-C. Set=S14
A.-C. Set=(SA SR) (Q4+Q5) (DUB) (DIG) (CPB)

MSH–RS:

D.-C. Set=Q5
A.-C. Set=(CPB) (DUB) (DIC) (Q4+Q5)

MSTI–S:

D.-C. Set=(S2) (SD9+SD10+SD11+SD12 +SD13+SD14+SD15)
A.-C. Set=(SA SR) (Q4+Q5) (DUB) (DIG) (CPB)

MSTI–RS:

D.-C. Set=($\overline{\text{STID–BL}}$) (MRE1) ($\overline{\text{MRE2}}$)
A.-C. Set=(SA SR) (Q4+Q5) (DUB) (DIG) (CPB)

MSTID–RS:

D.-C. Set=($\overline{\text{BL–STID}}$) ($\overline{\text{BL–MRE}}$)
A.-C. Set=(CPB) (SA SR) (Q4+Q5) (DUB) (DIG)

SENDER GATING:

SA:

D.-C. Set=(S1A) (MSADS1)+(S2A) (MSADS2) +(S3A) (MSADS3)+(S4A) (MSADS4)+(S5A) (MSADS5)
D.-C. Reset=−8 volts
A.-C. Set=(DUB) (DID) (CPB)

SR:

D.-C. Set=(S1R) (MSADS1)+(S2R) (MSADS2) +(S3R) (MSADS3)+(S4R) (MSADS4)+(S5R) (MSADS5)
D.-C. Reset=−8 volts
A.-C. Set=(DUB) (DID) (CPB)

STID1=(S1TID1) (MSADS1)+(S2TID1) (MSADS2) +(S3TID1) (MSADS3)+(S4TID1) (MSADS4) +(S5TID1) (MSADS5)

STID2=(S1TID2) (MSADS1)+(S2TID2) (MSADS2) +(S3TID2) (MSADS3)+(S4TID2) (MSADS4) +(S5TID2) (MSADS5)

STID3=(S1TID3) (MSADS1)+(S2TID3) (MSADS2) +(S3TID3) (MSADS3)+(S4TID3) (MSADS4) +(S5TID3) (MSADS5)

STID4=(S1TID4) (MSADS1)+(S2TID4) (MSADS2) +(S3TID4) (MSADS3)+(S4TID4) (MSADS4) +(S5TID4) (MSADS5)

$\overline{\text{BL–STID}}$=(STID1)+(STID2)+(STID3)+(STID4)

SENDER STORAGE:

MSDA1=D.-C. Set=(MRC1) (MSINS5)+(MRE1) (MSINS4+MSINS8+MSINS10)+(MRG1) (MSINS2+MSINS7+MSINS9)+(MRI1) (MSINS1 +MSINS6)
A.-C. Set=(CPB) (MSDEL) (DIG) [(DUF) (MSINS1+MSINS2+MSINS4+MSINS5)+(DUC) (MSINS6+MSINS7+MSINS8)+(DUD) (MSINS9 +MSINS10)+(DUF) (MSINS11+MSINS3)]

MSDA2=D.-C. Set=(MRC2) (MSINS5)+(MRE2) (MSINS4+MSINS8+MSINS10)+(MRG2) (MSINS2+MSINS7+MSINS9)+(MRI2) (MSINS1 +MSINS6)
A.-C. Set=Same as MSDA1

MSDA3=D.-C. Set=(MRC3) (MSINS5)+(MRE3) (MSINS4+MSINS8+MSINS10)+(MRG3) (MSINS2+MSINS7+MSINS9)+(MRI3) (MSINS1 +MSINS6)
A.-C. Set=Same as MSDA1

MSDA4=D.-C. Set=(MRC4) (MSINS5)+(MRE4) (MSINS4+MSINS8+MSINS10)+(MRG4) (MSINS2+MSINS7+MSINS9)+(MRI4) (MSINS1 +MSINS6)
A.-C. Set=Same as MSDA1

MSDB1=D.-C. Set=(MRB1) (MSINS5)+(MRD1) (MSINS4+MSINS8+MSINS10)+(MRF1) (MSINS2+MSINS7+MSINS9)+(MRH1) (MSINS1 +MSINS6)+(MSINS3)
A.-C. Set=(CPB) (DIG) [(DUF) (MSINS1 +MSINS2+MSINS4+MSINS5)+(DUC) (MSINS6 +MSINS7+MSINS8)+(DUD) (MSINS9 +MSINS10)+(DUF) (MSINS11+MSINS3)]

MSDB2=D.-C. Set=(MRB2) (MSINS5)+(MRD2) (MSINS4+MSINS8+MSINS10)+(MRF2) (MSINS2+MSINS7+MSINS9)+(MRH2) (MSINS1 +MSINS6)+(MSINS3)
A.-C. Set=Same as MSDB1

MSDB3=D.-C. Set=(MRB3) (MSINS5)+(MRD3) (MSINS4+MSINS8+MSINS10)+(MRF3) (MSINS2+MSINS7+MSINS9)+(MRH3) (MSINS1 +MSINS6)+(MSINS11)
A.-C. Set=Same as MSDB1

MSDB4=D.-C. Set=(MRB4) (MSINS5)+(MRD4) (MSINS4+MSINS8+MSINS10)+(MRF4) (MSINS2+MSINS7+MSINS9)+(MRH4) (MSINS1 +MSINS6)+(MSINS11)
A.-C. Set=Same as MSDB1

SENDER ADDRESS:

MSAD1
D.-C. Set=MRG1
A.-C. Set=(CPB) (DUB) (DIC) (Q4+Q5)

MSAD2
D.-C. Set=MRG2
A.-C. Set=Same as MSAD1

MSAD3
D.-C. Set=MRG3
A.-C. Set=Same as MSAD1

SENDER INSTRUCTION:

MSIN1
D.-C. Set=MRC1
A.-C. Set=(CPB) (DUB) (DIC) (Q4+Q5) (SA SR)

MSIN2
D.-C. Set=MRC2
A.-C. Set=Same as MSIN1

MSIN3
D.-C. Set=MRC3
A.-C. Set=Same as MSIN1

MSIN4
D.-C. Set=MRC4
A.-C. Set=Same as MSIN1

CHAPTER 13—COMMON CONTROL

The register-sender design was accomplished by dividing the system into a number of functional parts each of which was designed largely independently of the others. The design of the functional parts have been described in the preceding chapters. There now remains the problem of designing and providing the coordinating circuits to control the functional parts and thus ensure the proper operation of the system. The coordinating circuits is the common control 2CC.

The circuits of the common control network are closely interwoven. The common control 2CC is divided into three major parts: the carry register (MC), decoding logic (ML), and the write commands (MW).

The write commands provide the main coordinating circuits for control of the system operation. The circuits of the write commands can themselves be divided into three general classifications: decision networks, timing networks, and arrangement networks. The decision and timing networks provide the necessary system controls while the arrangement networks assures the correct storage location of information in the memory.

The carry register (MC) controls the write commands access to information in storage and the ML circuitry decodes the stored information so that it is available to the write commands in a usable form.

13.1 *General description*

The general operation of the common control can be simplified into the following sequences:

(a) A row in ferrite memory 2M is read and temporarily stored in read register 2MR. At this time some instructions and controls are available for the external circuits by decoding the memory readout, or directly from read register 2MR (if decoding is not required). The controls that will be available will depend on which of the various junctor memory rows are stored in the read register. Thus during time DUB controls are available for allotter 2A and sender register 2MS since DUB is the sender control word; while during DUA (the register control word), controls or instructions are available for transfer register 2TR and access circuitry 2MM.

(b) Next, the decision and timing networks of the write commands analyze the external circuit signals. On information obtained from the signals, along with information present in the read and carry registers the decision networks determine the present state of system operation and any new controls or instructions required for the external circuits.

TABLE 13-1

| 1 | 2 | 3 | 4 | 5 | 6 | 7 | 8 |
|---|---|---|---|---|---|---|---|
| Cycle Time | Memory Circuit Control Information | External Circuit Controls | Action Based on Circuit Controls | External Circuit Signals | Memory Read-out Decision Information | Decisions Based on 6 and 7 | Remarks |
| $t_1$ | $Q_0$ | None | None | (ignored) | $Q_0$(MCW2) ($\overline{BL}-\overline{MRH}$) | Write state $Q_1$ | In DUB. |
| $t_2$ | $Q_1$ | $Q_1$ | If $Q_1$ AA seize allotter and store junctor's identity. | A A | $Q_1$ | Write state $Q_2$ | In DUB. |
| $t_2$ | $Q_1$ | $Q_1$ | If $Q_1$ $\overline{AA}$ do nothing. | $\overline{AA}$ | $Q_1$ | Rewrite state $Q_1$ | In DUB. |
| $t_3$ | $Q_2$ | None | None | $\overline{AA}$ (ignored) | $Q_2$ | Write state $Q_3$ | In DUB. |
| $t_4$ | $Q_3$ | $Q_3$ | Release and clear allotter. | $\overline{AT}$ | $Q_3$ | Write state $Q_4$ transfer sender identity. | In DUB. |
| $t_4$ | $Q_3$ | $Q_3$ | Release and clear allotter. | AT | $Q_3$ | Write state $Q_5$ transfer sender identity set MCTS in register. | In DUB. |

(c) The arrangement gates of the write commands take the results of the decision networks and store them in the appropriate memory position of the same memory row in storage in read register 2MR. Then one system cycle later when this memory row is read out of storage, new controls and instructions (obtained from the decision and timing networks) become available for the external circuits, and the sequences presented in *a, b* and *c* repeat themselves.

To help illustrate the common control operation a particular example, the seizure of a sender, is discussed. As background to the example, let us assume that the call being processed by the register-sender group is a local call, and all digits have been dialed. The local junctor handling the call is JR5 and allotter 2A chooses sender 2S3. In this example the discussion is limited to the steps and controls involved in obtaining a sender, which restricts the operation to row DUB. As an aid in the explanation, refer to Table 13–1 which lists the various operations in sequential order.

At time $t_1$ the contents of row DUB are stored in read register 2MR. The ML logic decodes position D for control information. If the decoded value of position D is 0000 or $Q_0$ then no external controls or allotter action is performed (columns 3 and 4). At this time the allotter signals are ignored (column 5); and the decision network either rewrites idle ($Q_0$) or writes $Q_1$. If $Q_0$ (MCW2) ($\overline{BL-MRH}$) is true, meaning there is no sender assigned to the junctor ($Q_0$), the subscriber has finished dialing (MCW2), and there is a sender instruction digit ($\overline{BL-MRH}$) then $Q_1$ is written into position D of row DUB. Thus the decision networks, in this instance, indicates $Q_1$ if $Q_0$ (MCW2) ($\overline{BL-MRH}$) is true and the arrangement network writes $Q_1$ into storage in position D.

One logic cycle later (8 msec.) during row DUB, $Q_1$ becomes available on readout in read register 2MR. $Q_1$ is an external control to allotter 2A, indicating a request for service (column 3). If the allotter is idle, it stores the junctor's address (JR5) and at time DUB DIG set the allotter busy flip-flop. The decision network views the allotter signal before time DUB DIG. Thus, if the decision network sees AA with $Q_1$ in storage, it advances the Q states from $Q_1$ to $Q_2$, where $Q_2$ indicates the allotter has been seized. Since allotter 2A is not time divided, junctor RJ5 is the only junctor in state $Q_2$. If the allotter is busy or $\overline{AA}$ is true, the decision network rewrites $Q_1$ in the register associated with junctor RJ5, and the sequence $t_2$ repeats once a system cycle until the allotter is available (AA).

Assuming that during cycle time $t_3$, $Q_2$ is read out of memory storage (column 2); then at this time columns 3 and 4 indicate that no controls or actions are required. The decision circuit ignores the allotter signal $\overline{AA}$ and bases its decision merely on the occurrence of state $Q_2$. The decision circuit on seeing $Q_2$ writes $Q_3$ in storage; this allows an 8 msec. time delay for establishing the register-sender matrix connection.

During cycle $t_4$ the state $Q_3$ is stored in the memory readout. $Q_3$ is a control lead to allotter 2A indicating when true, that the allotter should return to the idle state to allow service to other register junctors. The decision circuit on seeing state $Q_3$ accepts from allotter 2A the identity of the sender connected to junctor RJ5. (In this example, sender 283). The decision circuit then views the allotter signal AT (allotter trouble) to determine the next system sequence. If $\overline{AT}$ is true (no trouble) then the normal sequence $Q_4$ is written into storage, indicating a sender has been assigned to junctor RJ5. However, if AT is true state $Q_5$ is written into the memory and the MCTS flip-flop set to the one state in the carry register. Having MCTS in the carry register true is a trouble indication and a request for a disconnect cycle. In this case, the disconnect cycle requests a trouble recorder since the allotter 2A failed to establish a connection between a sender and a junctor. Writing state $Q_5$ (through with sender) in the register associated with register junctor RJ5 prevents junctor RJ5 from attempting to obtain a sender while awaiting the trouble recorder.

As previously mentioned, the write commands provide the main coordinating circuits for control of the system operation. This statement was emphasized by the predominant role of the write commands in controlling the allocation of a sender to a junctor in the given example. The following sections of this chapter will treat in detail the write commands as used in the design of the register-sender group.

13.2 *Write commands general format*

In the preceding chapters, the design of individual circuits of the register-sender group always assumed any necessary information from memory storage would be available on readout in read register 2MR. The portion of logic that controls what information is to be placed in storage is the "write commands," and can be considered the heart of the common control 2CC. Before entering a detailed discussion of the write commands an outline of the memory circuitry interworking with the write commands is discussed.

The ferrite memory, being word orientated, stores a word (36 bits of information) during the write interval DIF. The individual bits of storage, within a word, require a coincidence of current pulses in the X and Y axes to store a one. The X drivers pulse a row of cores during interval DIF. Assuming information to be written into row DUB then the current pulse DUB DIF supplies half of the current necessary to switch the cores in that row. The digit drivers, in the Y axis, provide the remaining half current pulses during interval DIF for those cores storing a logical one. Thus the digit drivers control the storage of information by providing or withholding current pulses in the Y axis. The input to the digit driver is arranged similar to an "and" gate such that there is an output pulse only on coincidence of input signals. The write commands provide a −8 volt signal (logical one) to the digit drivers when a one is to be stored. A ground signal from the write commands inhibits a Y axis pulse and prevents a change of state in the ferrite core, thus storing a zero (a zero being the absence of a one). The requirements for the write commands to store information then is the provision of a logical one or zero during the write interval of the various memory rows on a per bit basis in the Y axis. Care must be taken to insure the logical gate chains formulating the write commands have had sufficient time to settle, so that on the arrival of the write interval, a constant signal is available for the digit drivers.

Referring now to FIG. 21, which is a simplified representation of write commands MWA1 and MWA2, the write commands have the following symbolism. An MW prefix indicating "memory write" followed by a position location (A through I) then followed by a bit position (1 through 4). Thus, MWA1 indicates the write command for position A, bit 1 for a memory word. Since a particular row is not mentioned in the symbol MWA1, the write command includes all rows for a particular bit position. When speaking of bit within a row the write command is suffixed by the row's symbol. Then MWA1 (DUB) would indicate the write command for bit 1 of position A of row DUB.

Output signal MWA1 is time divided by the various row time slots DUA through DUG. The output signal then provides a logical signal (1 or 0) in synchronism with the X drivers in memory 2M, thus placing information in the various memory rows. Logical decision networks contain, as the name implies, the logic that decides whether a zero or a one ought to be written into a particular bit. Arrangement gates 2101–9 are used to provide the proper output in time sequence for the digit drivers. All the bits for a register's memory word requires 354 arrangement gates and 252 decision networks. Since each decision network, in itself, contains several gates the expense of implementing such an arrangement of write commands becomes readily apparent.

A means of reducing the number of gates required in the write commands lies in combining the individual decision networks to several common decision networks such as common decision network 2110. A common decision network is used for other bit positions in the same row as well as for bits in different rows. Thus, due to the folded memory, logical gates are saved by combining gates both horizontally within a row or vertically among several rows.

Common decision networks allow the arrangement gates to be grouped in those areas where the common networks are used. The "or" gate 2103, in the example, combines time slots DUB, DUC, DUD, DUE, and DUF. These time slots are used in conjunction with common decision network 2110 to formulate the write commands for MWA1 and MWA2, for rows DUB, DUC, DUD, DUE, and DUF. The savings in arrangement gates is dependent on the use of common decision networks.

The common decision networks are developed by analysis of the type of information in memory storage, attempting to find similarities that may be grouped. The grouping of terms are referred to as logical formats, because the information or terms contain common properties that lend to a general arrangement. The common decision networks can be either part of a logical format or the logical format itself.

The vast majority of information in storage in the ferrite memory is not acted upon or changed by the register-sender logic. This passive storage is provided by the register-sender group for circuits external to the register-sender group; as switching stages, translators, and ticketers. The sender switching digits, line identity digits, line number translation and the dialing pattern can generally to considered passive storage, because once accepted for storage they are not changed on readout but merely rewritten until completion of the duties of the register-sender group. The register-sender group on completing its function of processing a call erases all storage in a register, pertaining to that call. This allows the register junctor to service other subscribers.

The above discussion presented two important points. First, the majority of information in storage is rewritten; and secondly, all information is erased on completion of the register-sender duties. Therefore, a general format (or decision network) must have an erase or write zero (W0) command and rewrite (R*w*) command. A suitable form for the general format might then be $\overline{W0}$ (R*w*) indicating if zero is not rewritten then rewrite. In order to rewrite information must be placed into storage, thus indicating the existence of a write one (W1) command. The common format can then be stated as $$\overline{W0}=(W1+Rw) \quad (1)$$

A further look at the write one command of Equation 1 is of interest. The $W_1$ command is the means by which information is initially placed in storage, information being kept in storage by the rewrite command. Information for storage is created logically, as in sequence states and counters or is obtained by transfer or communicating circuits, as the sender or transfer register. In the register-sender group the majority of information is obtained from transfer register 2TR, thus the write one command $W_1$ is changed to $K_5$ $MTP_x$. Where $K_5$ $MTP_x$ means that under certain logical situations $K_5$, the memory accepts information from a particular position $P_x$ of the transfer register $MTP_x$. When the write command states "take from the transfer register," the rewrite command in reality states "take from the read register." Equation 1 can now be stated in the following manner:

$$MW_x=\overline{W0}[(K_5)\ (MTP_x)+(\overline{K_5})\ (MR_x)] \quad (2)$$

The term $x$ indicates the particular bit position of interest, and $(\overline{K_5})$ $(MR_x)$ is the rewrite command.

Having developed a common format as represented by Equation 2 the next point of interest is to determine how inclusive this format is in providing write commands. FIGURE 22 is a simplified chart of the memory layout and the cross-hatched areas are those positions whose write commands can be provided by the format in Equation 2. Included are several spare positions, position D of row DUD and position F of row DUB. A large part of rows DUC and DUD (indicated by slanted lines) cannot be included in the present format since these positions require special deletion commands for the arrangement of dialed digits. For example positions G, H, and I or rows DUC and DUD delete certain prefix codes in the subscribers dialing pattern. If the delete commands required in rows DUC and DUD were incorporated in the W0 command of the general format, then the format would include these positions. Several new quantities of the form $K_1$ are then developed for this purpose and the general format becomes:

$$MW_x=\overline{(K_{1x})}\ [(K_5)(MTP_x)+\overline{(K_5)}(MR_x)] \quad (3)$$

where $K_1$=general clear (W0) and special delete commands, and X=the memory position where the command is employed.

Referring once more to FIG. 22, the register control word appearing in DUA and DUG provides an interesting problem. Since the register control word appears twice in a junctor's time slot ($DR_x$), information can be placed in and taken from storage in either time. It was decided that although the ability to update the register control word in both DUA and DUG might provide some additional flexibility, it would also unnecessarily confuse the timing sequences; i.e., it would increase the complexity of the logical design, because information could vary in the same bit location within a junctor's time allotment. If, the register control word storage remains unchanged in time DUA, as information obtained on readout would just be rewritten, and the changing of information left to time DUG several advantages are obtained. First, logical timing is simplified as sequence states, counters, instructions, etc., are only changed during DUG and, secondly, since row A contains only the rewrite commands it can now be considered part of the general format.

The general format now includes both cross-hatched and slanted areas, or nearly 70 percent of a register's memory. It was previously mentioned that when employing a common format a further savings is possible by combining the arrangement gates. The method used to group the arrangement gates can be seen by referring once more to FIG. 22. The write commands for positions H and I of rows DUA, DUB, DUC, DUD, DUE, and DUF are provided by the common format, so that a common arrangement gate $$DUA+DUB+DUC+DUD+DUE+DUF=\overline{DUG}$$

can be used for these positions. In the same manner the common arrangement gate for positions E and G is $\overline{DUB+DUG}$. These common gates are signified by a new quantity $K_{3x}$ where $K_3$ indicates a common arrangement gate and X the memory position where it is employed. Equation 3 then becomes:

$$MW_x=\overline{(K_{1x})}(K_{3x})\ [\overline{(K_5)}(MR_x)+(K_5)(MTP_x)] \quad (4)$$

Equation 4 is the general format used in the write commands for the register-sender group. The quantities are listed in the first column of Table 13–2. The second column lists the derivations of the quantities.

TABLE 13–2
General Format

| Arrangement and Decision Quantities | Logical Derivation |
|---|---|
| $K_5$ | (MC24)(MTC) [(DUF+DUB)(MT1N=4+8 12+14) +(DUE)(MT1N=2+6)] |
| $\overline{K_{3(B)}}$ | =(DUA+DUE+DUF)′ |
| $\overline{K_{3C}}$ | =(DUA+DUC+DUE+DUF)′ |
| $\overline{K_{3D}}$ | =(DUA+DUC+DUD+DUF)′ |
| $\overline{K_{3(E+F+G)}}$ | =(DUB+DUG) |
| $\overline{K_{3(H+I)}}$ | =(DUG) |
| $K_{1D}$ | (DUC) (MLZ12) |
| $K_{1(E+F)}$ | (DUD) (MCX14) $(\overline{MCD})$ +(DUC)(MLZ12) |
| $K_{1G}$ | {$\overline{[(MLZ1)+(MLZ2)+(MLZ10)]}$ (MLRD3)+(MLZ10) +(MCX14)$(\overline{MCD})$} (DUD)+(MLZ10)(DUC) |
| $K_{1H}$ | {[(MLZ1)+(MLZ2)+(MLZ10)] (MLRD3)+MLZ10} (DUD)+(DUC) (MLZ10) |
| $K_{1I}$ | [(MLZ1)+(MLZ2)+(MLZ10)] [(DUC)+(DUD)] |
| $\overline{K_5}$ | Inverse of constant $K_5$ |

It was previously mentioned the term $K_5$ indicated the logical situations where the memory accepts information from the transfer register. This constant, which can be considered as a common decision network, is evaluated as:

$$(MC24)(MTC)\ [(DUF+DUB)\ (MT1N=4+8+12+14)+(DUE)\ (MT1N=2+6)]$$

where (MC24)(MTC) states the transfer register has completed its duties (MTC), and the time slot of the junctor awaiting information is available (MC24). The term (DUF+DUB) (MT1N=4+8+12+14) signifies that for certain decoded values (X instructions) of the MT1N flip-flops information is placed in rows DUB and DUF of the memory. In the same manner $$(DUE)(MT1N=2+6)$$

states that for the decoded values of (2 or 6) in the MT1N flip-flops information is placed in row DUE.

The common arrangement quantities $K_{3x}$, as previously explained, state what rows, for a particular position, are provided write commands by the general format. Thus $K_{3B}$=(DUA+DUE+DUF) states that in position B of the memory, rows DUA, DUE, and DUF have their write commands provided by the general format.

The $K_{1x}$ quantities were to provide both a general clear (W0) command and special delete commands. FIG. 23 shows a possible implementation of the general format:

$$MWXY=\overline{MCE}\ [\overline{K1X}\ K3X\ (\overline{K5}\ MRX+K5\ MTPX)+Z]$$

The A functions are those miscellaneous write commands not provided by the general format. The general system clear command MCE is obtained from the carry register (Chapter 9) and is shown separately from the $K_{1x}$ constant. By providing a common clear command (MCE) the general format and the miscellaneous write commands need not duplicate this function, resulting in savings from a circuit loading viewpoint. Thus, the $K_{1x}$ quantity need just provide the special delete commands required in rows DUC and DUD. These delete commands have the following derivation:

(a) $K_{1D}$=DUC MLZ12 states that position D of row DUC should be deleted when MLZ12 is true. MLZ12 states that the call in progress is an extended area call, future numbering plan, requiring the deletion of positions D, E, and F of row DUC. These positions are deleted to insure only three digits (office code) are taken from row DUC for a translation.

(b) $K_1$(E+F)=DUC MLZ12+DUD MCX14 $\overline{MCD}$ (1) DUC MLZ12 is provided for the same reasons as given in part "a" above.

(2) DUD MCX14 $\overline{MCD}$ is provided so that on the first recognition of a foreign area call $\overline{MCD}$ MCX14 positions E, F, and G of row DUD can be deleted to provide storage space for the called party's station number. At the time of deletion, positions E, F, and G of row DUD will be storing the dialed office code.

(c) $K_1$(I)=[(MLZ1)+(MLZ2)+(MLZ10)] (DUC+DUD) states that position I shall be deleted in rows DUC and DUD if MLZ1 or MLZ2 or MLZ10 is true. MLZ1 and MLZ2 indicate a ticketing prefix digit, while MLZ10 states either a home area code or ticketing code have been dialed. In the MLZ10 case positions G and H will be deleted, along with I in rows DUC and DUD.

(d) $K_1$(H)=[($\overline{MLZ1+MLZ2+MLZ10}$) MLRD3 +MLZ10] DUD+DUC MLZ10

(1) (DUC) (MLZ10)+(MLZ10) (DUD) states that position H of rows DUC and DUD will be erased if MLZ10 becomes true. The reason being the same as presented above for c.

(2) [$\overline{(MLZ1)+(MLZ2)+(MLZ10)}$] (MLRD3) (DUD): in this term MLZ10 has no logical meaning and occurs in forming the term $\overline{(MLZ1)+(MLZ2)+(MLZ10)}$ by complementing (MLZ1)+(MLZ2)+(MLZ10) of constant $K_1$(I). The useful term then becomes $\overline{(MLZ1)+(MLZ2)}$ (MLRD3) (DUD) which states that if three digits (MLRD3) have been dialed and the commands MLZ1 and MLZ2 are not true then delete position H of row DUD. This command is used to arrange the dialed station number in row DUD, by deleting positions G and H after three digits have been dialed. The next four digits (the station number on seven digit calls) will then be stored in positions D, E, F, and F.

(e) $K_1(G_1)$=[$\overline{(MLZ1)+(MLZ2)+(MLZ10)}$ MLRD3 +MLZ10+MCX14 $\overline{MCD}$] DUD+MLZ10 DUC (1) The term MLZ10 (DUC+DUD) will delete position G for reasons explained in c.

(2) The term $\overline{(MLZ1)+(MLZ2)+(MLZ10)}$ (MLRD3) (DUD) will delete position G for reasons explained in d–2.

(3) The remaining term (MCX14) ($\overline{MCD}$) (DUD) will delete position G for the same reasons as explained in b–2.

Having outlined the general format and common terms employed in the write commands of the register-sender group, the remaining write commands can now be investigated. These commands can generally be classified into two formats: counting logic and miscellaneous logic.

13.3 *Sender sequence states*

In the sender sequence states, the process of going from one state to another is a function of the S and I digits received from the translators. Therefore the write one and write zero commands for position C of row B are functions of the S and I digits.

The write command format for this position is $\overline{\text{write zero}}$ (write one+rewrite). That is, to write a one, it is necessary that a write zero command be not true and a write one command be true or that a rewrite command be true. A write command will be true when a sequence state is entered that contains a one for a bit that was true from the previous state. For example, when going from sequence state four to sequence five the binary weighted four (MRC3) will be rewritten.

Both the write one and write zero commands for MRC1, MRC2, MRC3, and MRC4 are given in Tables 13–3 to 13–10; constants used in the write commands are then listed to reduce the expressions to a manageable size. These expressions (the write commands) follow the listing of the constant quantities.

The four bits in position C are weighted as follows:

MRC1—Binary 1
MRC2—Binary 2
MRC3—Binary 4
MRC4—Binary 8

A write one command for MRC1 should be true whenever an odd numbered sequence state is entered from an even numbered sequence state. Therefore, the commands to say write one for bit MRC1 are listed in the following table:

TABLE 13-3.—WRITE ONE COMMANDS FOR MRC1 DURING DUB

| Command | From | To |
|---|---|---|
| (Q3 $\overline{AT}$) | Q3 | Q4 S1 |
| (Q4 S2) (SR SA) (SD=1+5+9+13) | Q4 S2 | Q4 S3 |
| (Q4 S2) (SR SA) (SD=2+3+10+11) (ID=2+3) | Q4 S2 | Q4 S7 |
| (Q4 S2) (SR SA) (SD=2+3+10+11) (ID=6) | Q4 S2 | Q4 S9 |
| (Q4 S4) (SR SA) | Q4 S4 | Q4 S5 |
| (Q4 S6) (SR SA) | Q4 S6 | Q4 S7 |
| (Q4 S8) (SA SR) $\overline{(SD=3+6+11+14)}$ | Q4 S8 | Q4 S9 |
| (Q4 S10) (SA SR) (SD=1+5+9+13) | Q4 S10 | Q4 S11 |
| (Q4 S12) (MCW1) | Q4 S12 | Q4 S9 |

A write zero command for MRC1 should be true whenever a sequence state is entered that does not contain a binary one in MRC1, while the preceding state did contain a binary one, i.e., when going from S1 to S2. The commands to write zero for bit MRC1 are listed in Table 13–4. Since the command ($\overline{SR}$+MLTOB+MCRDC) appears often, it will be replaced by $\theta$. This expression ($\overline{SR}$+MLTOB+MCRDC) is the disconnect command. It allows the sender sequence states to proceed to Q5 (sender requesting to disconnect) when $\overline{SR}$ is true (a lead from the sender), that the sender has timed out for 20 seconds (MLTOB), or that the register junctor wishes to disconnect (MCRDC).

TABLE 13-4.—WRITE "ZERO" COMMANDS FOR MRC1 DURING DUB

| Command | From | To |
|---|---|---|
| (Q4 S1) ($\theta$) | Q4 S1 | Q5 |
| (Q4 S1) (SA SR) | Q4 S1 | Q4 S2 |
| (Q4 S3) ($\theta$) | Q4 S3 | Q5 |
| (Q4 S3) (SA SR) (SD=5+13) | Q4 S3 | Q4 S4 |
| (Q4 S3) (SA SR) (SD=1+9) (ID=0+1) | Q4 S3 | Q4 S6 |
| (Q4 S3) (SA SR) (SD=1+9) (ID=4+5) | Q4 S3 | Q4 S8 |
| (Q4 S5) ($\theta$) | Q4 S5 | Q5 |
| (Q4 S5) (SA SR) (SD=4+12) | Q4 S5 | Q4 S14 |
| (Q4 S5) (SA SR) (SD=8) (ID=9) | Q4 S5 | Q4 S12 |
| (Q4 S5) (SA SR) (SD=5+6+7+13+14+15) (ID=0+1) | Q4 S5 | Q4 S6 |
| (Q4 S5) (SA SR) (SD=5+6+7+13+14+15) (ID=4+5) | Q4 S5 | Q4 S8 |
| (Q4 S5) (SA SR) (SD+6+7+14+15) (ID=7) | Q4 S5 | Q4 S14 |
| (Q4 S7) ($\theta$) | Q4 S7 | Q5 |
| (Q4 S7) (SA SR) | Q4 S7 | Q4 S8 |
| (Q4 S9) ($\theta$) | Q4 S9 | Q5 |
| (Q4 S9) (SA SR) $\overline{(SD=3+6+11+14)}$ | Q4 S9 | Q4 S10 |
| (Q4 S11) ($\theta$) | Q4 S11 | Q5 |
| (Q4 S11) (SR SA) | Q4 S11 | Q4 S14 |
| (Q4 S13) ($\theta$) | Q4 S13 | Q5 |
| (Q4 S13) (MCW2) | Q4 S13 | Q4 S10 |

A one is written for MRC2 whenever leaving a state with a zero in MRC2 and entering a state with one in MRC2, or when going from states S1, S4, S5, S8, S9, S12, S13 to states S2, S3, S6, S7, S10, S11.

The following table lists the write one commands for bit MRC2—a binary weighted two:

TABLE 13-5.—WRITE "ONE" COMMANDS FOR MRC2 DURING DUB

| Command | From | To |
|---|---|---|
| (Q4 S1) (SA SR) | Q4 S1 | Q4 S2 |
| (Q4 S5) (SA SR) (SD=4+12) | Q4 S5 | Q4 S14 |
| (Q4 S5) (SA SR) (SD=5+6+7+13+14+15) (ID=0+1) | Q4 S5 | Q4 S6 |
| (Q4 S5) (SA SR) (SD=5+6+7+13+14+15) (ID=2+3) | Q4 S5 | Q4 S7 |
| (Q4 S5) (SA SR) (SD=5+13) (ID=7) | Q4 S5 | Q4 S11 |
| (Q4 S9) (SA SR) $\overline{(SD=3+6+11+14)}$ | Q4 S9 | Q4 S10 |
| (Q4 S13) (MCW2) | Q4 S13 | Q4 S10 |

The following table lists the write zero commands for MRC2. As previously mentioned, $\theta$ represents the command ($\overline{SR}$+MLTOB+MCRDC).

TABLE 13-6.—WRITE "ZERO" COMMANDS FOR MC2R DURING DUB

| Command | From | To |
|---|---|---|
| (Q4 S2) ($\theta$) | Q4 S2 | Q5 |
| (Q4 S2) (SA SR) [(SD=4+6+7+12+14+15)+ (SD=8) (ID=9)] | Q4 S2 | Q4 S4 |
| (Q4 S2) (SA SR) (SD=2+3+10+11) (ID=4+5) | Q4 S2 | Q4 S8 |
| (Q4 S2) (SA SR) (SD=2+3+10+11) (ID=6) | Q4 S2 | Q4 S9 |
| (Q4 S3) ($\theta$) | Q4 S3 | Q5 |
| (Q4 S3) (SA SR) (SD=5+13) | Q4 S3 | Q4 S4 |
| (Q4 S3) (SA SR) (SD=1+9) (ID=4+5) | Q4 S3 | Q4 S8 |
| (Q4 S3) (SA SR) (SD=1+9) (ID=6) | Q4 S3 | Q4 S9 |
| (Q4 S6) ($\theta$) | Q4 S6 | Q5 |
| (Q4 S7) ($\theta$) | Q4 S7 | Q5 |
| (Q4 S7) (SA SR) | Q4 S7 | Q4 S8 |
| (Q4 S10) ($\theta$) | Q4 S10 | Q5 |
| (Q4 S11) ($\theta$) | Q4 S11 | Q5 |
| (Q4 S14) ($\theta$) | Q4 S14 | Q5 |

A write zero command for MRC2 occurs when leaving a state with a one in MRC2 as S2, S3, S6, S7, S10, S11, S14 and entering a state with zero in MRC2 as S1, S4, S5, S8, S9, S12, S13, Q5.

A write one command for MRC3 occurs when leaving a state with a zero in MRC3 as S1, S2, S3, S8, S9, S10, S11, and entering a state with one in MRC3 as S4, S5, S6, S7, S12, S13, S14.

The commands to write one for MRC3 (a binary weighted four) are presented in the following table:

TABLE 13-7.—WRITE "ONE" COMMANDS FOR MRC3 DURING DUB

| Command | From | To |
|---|---|---|
| (Q4 S2) (SA SR) [(SD=4+6+6+12+14+15)+ (SD=8) (ID=9)] | Q4 S2 | Q4 S4 |
| (Q4 S2) (SA SR) [(SD=8) (ID=8)+(SD=2+3+ 10+11) (ID=7)] | Q4 S2 | Q4 S14 |
| (Q4 S2) (SA SR) (SD=2+3+10+11) (ID=0+1) | Q4 S2 | Q4 S6 |
| (Q4 S2) (SA SR) (SD=2+3+10+11) (ID=2+3) | Q4 S2 | Q4 S7 |
| (Q4 S3) (SA SR) (SD=5+13) | Q4 S3 | Q4 S4 |
| (Q4 S3) (SA SR) (SD=1+9) (ID=0+1) | Q4 S3 | Q4 S6 |
| (Q4 S3) (SA SR) (SD=1+9) (IS=2+3) | Q4 S3 | Q4 S7 |
| (Q4 S8) (SA SR) (SD=3+6+11+14) | Q4 S8 | Q4 S12 |
| (Q4 S9) (SA SR) (SD=3+6+11+14) | Q4 S9 | Q4 S13 |
| (Q4 S10) (SA SR) (SD=2+3+6+7+8+10+11+ 14+15) | Q4 S10 | Q4 S14 |
| (Q4 S11) (SA SR) | Q4 S11 | Q4 S14 |

A write zero command for MRC3 occurs when leaving a state with one in MRC3 as S4, S5, S6, S7, S12, S13, S14 and entering a state with zero in MRC3 as S1, S2, S3, S8, S9, S10, S11.

The following table lists the write zero commands for bit MRC3 only during DUB. The command $\theta$ again represents ($\overline{SR}$+MLTOB=MCRDC).

TABLE 13-8.—WRITE "ZERO" COMMANDS FOR MRC3 DURING DUB

| Command | From | To |
|---|---|---|
| (Q4 S4) (θ) | Q4 S4 | Q5 |
| (Q4 S5) (θ) | Q4 S5 | Q5 |
| (Q4 S5) (SA SR) (SD=5+6+7+13+14+15) (ID=4+5) | Q4 S5 | Q4 S8 |
| (Q4 S5) (SA SR) (SD=5+6+7+13+15) (ID=6) | Q4 S5 | Q4 S9 |
| (Q4 S5) (SA SR) (SD=5+13) (ID=7) | Q4 S5 | Q4 S11 |
| (Q4 S6) (θ) | Q4 S6 | Q5 |
| (Q4 S7) (θ) | Q4 S7 | Q5 |
| (Q4 S7) (SA SR) | Q4 S7 | Q4 S8 |
| (Q4 S12) (θ) | Q4 S12 | Q5 |
| (Q4 S12) (MCW1) | Q4 S12 | Q4 S9 |
| (Q4 S13) (θ) | Q4 S13 | Q5 |
| (Q4 S13) (MCW2) | Q4 S13 | Q4 S10 |
| (Q4 S14) (θ) | Q4 S14 | Q5 |

A write one command for MRC4 occurs when leaving a state with a zero in MRC4 as S1, S2, S3, S4, S5, S6, S7, and entering a state with one in MRC4 as S8, S9, S10, S11, S12, S13, S14.

The following table lists the write one commands for MRC4 (binary weighted eight) during DUB.

TABLE 13-9.—WRITE "ONE" COMMANDS FOR MRC4 DURING DUB

| Command | From | To |
|---|---|---|
| (Q4 S7) (SA SR) | Q4 S7 | Q4 S8 |
| (Q4 S2) (SA SR) (SD=8) (ID=8) | Q4 S2 | Q4 S14 |
| (Q4 S2) (SA SR) (SD=2+3+10+11) (ID=4+5) | Q4 S2 | Q4 S8 |
| (Q4 S2) (SA SR) (SD=2+3+10+11) (ID=6) | Q4 S2 | Q4 S9 |
| (Q4 S2) (SA SR) (SD=2+3+10+11) (ID=7) | Q4 S2 | Q4 S14 |
| (Q4 S3) (SA SR) (SD=1+9) (ID=4+5) | Q4 S3 | Q4 S8 |
| (Q4 S3) (SA SR) (SD=1+9) (ID=6) | Q4 S3 | Q4 S9 |
| (Q4 S3) (SA SR) (SD=1+9) (ID=7) | Q4 S3 | Q4 S11 |
| (Q4 S5) (SA SR) (SD=5+6+7+13+14+15) (ID=4+5) | Q4 S5 | Q4 S8 |
| (Q4 S5) (SA SR) (SD=5+6+7+13+14+15) (ID=6) | Q4 S5 | Q4 S9 |
| (Q4 S5) (SA SR) (SD=5+13) (ID=7) | Q4 S5 | Q4 S11 |
| (Q4 S5) (SA SR) (SD=8) (ID=9) | Q4 S5 | Q4 S12 |
| (Q4 S5) (SA SR) (SD=4+12) | Q4 S5 | Q4 S14 |

A write zero command for MRC4 occurs when leaving a state with a one in MRC4 as S8, S9, S10, S11, S12, S13, S14 and entering a state with a zero in MRC4 as S1, S2, S3, S4, S5, S6, S7.

The following table lists the write zero commands for MRC4. The command ($\overline{SR}$+MLTOB+MCRDC) is again represented by θ.

TABLE 13-10.—WRITE "ZERO" COMMANDS FOR MRC4 DURING DUB

| Command | From | To |
|---|---|---|
| (Q4 S8) (θ) | Q4 S8 | Q5 |
| (Q4 S9) (θ) | Q4 S9 | Q5 |
| (Q4 S10) (θ) | Q4 S10 | Q5 |
| (Q4 S11) (θ) | Q4 S11 | Q5 |
| (Q4 S12) (θ) | Q4 S12 | Q5 |
| (Q4 S13) (θ) | Q4 S13 | Q5 |
| (Q4 S14) (θ) | Q4 S14 | Q5 |

Tables 13–3 to 13–10 listed the individual commands for going from one state to another state as a function of the S and I digits. The commands as made in the write commands combine a number of these commands by the use of Karnaugh maps to give a reduction in gates. Thus, the final write commands may differ slightly with these presented here, but the differences stem from redundancies.

The following table contains expressions common to the write commands. They are given designations, such as K5, to reduce the size of the write commands.

| K: | Expression: |
|---|---|
| K1 | (SD=1+5+9+13) |
| K2 | (SD=2+3+10+11) |
| K3 | (ID=2+3+6) |
| K5 | (SD=5+13) |
| K6 | (SD=1+9) |
| K7 | (ID=0+1+4+5) |
| K8 | (SD=4+12) |
| K9 | (SD=5+6+7+13+14+15) |
| K12 | (ID=0+1+2+3+7) |
| K13 | (SD=4+6+7+12+14+15) |
| K14 | (ID=4+5+6) |
| K15 | (ID=0+1+2+3) |
| K16 | (SD=3+6+11+14) |
| K17 | (SD=2+3+6+7+8+10+11+14+15) |
| K18 | (ID=4+5+6+7) |
| K19 | (θ) |
| K20 | (SA SR) |

The composite command to write a one for MRC1 during DUB, only is as follows: where format is $\overline{W0}$ (W1+Rw):

Write one=[(S1) (K20)+(S3) (K20) (K5)+(S2) (K20) (K6) (K7)+[(MWC1) (DUB)] (S7) (K20)+(S9) (K20) ($\overline{K16}$)+(S11) (K20)+(S13) (MCW2)+(S5) (K20) (K8)+(S5) (K20) (SD8) (ID9)+(S5) (K20) (K9) (K7)+(K19)+(S5) (K20) (ID7) ($\overline{K5}$)]′ {[(Q3) ($\overline{AT}$)+S2 K20 (K1+K2+K3)+(K20) (S4+S6)+(S8) (K20) ($\overline{K16}$)+(S10) (K20) (K1)+(S12) (MCW1)]+(MRC1)}

The command to write a one for MRC2 during DUB, is as follows:

Write one=[(K19)+(S2) (K20)+(K13)+(S2) (K20) (SD8) (ID9)+[(MWC3) (DUB)] (S7) (K20)+(S2) (K20) (K2) (K14)+S3 K20 (K5+K6+K14)]′ {[(S1) (K20)+(S5) (K20) (K8)+(S5) (K20) (K9) (K12)+(S9) (K20) ($\overline{K16}$)+(S7) (K20)]+(MRC2)}

The command to write a one for MRC3 during DUB, is as follows:

Write one=[(K19)+(S5) (K20) (K9) (K14)+(S5) (K20) (K5) [(MWC3) (DUB)] (ID7)+(S7) (K20)+(S12) (MCW1)+(S13) (MCW2)]′ {[(S2) (K20) (K13)+(S2) (K20) (SD8) (ID9)+(S2) (K20) (SD8) (ID8)+(S2) (K20) (K2) (K12)+(S3) (K5) (K20)+(S3) (K20) (K6) (K15)+(S8+S9) (K20) (K16)+(S10) (K20) (K17)+(S11) (K20)]+(MRC3)}

The command to write one for MRC4 during DUB, is as follows:

Write one=(K19)′ {[(S7) (K20)+(S2) (K20) (SD8) (ID8)+[(MWC4) (DUB)] (S2) (K20) (K2) (K18)+(S3) (K20) (K6) (K18)+(S5) (K20) (K9) (K18)+(S5) (K20) (SD8) (ID9)+(MRC4)]}

13.4 *Counting logic*

The requirements set forth for the register-sender group necessitates the use of several varied counters. Each register junctor in the register-sender group must be able to disconnect from any sequence state once it has left the idle condition, except for the trouble recorder state. Therefore, certain disconnect time-out features must exist whenever a subscriber disconnects or fails to dial within a specified amount of time. There also exists some common controlled equipment in each register-sender group, viz. the transfer register and the senders 2S1–5, which are available to all of the register junctors. Any time a register junctor seizes some common controlled equipment, the register junctor must time the use of that equipment to insure against its retention for too long a period of time.

Besides these time-out features, each register junctor must accept and store the digits that a subscriber dials. This necessitates the use of a counter to accumulate the pulse count of each dialed digit. In order to know when the pulse count is complete, another counter is required to time the interdigital pause. From the above discussion it is seen that counters in the registers are required to do the following:

(a) Time the sender.

(b) Time the transfer register.

(c) Accumulate the pulse count of the dialed digits.

(d) Time the interval between changes in the P highway.

(e) Time the local register junctor relay release on a disconnect sequence.

The slowest counting rate available in the register sender group is the system cycle time (8 milliseconds). This counting rate is suitable for timing the changes in the P highway, since on the average, the dial pulses are 58 milliseconds break and 42 milliseconds make. This timing rate is not suitable for timing the transfer register or the sender since the transfer register employs a 4 second time-out and the sender employs a 20 second time-out. Because of these varied timing requirements, three separate rates of counting have been incorporated into the register-sender group common logic. The three counting rates are called mode zero (M0), mode one (M1), and mode two (M2).

The M0 counting rate is the fastest of the three. When M0 is true, it is possible to advance the counters once every system cycle (8 milliseconds). M1 is the intermediate counting rate, with a possibility of advancing the count once every 300 milliseconds. The third rate, M2, allows the count to be advanced once every 1.2 seconds.

The mode of counting information is stored in the first two bits of position B for rows DUA and DUB of each register's memory storage. The only counters employing the various modes of counting, are those counters whose memory storage is located in position A of rows DUA and DUB. The initial mode of counting is M0 (MLRDB–0), and the counts stored in rows DUA and DUB may advance at the rate of 8 milliseconds. When the count stored in position A (row DUA or DUB) reaches 15, the mode of counting is advanced to M1 (MLRDB–1). If the mode of counting is M1 and the count stored in position A (row DUA or DUB) again reaches 15, the mode of counting is advanced to M2 (MLRDB–2).

To facilitate the slow rates of counting; i.e., M1 and M2, two long count circuits were developed employing astable multivibrators. The output of MLAS–A is a 14 milliseconds pulse with repetition rate adjusted to 300 milliseconds. This output pulse is then gated with the distributor pulse DR1 to set the flip-flop MLC1. MLC1 is then reset with the next DR1 pulse. The output of MLC1 is now an 8 millisecond pulse with a 300 millisecond repetition rate. An 8 millisecond pulse with a 1.2 second repetition rate (MLC2) is developed in the same manner from MLAS–B and the flip-flop MLC2A.

The common control logic now has available two pulse trains, with a long pulse repetition rate, that are synchronous to the system timing of the distributor. The counts stored in row DUA and row DUB may now be advanced at any of the three rates simply by gating the mode of counting with appropriate long count (MLC1 or MLC2). Thus, M0 allows the count to advance every 8 milliseconds, M1 MLC1 allows the count to advance every 300 milliseconds, and M2 MLC2 allows the count to advance every 1.2 seconds.

Furthermore, MLCA is gated with RSTRF and MRD3 to form the final output $$MLC2=(MLC2A)+[(RSTRF)+(MRD3)](DUG)$$

When either RSTRF or MRD3 are true during time slot DUG, the output MLC2 is true also during time slot DUG. This gating arrangement "shorts out" the MLC2 function by making it appear true every time DUG appears. The RSTRF function is a lead that indicates when traffic is very heavy. In order to accommodate increased traffic, the function RSTRF is made true, and this in turn allows the count to advance every 8 milliseconds in the (M2) counting mode. During time slot DUG, the function MRD3 indicates "fast time-out." When fast time-out is true, the count is also allowed to advance every 8 milliseconds in the (M2) counting mode.

The counters in rows DUA and DUB, if allowed to count continuously through all three counting modes, would have a maximum total time of 21.128 seconds, a minimum of 19.644 seconds, and an average of 20.386 seconds. Under the above conditions, when RSTRF or fast time-out are true, row DUA has a maximum total time of 4.440 seconds, a minimum of 4.148 seconds, and an average of 4.294 seconds. RSTRF and fast time-out affect row DUA only; row DUB still counts normal. The above-mentioned average times are approximated as 4 or 20 seconds time-outs.

Counters are required to perform 5 different operations. Since many of these operations may be timed simultaneously, it is necessary to store the counts of the different operations in various memory locations. The use of the folded memory lends itself very adequately for this requirement. The various counts are stored in different rows of each register. Position A in each row was selected as the storage area for the counters since this allows the use of the same common logic for any counter. Position A of row DUA was selected to store the count of the interval between changes in the P highway. This location was also chosen to store the count of the local junctor relay release time on a disconnect sequence. This location was chosen for this dual function because the two time-out sequence could not occur simultaneously and all the information for the counting is contained in row DUA. Position A of row DUB was selected to store the count of sender time-out since row DUB is the sender's control word and all the information required for the counting is contained in that row. Position A of rows DUC and DUD were chosen to accumulate the pulse count of the dialed digits since these are the rows where the digits are stored. The early outpulsing feature incorporated into the system necessitates the outpulsing of digits while the subscriber is still dialing. Because of this feature, the counters located in rows DUA, DUB, and DUD may all be operating at the same time. This leaves only position A of rows DUE or DUF to store the count of the transfer register time-out. Position A of row DUE is the storage area for one of the class of service digits; therefore, by process of elimination, position A of row DUF was selected as the storage area for the transfer register time-out.

There are three major functional quantities that control all the counters; a clear command (CQ), a start command (SQ), and an add command (AQ). These functional quantities are gated together in the write commands according to the general format:

$$\text{write } MRAX=(\overline{CQ})\{(\overline{SQ})[(AQ)(f_x)+(\overline{AQ})(MRAX)]+(SQ)(G_x)\}$$

where:

$$f_1=(\overline{MRA1})$$

$$f_2=(MRA1)(\overline{MRA2})+(\overline{MRA1})(MRA2)$$

$$f_3=(MRA3)[(\overline{MRA1})+(\overline{MRA2})]+(MRA1)(MRA2)(\overline{MRA3})$$

$$f_4=(MRA4)[(\overline{MRA1})+(\overline{MRA2})+(\overline{MRA3})]+(MRA1)(MRA2)(MRA3)(\overline{MRA4})$$

$$g_1=1$$

$$g_2=g_3=g_4=0$$

The X in the general format signifies the bit location in position A of any memory row containing a counter. Thus, for bit 1 the functions $f_1$ and $g_1$ would be substituted into the format to yield:

$$\text{write MRA1}=(\text{CQ})\ \{(\text{SQ})\ [(\text{AQ})\ (\overline{\text{MRA1}})+(\text{AQ})\ (\text{MRA1})]+(\text{SQ})\}$$

For bit 2, the functions $f_2$ and $g_2$ would be substituted into the format to yield:

$$\text{write MRA2}=(\overline{\text{CQ}})\ \{(\overline{\text{SQ}})\ [(\text{AQ})\ \{(\text{MRA1})\ (\overline{\text{MRA2}})\ (\overline{\text{MRA1}})\ (\text{MRA2})\}+(\overline{\text{AQ}})\ (\text{MRA2})]\}$$

Note, that for bits 2–4, there is no SQ command. Hence, when a start command SQ is given, the only write command that is true is write MRA1. The other three bits are forced to write 0, regardless of their previous states.

When a clear command CQ is given, all four bits are forced to write 0. If the commands $\overline{\text{CQ}}$ and SQ are given, the first bit is forced to write 1, whereas the other three bits are forced to write 0. If the commands $\overline{\text{CQ}}$ and $\overline{\text{SQ}}$ are given, the four bits obey the AQ or $\overline{\text{AQ}}$ command. If $\overline{\text{CQ}}$, $\overline{\text{SQ}}$, and AQ are all true, each bit rewrites its previous state. If $\overline{\text{CQ}}$, $\overline{\text{SQ}}$, and AQ are all true, each bit obeys its $f_x$ command. Hence, each counter has four states; clear, start, add, and rewrite. These four states may be shown as:

(1) Clear: CQ=1, SQ, AQ=anything
(2) Start: $\overline{\text{CQ}}$=1, SQ=1, AQ=anything
(3) Add: $\overline{\text{CQ}}$=1, $\overline{\text{SQ}}$=1, AQ=1
(4) Rewrite: $\overline{\text{CQ}}$=1, $\overline{\text{SQ}}$+1, $\overline{\text{AQ}}$=1

A step by step counter sequence is shown below:

| MRA1 | MRA2 | MRA3 | MRA4 | |
|---|---|---|---|---|
| 0 | 0 | 0 | 0 | idle. |
| 1 | 0 | 0 | 0 | start. |
| 0 | 1 | 0 | 0 | add. |
| 0 | 1 | 0 | 0 | rewrite. |
| 0 | 1 | 0 | 0 | rewrite. |
| 1 | 1 | 0 | 0 | add. |
| 0 | 0 | 1 | 0 | add. |
| 1 | 0 | 1 | 0 | add. |
| 1 | 0 | 1 | 0 | rewrite. |
| 0 | 0 | 0 | 0 | clear. |

*Pulse Recognition.*—When a register junctor is idle (R1), position A of row DUA is blank (BL–MRA). When the register junctor is seized, it sequences from $R_1$ to $R_2$ to $R_3$ as prescribed by the common control logic. While in $R_3$, the counter in row DUA times the arrival of the P highway.

The SQ command for the counter is $R_3$ BL–MRA. The count continues to advance on the command $$\text{AQ}=(\text{MLP})$$

$$(\pi)\ (R_3),\ \text{where}\ \pi=(\text{M0})+(\text{M1})\ (\text{MLC1})\ (\text{M2})\ (\text{MLC2})$$

The count advances in M0 at an 8 millisecond rate as long as MLP is true. When a count of 15 is read out of position A during DUG, either a clear command or a start command is generated depending upon whether the call is from a coin box. If the call is not from a coin box, the CQ command is generated to clear the counter and the register sequences to disconnect state V2. If the call is from a coin box, the SQ command is generated to start the counter over and the mode of counting is advanced to M1. The count now advances at a 300 millisecond rate as long as $\overline{\text{MLP}}$ remains true. When a count of 15 is again reached, the SQ command starts the counter over and the mode of counting is advanced to M2. The count now advances at a 1.2 second rate (8 millisecond rate if RSTRF or fast time-out are true) until the count of 15. At this time the register sequences to disconnect state V2.

If any time prior to disconnecting, MLP becomes true, the SQ command starts the counter over, the mode of counting is forced to M0, and the register advances to sequence state R4. While in R4, the counter in row DUA times the interval between changes in the P highway. The state of the P highway is stored in row DUA in position B4. The next time the register's time slot appears, the previous state of the P highway is read out of the memory storage and is compared to the present state of the P highway (i.e. MRB4) is compared with MLP. If the previous and present states are the same, the count is advanced by one. If $\overline{\text{MRB4}}$ and $\overline{\text{MLP}}$ are both true for the full count of 15 (120 milliseconds), MCRDC in the MC register is set to the one state, the counter is cleared, and a disconnect sequence is initiated. This is an indication that the subscriber has disconnected. For the case where MRB4 and MLP are both true, the AQ command is gated with the modes of counting. This is the normal state of the P highway between dialed digits, and the subscriber is allowed the full 4 or 20 seconds between dialing digits. Should the count reach 15 in M2 for this case, MCTOA in the MC register is set to the one state and the counter is cleared. The count is started over again every time MRB4 and MLP are dissimilar or the count of 15 is reached and the mode of counting is not M2.

The initial change from on-hook to off-hook; i.e., ($\overline{\text{MRB4}}$) (MLP), advances the register from sequence state R3 to R4. The counter then times the length of time that the off-hook condition remains unchanged; i.e., (MRB4) (MLP). As soon as the first pulse of the first dialed digit occurs, (MRB4) ($\overline{\text{MLP}}$), the counter is started over and begins counting the length of time that the phone is on-hook. On the trailing edge of the pulse, ($\overline{\text{MRB4}}$) (MLP), the counter is again started over and MCADD in the carry register is set to the one state. This MCADD command is used in rows DUC and DUD as an advance for those counters. The action continues in this manner until the subscriber's phone is time in the off-hook condition for 120 milliseconds; i.e., (M0) (a count of 15). This is the interdigital pause and MCF in the carry register is set to the one state. This MCF command is used by the counters in rows DUC and DUD to indicate that the count of the digit is complete. The counter continues to time the intervals beween changes in the P highway as mentioned above until the register sequences to state R5.

While in state R5, the counter in row DUA times the arrival of the finished dialing indication and also times the P highway to see if the subscriber hangs up. If position A is blank and $\overline{\text{MCW2}}$ is true, SQ is true to start the counter. This is a special case for an operator call. The counter advances once every 8 milliseconds with $\overline{\text{MCW2}}$ true until a count of 4; at which time MCRDC in the MC register becomes set. If (MCW2) (MLP) is true before the count of 4, CQ becomes true and the counter clears. The counter also starts and adds whenever the subscriber disconnects; i.e., ($\overline{\text{MRB4}}$) ($\overline{\text{MLP}}$), and counts for 120 milliseconds; at which time MCRDC is set.

*Disconnect Timer.*—When a register junctor is disconnecting, a counter for the P highway is no longer required. The counter in position A of row DUA is used however, to time the local junctor relay release time in disconnect state V2. When in disconnect state V2, the counter must time the arrival of the "down-check" lead (MMDC). If the register is in state V2, $\overline{\text{MMDC}}$ is true, and position A of row DUA is blank, the SQ command becomes true to start the counter. The count advances while $\overline{MMDC}$ is true according to the mode of counting. If the call is not a coin box call, the counter advances only 4 counts (32 milliseconds). At this time, the register indicates trouble with the local junctor's relays by writing memory bit position MRD4 of row DUA and then sequences to disconnect state V3. If the call is a coin box call, the counter continues to advance (if $\overline{MMDC}$ is true) through modes M0 and M1 (4 seconds). At this time, the register writes trouble (MRD4) and sequences to state V3. If MMDC should become true before the time-out, the register sequences to idle (R1). This is accomplished by setting MCE in the carry register to the one state during time slot DUA. The flip-flop MCE being set, forces all the rows (B, C, D, E, and F) to write zero in all bit positions. During time slot DUG, all the bits are forced to write one (idle condition). Because of this clearing action, no clear (CQ) command is provided for the counter in disconnect state V2.

When a register is working with a sender, a counter in the sender's control word (row DUB) times the overall operation of the sender. The total time allocated to the sender is 20 seconds, after which time, MCSDC in the carry register becomes set to begin a disconnect sequence. The state Q4 is an indication that the register is working with the sender. If position A is blank and Q4 is true, SQ becomes true to start the counter. The count continues to advance according to the mode of counting until a count of 15 is reached. If the count is 15 and the mode of counting is not M2, SQ becomes true to start the counter again. Hence, the counter starts, counts to 15 (120 milliseconds), advances the mode of counting to M1, and starts again. The counter counts to 15 again (4 seconds) and advances the mode of counting to M2 and starts again. Should the count reach 15 in M2 (20 seconds total time), MLTOB becomes true. MLTOB will in turn set MCSDC and advance the sender Q states to Q5. With the indication Q5, the clear command CQ becomes true to clear the counter. If at any time during the 20 second count the register wishes to disconnect (as indicated by MCRDC) or the sender wishes to disconnect (as indicated by $\overline{SR}$), the sender Q states advance to Q5 and the counter becomes cleared.

Row DUC of a register stores all the subscribers dialed digits except for the called party's station number. Position A in row DUC, accumulates the digits, one pulse at a time, until the entire digit is complete. The counter in row DUA analyzes the P highway, and upon the completion of a pulse, MCADD in the carry register is set to the one state. When the interdigital pause is recognized by the counter in row DUC, MCF in the carry register is set to the one state to indicate that the digit is complete. If position A of row DUC is blank, and MCADD is true, the SQ command becomes true to start the counter. The counter advances its count every time MCADD is true until the command MCF indicates the digit is complete. At this time the digit in position A is shifted to another position in the read register and the CQ command clears the counter for the next digit. This counter functions only so long as $\overline{MCD}$ is true in the carry register. After MCD becomes true, no further dialed digits are stored in row DUC. Therefore, all the counter commands (SQ, AQ, and CQ) are gated with $\overline{MCD}$ to inhibit the counter action once a translation has been requested.

Position A in row DUC is also used as the storage area for the trunk I digit on a ticketing call. This means position A must be clear after the counter has completed its function. In the future numbering plan, it is necessary to wait, after seven digits have been placed in storage, to see if the subscriber is going to dial more digits. This action distinguishes between the foreign and extended area types of calls. If the command (MLFUT) (MCADD) ($\overline{MCD}$) (DUC) is true, the X instruction is placed in the carry register. This command indicates that the call is to a foreign area, that the subscriber has dialed the eighth digit, and that a sufficient number of digits are in storage to request a translation. However, (MCADD) ($\overline{MCD}$) (DUC) is also the command to start or add to the counter, depending on whether position A is blank. Since row DUC cannot store the eighth digit, the counter in position A must be inhibited and cleared so that position A may store the trunk I digit if required. Therefore, if MLFUT is true, the same command that sets MCX4 in the carry register also makes CQ true for the counter in row DUC. This then, removes the SQ or AQ command for the counter, and insures that position A will be blank and available for future storage.

Row DUD of a register is the storage area for the called party's station number. Position A in row DUD, accumulates the digits, one pulse at a time, in the same manner as the counter in row DUC. On this case however, the counter must be able to accumulate the digits even after MCD becomes true. Therefore, the counter comands (SQ, AQ and CQ) are not gated with $\overline{MCD}$ as was the case for the counter in row DUC. But for this exception, and also the case for the CQ command in the future numbering plan, the counter operations for rows DUC and DUD are identical. Hence, the counter commands may be written as:

SQ=(BL–MRA) (MCADD) (DUD)
AQ=(MCADD) (DUD)
CQ=(MCF) (DUD)

When a register is working with the transfer register, the counter in position A of row DUF times the overall operation of the transfer register. The total time allocated to the transfer register is 4 seconds, after which time, MCRDC in the carry register becomes set to begin a disconnect sequence. Included in the total time-out period is the time required to seize the transfer register. Hence, a total time of 4 seconds is allotted to seize and use the transfer register.

The X instruction is transported from row DUB or DUC to the register's control word via the carry register. The next time that register's control word appears in time, the X instruction is read out of the memory and MCXIN in the carry register becomes set to the one state to indicate the presence of that X instruction. The presence of the X instruction in the register's control word is the command to seize the transfer register if it is idle. If the transfer register is idle, the X instruction is deleted from row DUA and is transferred to the MTIN flip-flops in the transfer register. At the same time, the flip-flop MC24 in the carry register is set to indicate that this is the register which has seized the transfer register.

When position A of row DUF is blank and MCXIN is true, the command SQ becomes true to start the counter. The counter then advances the count, at a 300 millisecond rate, whenever MCXIN or MC24 is true. The count continues to advance until the translation is complete (as indicated by MTC) or until there is an indication of trouble in the transfer register (as depicted by MTT). Thus when MC24 and MTC or MTT are true, CQ becomes true to clear the counter. Should the counter advance the full 4 seconds to a count of 15, MCRDC in the carry register and MTT in the transfer register will both be set. MCRDC initiates a disconnect sequence, and MTT eventually sequences the register to the trouble recorder state V3. For this case, the counter is not cleared, but the count remains in storage as an indication to the trouble to aid in determining the cause of the trouble.

Table 13–11 shows the counter commands (SQ, AQ, CQ) required for operation of the counters in the various rows. The commands are separated according to the counter location to make them easily discernible. The following, is a list of the symbols used in writing the equation of Table 13–11:

A* = [(MO)+(M1) (MLD1)+(M2) (MLC2)]
B* = [($\overline{MCW2}$)+($\overline{MRB4}$) ($\overline{MLP}$)]
C* = [(DUC) ($\overline{MCD}$)+(DUD)]
D* = ($\overline{MLVX}$) (DUG)
E* = [(F*)+(MLRDA–15) ($\overline{M2}$) (MRG1)]
F* = (BL–MRA)
G* = D.-C. set command to flip-flop MCX4
= (MLZ4) (MLBN) [($\overline{MLFUT}$)+(MCTOA)] +(MLZ3) ($\overline{MLFUT}$)+(MLZ5)+(MLZ4) (MLFUT) (MLBN7) (MCTOA)+(MLBN7) [(MLFUT) (MLZ6)+(MLFUT) (MCADD)]

TABLE 13-11

| | Function | SQ |
|---|---|---|
| Counter-Row A | Time the arrival of the "P" highway. | [(MLP)+(E*)] (R3) (D*) |
| | Time the interval between the changes of the "P" highway. | [(MLRDA–15) ($\overline{M2}$)+ (MRB4) ($\overline{MLP}$)+ ($\overline{MRB4}$) (MLP)] (R4) (D*) |
| | Time the finished dialing indication and also time the "P" highway to see if the subscriber hangs up. | F* B* R5 D* |
| | Time the appearance of the "down-check" indication. | $\overline{MMDC}$ E* V2 DUG |
| Counter-Row B | Time the sender | (F*+MLRDA–15 $\overline{M2}$) Q4 DUB |
| Counter-Row C | Accumulate the pulse count of the dialed digits. | MCADD F* C* |
| Counter-Row D | Accumulate the pulse count of the dialed digits. | MCADD F* C* |
| Counter-Row F | Time the transfer register | (F*) (MCX1N) (DUF) |

| | AQ | CQ |
|---|---|---|
| Counter-Row A | ($\overline{MLP}$) (A*) (R3) (D*) | (MLRDA–15) ($\overline{MLP}$) ($\overline{MRG1}$)+ (M2) (R3) (D*) |
| | [($\overline{MRB4}$) ($\overline{MLP}$)+(MRB4) (MLP) (A*)] (R4) (D*) | [(MCTOA)+(MCRDC)+(MCSDC)] (R4) (D*) |
| | (B*) (R5) (D*) | [(MCRDC)+(MCSDC)+ (MCW2) (MLP)] (R5) (D*) |
| | ($\overline{MMDC}$) (A*) (V2) (DUG) | No clear command |
| Counter-Row B | (Q4) (A*) (DUB) | (Q5) (DUB) |
| Counter-Row C | (MCADD) (C*) | [(MCF)+(MLFUT) (G*)] ($\overline{MCD}$) (DUC) |
| Counter-Row D | (MCADD) (C*) | (MCF) (DUD) |
| Counter-Row F | [(MCX1N)+(MC24)] (MLC1) (DUF) | [(MTC)+(MTT)] (MC24) (DUF) |

13.5 *Miscellaneous write commands*

The purpose of this section is to discuss briefly the write commands not heretofore described in the first four sections of this chapter. This section describes the following:

(a) The writing and upgrading of the sender register's Q states in row DUB;
(b) The writing of the chosen sender's address in row DUB;
(c) The writing and upgrading of the trunk identity count in row DUB, and the writing of the J, T, and I digits in rows DUA and DUC for ticketing calls;
(d) The writing of the Z digit in row DUD;
(e) The writing of the party digit in row DUE;
(f) The writing and upgrading of all the information, except for the counter and modes of counting, contained in the register control word in DUG.

*Q Sequence states.*—A complete description of the Q sequence states is given in Chapter 5 and are not covered here. The memory storage area for the Q states is located in positions MRD1, MRD2, and MRD3 of row DUB, and are stored in the normal binary weighted manner. Hence, MRD1 has the binary weight of one, MRD2 the binary weight of two, and MRD3 the binary weight of four. The Q states and the value of the three bits (MRD1, MRD2, and MRD3) are shown below:

TABLE 13-12

| Q State | MRD1 | MRD2 | MRD3 | Command to Advance from Previous State |
|---|---|---|---|---|
| Q0 | 0 | 0 | 0 | |
| Q1 | 1 | 0 | 0 | (Q0) [(SD=3, 6, 11, 14)+ (MCW2) $\overline{BL-MRH}$)] |
| Q2 | 0 | 1 | 0 | (Q1) (AA) |
| Q3 | 1 | 1 | 0 | (Q2) |
| Q4 | 0 | 0 | 1 | (Q3) ($\overline{AT}$) |
| Q5 | 1 | 0 | 1 | (Q4) [(SR)+(MLTOB)+(MRCDC)] |
| Q6 | 0 | 1 | 1 | (Q5) |
| Q0 | 0 | 0 | 0 | (MCE) |

From the above table, it is seen that a 1 is written in MRD1 whenever the Q state advances from an even to an odd numbered state or when no advance is made. A 0 is written in MRD1 whenever the Q state advances from an odd to an even numbered state or whenever an odd numbered state is advanced to Q0. A 1 is written in MRD2 whenever Q1 is advanced to Q2, Q2 to Q3, Q5 to Q6, or when no advance is made; and rewrite the 1 that is already present. A 0 is written in MRD2 whenever Q3 is advanced to Q4, Q6 to Q0, or from any state to Q0. A 1 is written in MRD3 whenever Q3 is advanced to Q4, Q4 to Q5, Q5 to Q6, or when no advance is made and rewrite the 1 that is already present. Write 0 is written in MRD3 whenever Q6 is advanced to Q0 or from any state to Q0.

The equations to advance from any Q state to another are shown in Table 13–12. These commands were taken directly from Chapter 5. By a judicious arrangement of these equations, it is possible to obtain all the write 1 and write 0 commands required for the Q states. The write command format for the Q state is:

$$(\overline{\text{WRITE 0}})\ [(\text{WRITE 1})+(\text{REWRITE})]\ (\text{DUB})$$

This format states that if a 0 is not written, either a 1 is written or the previous information is rewritten during time slot DUB. Thus, by reference to Table 13–12, the required equations are known; and the manner in which each bit changes as the Q states are advanced from state to state is known. The three required write commands are:

Write MRD1 during DUB=

$$[\overline{(\text{Q1})}\ \overline{(\text{AA})+(\text{Q3})}\ \overline{(\text{AT})+(\text{Q5})}]\ \{(\text{Q0})\ [(\text{SD}=3, 6, 11, 14,+(\text{MCW2})\ \ (\overline{\text{BL–MRH}})]+(\text{Q2})+(\text{Q4})\ \ [(\overline{\text{SR}})+(\text{MLTOB})+(\text{MCRDC})]+(\text{MRD1})\}\ \text{DUB})$$

Write MRD2 during DUB=

$$(\overline{\text{Q3}})\ [(\text{Q1})\ (\text{AA})+(\text{Q2})+(\text{Q5})+(\text{MRD2})]\ (\text{DUB})$$

Write MRD3 during DUB=

$$\{(\text{Q3})+(\text{Q4})\ [(\overline{\text{SR}})+(\text{MLTOB})+(\text{MCRDC})]+(\text{MRD3})\}\ \text{DUB}$$

It will be noted that the write 0 command for MRD3 (which is MCE) is missing. MCE is missing as the general write 0 for the other two bits also, because MCE is the write 0 command for all the memory rows and is, therefore, gated to the final write command which applies to any bit for all memory rows. Thus, when MCE is true, all rows must write 0 except for MRC1 during DUG, as explained later in this section.

*Trunk Identity count.*—The memory storage area for the trunk identity count is located in positions MRE1, MRE2, and MRE3 of row DUB. Whenever a ticketing call is in progress, the register-sender group must accept the J, T, and I digits from the senders. The manner in which these digits are received and when they are received is described in Chapter 12.

The trunk identity count is normally blank. When the J, T, and I are to be expected, as indicated by the command (Q4) (S2) (SD=9–16) (MSA) (MSR), a 1 is written into positions MRE1, MRE2, and MRE3 of row DUB. When the sender register indicates that a ticketing digit has been received by the command ($\overline{\text{BL–STID}}$) a 0 is written into position MRE3 and the 1's already in positions MRE1 and MRE2, are rewritten. The next time a ticketing digit is received ($\overline{\text{BL–STID}}$), a 0 is written into position MRE2, and the 1 is MRE1 is rewritten. When the last ticketing digit is received ($\overline{\text{BL–STID}}$), a 0 is written into position MRE1, and the trunk identity count is once again blank. Hence, the write command format for the trunk identity count is:

$$(\overline{\text{WRITE 0}})\ [(\text{WRITE 1})+(\text{REWRITE})]\ (\text{DUB})$$

The write 1 command for all bits is:

$$b=(\text{Q4})\ (\text{S2})\ (\text{SD}=9\text{–}16)\ (\text{MSA})\ \text{MSR})$$

The three required write commands are:

Write MRE1 during DUB=

$$\overline{[(\text{Q4})\ (\overline{\text{BL–STID}})\ (\text{MRE1})\ (\overline{\text{MRE2}})]}\ [(b)+(\text{MRE1})]\ (\text{DUB})$$

Write MRE2 during DUB=

$$\overline{[(\text{Q4})\ (\overline{\text{BL–STID}})\ (\text{MRE2})\ (\overline{\text{MRE3}})]}\ [(b)+(\text{MRE2})]\ (\text{DUB})$$

Write MRE3 during DUB=

$$\overline{[(\text{Q4})\ (\overline{\text{BL–STID}})\ (\text{MRE3})]}\ [(b)+\text{MRE3})]\ (\text{DUB})$$

*Sender Address.*—The memory storage area for the sender address is located in positions MRG1, MRG2, and MRG3 of row DUB; and the address is stored in the normal binary weighted manner. There are three binary weighted leads from the allotter (AS1, AS2, and AS3) that indicate the chosen sender's address during state Q3. Therefore, the only requirements for storing the sender's address in the memory is to write the information contained on the AS leads from the allotter and to rewrite that information thereafter. Hence, the three required write commands are:

Write MRG1 during DUB=[(Q3) (AS1) +(MRG1)] (DUB)
Write MRG2 during DUB=[(Q3) (AS2) +(MRG2)] (DUB)
Write MRG3 during DUB=[(Q3) (AS3) +(MRG3)] (DUB)

No write 0 is necessary since the sender address is permanently stored until the register disconnects, and MCE clears all memory rows at that time.

*Trunk I Digit.*—The memory storage area for the trunk I digit is located in the four bits of position A of row DUC. As explained in Chapter 12, the trunk identity count is transferred from row B to the MSTIC flip-flops in the sender register. Thus, when the ticketing digits are received by the sender register, the count in the MSTIC flip-flops identifies which of the three digits is ready for storage in the memory. The I digit is the last of the three digits to be received; thus, MSTIC1 is the only flip-flop of the three to be in the true state. There are four binary weighted leads from the sender register (MSTID1, MSTID2, MSTID3, and MSTID4) that contain the I digit. Therefore, the only requirement for storing the trunk I digit in the memory is to write the information contained on the MSTID leads upon the proper trunk identity count (obtained from the MSTIC flip-flops) during row DUC's time slot. No rewrite command is necessary here since this is incorporated into the general format. The write 0 command is again MCE as previously described. The required write commands are:

Write MRA1 during DUC=

$$(\text{MSTIC1})\ (\overline{\text{MSTIC2}})\ (\text{MSTIC3})\ (\text{MSTID1})\ (\text{DUC})$$

Write MRA2 during DUC=

$$(\text{MSTIC1})\ \overline{\text{MSTIC2}})\ (\overline{\text{MSTIC3}})\ (\text{MSTID2})\ (\text{DUC})$$

Write MRA3 during DUC=

$$(\text{MSTIC1})\ (\overline{\text{MSTIC2}})\ (\text{MSTIC3})\ (\text{MSTID3})\ (\text{DUC})$$

Write MRA4 during DUC=

$$(\text{MSTIC1})\ (\overline{\text{MSTIC2}})\ (\overline{\text{MSTIC3}})\ (\text{MSTID4})\ (\text{DUC})$$

*TRUNK T DIGIT.*—The memory storage area for the trunk T digit is located in the four bits of position B in row DUC. The writing of the trunk T digit is identical to that of the trunk I digit except for the count in the MSTIC flip-flops. The trunk T is the second ticketing digit to be received; and therefore, both MSTIC1 and MSTIC2 enters the true state. The rewrite must also be provided for this position since it is not incorporated into the general format. The write 0 command is again MCE as previously explained. The required write commands are:

Write MRB1 during DUC=
[(MSTIC1) (MSTIC2) ($\overline{\text{MSTIC3}}$) (MSTID1)+(MRB1)] (DUC)

Write MRB2 during DUC=
[(MSTIC1) (MSTIC2) ($\overline{\text{MSTIC3}}$) (MSTID2)+(MRB2)] (DUC)

Write MRB3 during DUC=
[(MSTIC1) (MSTIC2) ($\overline{\text{MSTIC3}}$) (MSTID3)+(MRB3)] (DUC)

Write MRB4 during DUC=
[(MSTIC1) (MSTIC2) ($\overline{\text{MSTIC3}}$) (MSTIC4)+(MRB4)] (DUC)

*Z Digit.*—The memory storage area for the Z digit is located in positions MRC1 and MRC2 of row DUD. Certain subscriber dialed digits are deleted from the memory storage in rows DUC and DUD. When these digits are deleted, a record of their expunction is kept by writing a particular Z digit. Should the subscriber dial a prefix 1, MLZ2 becomes true; the prefix is deleted from rows DUC and DUD; and a 1 is written in MRC1 in row DUD. A 1 is also written into MRC1 of row DUD if the subscriber should dial the ticketing prefix (denoted by the command MLZ3), and the prefix is deleted from rows DUC and DUD. Should the subscriber dial a prefix 0, MLZ1 becomes true; the prefix is deleted from rows DUC and DUD; and a 1 is written in MRC2 of row DUD. Hence, MLZ1, MLZ2, and MLZ3 provide the write 1 commands for the Z digit. It is also necessary to provide the rewrites for the Z digit and the write 0 command for MRC1. The memory bit location MRC1 is the only bit that cannot be cleared in all rows by MCE. The reason for this is explained in the register sequence states which are described later in this section. The write commands for the Z digit are:

Write MRC1 during DUD=($\overline{\text{MCE}}$) [(MLZ2) +(MLZ3)+(MRC1)] (DUD)

Write MRC2 during DUD=[(MLZ1)+(MRC2] (DUD)

*Party Digit.*—The memory storage area for the party digit is located in the four bits of position D in row DUE. The party digit is obtained from the binary weighted, multiplexed leads—MMSA, MMSB, MMSC, and MMSD. However, for this design of the register-sender group, only MMSB of the multiplexing circuit was implemented; and a two party plan was assumed. Therefore, if MMSB is true, a 1 is written in MRD1. If MMSB is true, a 1 is written in MRD2. To insure that the party digit was written only once, the MMSB leads were gated with the X instruction flip-flops in the carry register. These flip-flops are set only once, except for MCX2 in the case of a ticketing call. The write commands for the party digit are:

Write MRD1 during DUE= [(MCX2) +(MCX4)+(MCX8)] ($\overline{\text{MMSB}}$) (DUE)

Write MRD2 during DUE=[(MCX2) +(MCX4)+(MCX8)] (MMSB) (DUE)

The rewrite command for this digit is incorporated into the general write command format, and the write "0" is MCE as previously explained.

*P Highway.*—The memory storage area for the P highway is MRB4 of the register control word. The register control word appears in time slots DUA and DUG. Any information to be written into the register control word is always done during DUG. In time DUA, the information is always rewritten, without change, and is accomplished by the general write command format. The state of the P highway is recorded in the MLP flip-flop during DUA. When the register control word reappears during DUG, that state of the MLP flip-flop is written into memory position MRB4. Hence, the write command is:

Write MRB4 during DUG=(MLP) (DUG).

*Register Sequence States.*—The memory storage area for the register sequence states is located in positions MRC1, MRC2, and MRC3 of the register control word; and they are stored in the normal binary weighted manner. A complete description of these sequence states is given in Chapter 5 and is not covered here. The register sequence states and the equations to advance from any $R_x$ state to another, are shown below:

TABLE 13-13

| Sequence State | MRC1 | MRC2 | MRC3 | Command to Advance from Previous State |
|---|---|---|---|---|
| R1 | 1 | 0 | 0 | |
| R2 | 0 | 1 | 0 | (R1) ($\overline{\text{MCE}}$) |
| R3 | 1 | 1 | 0 | (R2) (MC24) (MTC) |
| R4 | 0 | 0 | 1 | (R3) (MLP) |
| R5 | 1 | 0 | 1 | (R4) [(MCW2)+(MCTOA)] |
| R1 | 1 | 0 | 0 | MCE |

The write command format for the register sequence states is:

($\overline{\text{WRITE 0}}$) [(WRITE 1)+(REWRITE)] (DUG)

As mentioned previously, the write 0 command for all bits in all memory rows, except MRC1 during DUG, is MCE. When MCE is true, 1 is written in bit MRC1 to indicate that the register is idle. Therefore, for this single memory bit only, MCE is part of the normal write 1 command. For all other memory bits, MCE is a write 0 command and will be gated on the final output gate. By reference to Table 13–13, and a judicious arrangement of the equations show there, all the write 1 and write 0 commands required for the register sequence states may be written as:

Write MRC1 during DUG=
$\overline{\text{[(R1) (}\overline{\text{MCE}}\text{)+(R3) (MLP)]}}$ {(MCE) +(R2) (MC24) (MTC)+(R4) [MCW2) +(MCTOA)]+(MRC1)} (DUG)

Write MRC2 during DUG=($\overline{\text{MLP}}$) [(R1)+(R2) (MC24) (MTC)+(MRC2)] (DUG)

Write MRC3 during DUG=[(R3) (MLP)+(MRC3)] (DUG)

*Register Disconnect States.*—The memory storage area for the register disconnect states is located in positions MRD1 and MRD2 of the register control word, and they are stored in the normal binary weighted manner. A complete description of these disconnect states is given in Chapter 5. As detailed in Chapter 5, it is possible to sequence from R2 to V2 upon the command (R2) (MRF1). It is also possible to sequence to V2 from R3 upon the command (R3) ($\overline{\text{MRB4}}$) ($\overline{\text{MLP}}$) (MLRDA–15) (MLRDB–2) (MRG1) or upon the command (R3) (MRB4) (MLP) (MLRDA–15) (MLRDB–0) (MRG1). Any of the three equations listed above, when true, must write a 1 in bit MRD2. It is possible to sequence to V1 from either R4 or R5 upon the command ($\overline{\text{V2}}$) [(R4)+(R5)] [(MRE3)+(MRE4)]. This command being true, a 1 is written in bit MRD1. Once V1 is true, the disconnect state is advanced from V1 to V2 upon the command (V1) (MRE3) (MRE4) ($\overline{\text{MC24}}$). Hence, this command is a write 0 for MRD1 and a write 1 for MRD2. When in disconnect state V2, the register sequences to either the "request trouble recorder" state V3 or to the "idle" state R1. To sequence to R1 from V2, the command is just MCE. But, MCE appears in the final write command output and hence is not required in the disconnect state write commands. To sequence from V2 to V3 the command is (V2) (MMDC) [(MRF1)+(MRF2)] or (V2) ($\overline{\text{MMDC}}$) (MLRDA–4) ($\overline{\text{MRG1}}$) or finally (V2) ($\overline{\text{MMDC}}$) (MLRDA–15) (MLRDB–1) (MRG1). When any of the above three commands are true, a 1 is written in position MRD1.

By use of the format:

($\overline{\text{WRITE 0}}$) [(WRITE 1)+(REWRITE)] (DUG)

and the equations listed in Chapter 5 and also in the above discussion, the write commands can be written as:

Write MRD1 during DUG=
$\overline{[(\text{V1})\ (\text{MRE3})\ (\text{MRE4})\ (\overline{\text{MC24}})]}$ {($\overline{\text{V2}}$) [(R4)+(R5)] [(MRE3)+(MRE4)]+(V2) (MMDC) [(MRF1)+(MRF2)]+(V2) ($\overline{\text{MMDC}}$) (MLRDA–4) ($\overline{\text{MRG1}}$)+(V2) ($\overline{\text{MMDC}}$) MLRDA–15) (MLRDB–1) (MRG1)+(MRD1)} (DUG)

Write MRD2 during DUG=
[(R2) (MRF1)+(V1) (MRE2) (MRE4) ($\overline{\text{MC24}}$+(R3) ($\overline{\text{MRB4}}$) ($\overline{\text{MLP}}$) (MLRDA–15) (MLRDB–0) ($\overline{\text{MRG1}}$)+(R3) ($\overline{\text{MRB4}}$) ($\overline{\text{MLP}}$) (MLRDA–15) (MLRDB–1) (MRG1)+(MRD2)] (DUG)

*Fast Time-Out.*—The memory storage area for the fast time-out indication is located in bit MRD3 of the register control word. The indication that fast time-out is true, is obtained from the flip-flop MCFTO in the carry register. The setting of MCFTO is done during DUA or DUC as explained in Chapter 9. When MCFTO is true, a 1 is written in MRD3 during DUG. MRD3 is then continuously rewritten as long as $\overline{\text{MCADD}}$ is true. Thus, if the subscriber should dial a prefix 0, the logic would assume this was an operator call; and MCFTO would be set. When the subscriber dials his second digit, however, MCADD is true; the fast time-out indication is erased from the memory; and the normal time-out period is again in affect. Hence, the write command for fast time-out is:

Write MRD3 during DUG=
[(MCFTO)+(MRD3) ($\overline{\text{MCADD}}$)] (DUG)

*Trouble Register Relay.*—The memory storage area for this trouble indication is located in bit MRD4 of the register control word. This indication means that "down-check" did not become true within the specified amount of time as described in Chapter 5. When the register is in disconnect state V2, a period of four seconds is allotted for the "down-check" lead to become true for a coin-box call, and 32 milliseconds if the call is not from a coin-box. Hence, the required write command is:

Write MRD4 during DUG=
[(V2) ($\overline{\text{MMDC}}$) (MLRDA–15) (MLRDB–1) (MRG1)+(V2) ($\overline{\text{MMDC}}$) (MLRDA–4) ($\overline{\text{MRG1}}$)+(MRD4)] (DUG)

W1: The memory storage area for this indication is located in bit MRE1 of the register control word. W1 is the indication that the first two digits of the called party's station number are in the memory storage of row DUD. When these two digits are in storage, MCW1 in the carry register is set to the 1 state during DUD. When time DUG appears and MCW1 is true, a 1 is written in MRE1. When the same register control word is read out the memory during DUA, and MRE1 is true, the flip-flop MCW1 is again set to the 1 state as described in Chapter 9. Hence, once MCW1 is set and that information is written into the memory, it is continuously set to the 1 state in the register's time slot. For this reason, no rewrite command is required for this bit. The write command is simply:

Write MRE1 during DUG=(MCW1) (DUG).

W2: The memory storage area for this indication is located in bit MRE2 of the register control word. W2 is the indication of finished dialing, and the method of obtaining this information is detailed in Chapter 9. This is very similar to the MCW1 case in that no rewrite is required since MCW2 is true continuously once it has been set. The write command is:

Write MRE2 during DUG=(MCW2) (DUG).

*Sender Disconnect.*—The memory storage area for sender disconnect is located in bit MRE3 of the register control word. The sender disconnect indication is obtained from MCSDC in the carry register, and the manner in which this information is placed in this flip-flop is described in Chapter 9. This case is identical to the MCW1 case, inasmuch as MSCDC is continuously set to the 1 state after it is read out of the memory during DUA. The write command is:

Write MRE3 during DUG=(MCSDC) (DUG).

*Register Disconnect.*—The memory storage area for register disconnect is located in bit MRE4 of the register control word. This case is identical to that for sender disconnect. The write command is:

Write MRE4 during DUG=(MCRDC) (DUG).

*Trouble-Register.*—The memory storage area for this indication is MRF1 of the register control word. There are only two cases where register trouble is recorded; if the register is in some impossible sequence state (i.e. BL–MRC or R6 or R7) or if the trouble flip-flop (MTT) in the transfer register is set to the true state. Hence, the write command is:

Write MRF1 during DUG=
[(BL–MRC)+(MLRDC–6)+(MLRDC–7)+(MC24) (MTT)+(MRF1)] (DUG)

*Trouble Sender.*—The memory storage area for this indication is MRF2 of the register control word. This information is available from MCTS in the carry register as explained in Chapter 9. This flip-flop, once set, is continuously true in the same manner as previously described. The write command is:

Write MRF2 during DUG=(MCTS) (DUG).

*Decision.*—The memory storage area for this indication is MRF3 of the register control word. This information is available from the X instruction flip-flops in the carry register. Whenever any of the X instruction flip-flops are in the 1 state, a 1 is written in MRF3 during DUG. Whenever MRF3 is read out during DUA, and it is in the 1 state, the flip-flop MCD in the carry register is set to the 1 state. Thus, the rewrite for MRF3 is MCD. The total write command is:

Write MRF3 during DUG=[(MCX2)+(MCX4)+(MCX8)+(MCD)] (DUG).

24: The memory storage area for this indication is MRF4 of the register control word. This bit being true indicates that "this is the register which has been seized and is working with the transfer register." The write 1 command for this bit is MC24 in the carry register. This flip-flop, once set, is continuously true in the same manner as previously described. However, to release the transfer register, a write 0 command is necessary to prevent MC24 from being set continuously from row DUA. Therefore, when the register releases the transfer register on the command (MTT)+(MTC)+(TMTRS), the same command is used as a write 0 command for bit MRF4. Hence, the total write command is:

Write MRF4 during
DUG=[$\overline{(\text{MTT})+(\text{MTC})+(\text{TMTRS})}$] (MC24) (DUG).

*Coin Box.*—The memory storage area for coin-box is MRG1 of the register control word. When a register is in sequence state R2, this means that the register has seized the transfer register, has transferred an X instruction of six into the MTIN flip-flops in the transfer register, and is awaiting the LNI of the subscriber. When the LNI is received, MTC becomes set; and the information contained in the MTP flip-flops is transferred to the memory storage area allocated for it. If the class of service digits contained in the MTPA and MTPG flip-flops are K=10 and Y=1, respectively, a 1 is written in the coin box bit MRG1. The rewrite condition is necessary in this case; hence the write command for coin-box is:

Write MRG1 during $$DUG=[(MTC)\ (MC24)\ (\overline{MTIN1})\ (MTIN2)\ (MTIN3)\ (\overline{MTIN4})\ (\overline{MTPA1})\ (MTPA2)\ (\overline{MTPA3})\ (MTPA4)\ (MTPB1)\ (MTPB2)\ (\overline{MTPB3})\ (\overline{MTPB4})+(MRG1)]\ (DUG).$$

*X Instructions.*—The memory storage area for the X instructions is located in the four bits of position H of the register control word, and they are stored in the normal binary weighted manner. The presence of an X instruction in this position during DUA is a request for the transfer register. Whenever an X instruction is read out during DUA, the flip-flop MCXIN in the MC register is set to the 1 state. If at this time, the MTIN flip-flops in the transfer register are blank, the flip-flop MC24 in the transfer register is set to the 1 state; and the X instruction is written into the MTIN flip-flops. Hence, when both MCXIN and MC24 are true during DUG or if MCRDC is true, the request for the transfer register must be removed since it has just been seized or the register is disconnecting. The write 0 command for all bits is then (MCXIN) (MC24)+(MCRDC). There are three cases where a write 1 command is required. First, whenever any of the X instruction flip-flops in the carry register (MCX flip-flops) have a 1 in them, which was obtained from some other memory row. The second case is when the register is in sequence state R1, and the MLA+B indication is true. This is the register seizure procedure as outlined in Chapter 5, and an X instruction of six must be written in order to seize the transfer register for the receipt of the LNI. The third case is for a ticketing call. Whenever the call is ticketing, an LNT must be performed. When the LNT is complete, as indicated by the logic command (MTC) (MC24) ($\overline{MTIN1}$) (MTIN2) ($\overline{MTIN3}$), the first ticketing access instruction of seven is written into position H. From the above discussion and from the write command format of:

$$(\overline{WRITE\ 0})\ [(WRITE\ 1)+(REWRITE)]\ (DUG)$$

the write commands for the four bits in position H of the register control word may be written as:

Write MRH1 during DUG=

$$[\overline{(MC24)\ (MCXIN)+(MCRDC)}]\ [(MTC)\ (MC24)\ (\overline{MTIN1})\ (MTIN2)\ (\overline{MTIN3})+(MRH1)]\ (DUG)$$

Write MRH2 during DUG=

$$[\overline{(MC24)\ (MCXIN)+(MCRDC)}]\ [(MTC)\ (MC24)\ (\overline{MTIN1})\ (MTIN2)\ (\overline{MTIN3})+(MLRDC\text{–}1)\ (MLA+B)+(MCX2)+(MRH2)]\ (DUG)$$

Write MRH3 during DUG=

$$[\overline{(MC24)\ (MCXIN)+(MCRDC)}]\ [(MTC)\ (MC24)\ (\overline{MTIN1})\ (MTIN2)\ (\overline{MTIN3})+(MLRDC\text{–}1)\ (MLA+B)+(MCX4)+(MRH3)]\ (DUG)$$

Write MRH4 during DUG=

$$[\overline{(MC24)\ (MCXIN)+(MCRDC)}]\ [(MCX8)+(MRH4)]\ (DUG)$$

*Drum Address and Trunk J Digit.*—The memory storage area for this information is located in the four bits of position I of the register control word, and they are stored in the normal binary weighted manner. This memory position may store four different addresses during the course of a call. When the register is seized by a marker, this position stores the address of that marker. This information is obtained from the HWY1 to HWY5 leads. As explained in Chapter 6, all the seizure leads from a marker are multiplexed onto one of the HWY leads. Thus, when a mark appears on a HWY lead, this is in decimal form, and the address of the marker must be encoded in binary form to place it in storage. For example, if the mark appears on HWY3, a binary three must be stored in position I to correspond to the address for marker number three.

After the register sequences to the "dialing" state R4, all addresses either equal or exceed a decimal eight. Hence, when R4 is true, a binary eight is written into position MRI4; and only three bits then remain to be encoded and stored in position I. For a local call, the address is obtained directly from MCO flip-flops in the carry register. The MCO flip-flops receive the address in the manner described in Chapter 9. For any call other than a local call, one translator address is selected by a strapping field. These calls always have an X instruction of eight or more. Hence, MCX8 is strapped to any or all of the WSJ1 to WSJ3 leads in the strapping field, and the area code translator address is selected. The fourth possible address is the ticketer address or the trunk J digit. The writing of the trunk J digit is identical to that of the trunk T and I digits except for the count in the MSTIC flip-flops. The trunk J digit is the first ticketing digit to be received; and therefore, MSTIC1, MSTIC2, and MSTIC3 are all in the true state.

The address is transferred from position I to the transfer register at the same time the X instruction is transferred. Therefore, the same write 0 command (MC24) (MCXIN) can be used, but for one exception. This exception is for a ticketing call. As mentioned in the X instruction's section, an LNT must be performed before the register may go for the ticketer. At this time, however, the trunk J digit is in storage in position I; and it cannot be expunged from the memory. If, however, the write 0 command is used in coincidence with the inversion of the X instruction at that time, the trunk J digit would not be deleted. The X instruction of two is in the storage for the LNT; and therefore, the write 0 command is (MC24) (MCXIN) ($\overline{MLRDH\text{–}2}$). Using the same format as for the X instruction, the write commands for position I are:

Write MRI1 during DUG=

$$[\overline{(MC24)\ (MCXIN)\ (\overline{MLRDH\text{–}2})}]\ \{(MLRDC\text{–}1)\ [(HWY1)+(HWY2)+(HWY3)]+(MCO1)+(WSJ1)+(MSTIC1)\ (MSTIC2)\ (MSTIC3)\ (MSTID1)+(MRI1)\}\ (DUG)$$

Write MRI2 during DUG=

$$[\overline{(MC24)\ (MCXIN)\ (\overline{MLRDH\text{–}2})}]\ \{(MLRDC\text{–}1)\ [(HWY2)+(HWY3)]+(MCO2)+(WSJ2)+(MSTIC1)\ (MSTIC2)\ (MSTIC3)\ (MSTID2)+(MRI2\}\ (DUG)$$

Write MRI3 during DUG=

$$[\overline{(MC24)\ (MCXIN)\ (\overline{MLRDH\text{–}2})}]\ \{(MLRDC\text{–}1)\ [(HWY4)+(HWY5)]+(MCO4)+(WSJ3)+(MSTIC1)\ (MSTIC2)\ (MSTIC3)\ (MSTID3)+(MRI3)\}\ (DUG)$$

Write MR14 during $DUG=[(MLRDC\text{–}4)+(MRI4)]\ (DUG)$

NOTE.—No write 0 command is required for MRI4 since the binary weight of eight is required for all addresses once the register sequences to the dialing state.

13.6 *Miscellaneous and decoding logic*

The miscellaneous and decoding logic is that portion of the common control logic where the decoding logic and the miscellaneous logical quantities are formed. Each position in the read register is decoded (binary to decimal conversion) to obtain decoded logic commands needed throughout the system. The miscellaneous logical quantities are miscellaneous commands logically formed that are used in the carry register and various other circuits.

The decoding logic portion of the common control logic decodes (binary to decimal conversion) various positions of the read register. Position (A) is decoded to form the logic commands for a decoded decimal 4, 10, and 15 respectively. Position (B) of the read register has only two bits that are decoded to form the mode of counting logic. Four bits in position (C) are decoded to form logic commands for a decoded decimal, one through fourteen. Depending on the memory row, decoded position (D) of the read register forms the miscellaneous logic for the (Q) sequence states and for the (V) disconnect states. Two bits in row DUA form the logic for the disconnect states ($V_x$) while three bits in row DUB form the logic for the (Q) sequence states. Positions (E) and (F) of the read register, when decoded, have no decimal equivalent and are referred to as blank positions. Positions (G) and (I) are decoded to form the logic commands for a decoded decimal, one through ten. Position (H) is decoded to form the logic commands for a decoded decimal, one through fifteen.

The miscellaneous logic portion of the common control logic forms sixteen logical quantities that are used throughout the system. All the decoded logic commands are formed by a binary to decimal decoding of the different positions in the read register. For example, the miscellaneous logic command MLRDX–N means there is a decoded decimal (N) in position (X) of the read register.

ML=Miscellaneous logic
R=Register
D=Decoded binary to decimal
X=Position in read register
N=Decimal equivalent A decoding matrix is used for positions (I), (H), and (G) of the read register. At any position the binary information is stored in four flip-flops, each having a binary weight of 1, 2, 4, and 8 respectively. The binary information is decoded in the decoding matrices to form the associated miscellaneous logic commands. The decoded logic commands are listed below:

MLRDI–1 through MLRDI–10
A decoded decimal, one through ten, is in position (I) of the read register;
BL–MRI Position (I) in the read register is blank;
MLRDH–1 through MLRDH–15
A decoded decimal, one through fifteen, is in position (H) of the read register;
BL–MRH Position (H) in the read register is blank;
MLRDG–1 through MLRDG–10
A decoded decimal, one through ten, is in position (G) of the read register;
BL–MRG Position (G) in the read register is blank.

The decoding matrix for position (C) of the read register is very similar to positions (I), (H), and (G). The decoded logic commands for position (C) are:

MLRDC–1 through MLRDC–14
A decoded decimal, one through fourteen, is in position (C) of the read register;
BL–MRC Position (C) in the read register is blank.

Only two bits in position (B) of the read register are decoded to form the mode of counting logic; MLRDB–0 and MLRDB–1. This means there is a decoded decimal (0) and (1) respectively in position (B) of the read register. The equation for MLRDB–1 is $$(MRB1)\ (\overline{MRB2})$$

and the equation for MLRDB–0 is $(\overline{MRB1})\ (\overline{MRB2})$.

When position (D) of the read register is decoded, distinction must be made between memory row DUA and memory row DUB. Two bits in memory row DUA are decoded to obtain the disconnect sequence states ($V_x$), and three bits in memory row DUB are decoded to obtain the (Q) sequence states. Two rows must be used for the decoding because the arrangement of bits FTO and TRR in memory row DUA would interfere with a normal four bit decoding. The decoded logic commands for position (D) are listed below:

MLRDD–1A=(MRD1) $(\overline{MRD2})$
First disconnect state (V1) in row DUA;
MLRDD–2A=$(\overline{MRD1})$ (MRD2)
Second disconnect state (V2) in row DUA;
MLRDD–3A=(MRD1) (MRD2)
Third disconnect state (V3) in row DUA;
MLRDD–1B=(MRD1) $(\overline{MRD2})$ $(\overline{MRD3})$
Q1 sequence state in row DUB;
MLRDD–2B=$(\overline{MRD1})$ (MRD2) $(\overline{MRD3})$
Q2 sequence state in row DUB;
MLRDD–3B=(MRD1) (MRD2) $(\overline{MRD3})$
Q3 sequence state in row DUB;
MLRDD–4B=$(\overline{MRD1})$ $(\overline{MRD2})$ (MRD3)
Q4 sequence state in row DUB;
MLRDD–5B=(MRD1) $(\overline{MRD2})$ (MRD3)
Q5 sequence state in row DUB;
MLRDD–6B=$(\overline{MRD1})$ (MRD2) (MRD3)
Q6 sequence state in row DUB;
MLRDD–7B=(MRD1) (MRD2) (MRD3)
Q7 sequence state in row DUB;
BL–MRD Position (D) in the read register is blank.

Position (A) of the read register is decoded in a manner similar to positions (I), (H), and (G). The decoded logic commands for position (A) are listed below:

MLRDA–4 A decoded decimal four is in position (A) of the read register.
MLRDA–10 A decoded decimal ten is in position (A) of the read register.
MLRDA–15 A decoded decimal fifteen is in position (A) of the read register.
BL–MRA Position (A) in the read register is blank.

There is only one decoded logic command for positions (E) and (F):

BL–MRE=$(\overline{MRE1})$ $(\overline{MRE2})$ $(\overline{MRE3})$ $(\overline{MRE4})$
Position (E) in the read register is blank.
BL–MRF=$(\overline{MRF1})$ $(\overline{MRF2})$ $(\overline{MRF3})$ $(\overline{MRF4})$
Position (F) in the read register is blank.

The sixteen miscellaneous logical quantities are logically formed in this section and are listed below. Time (DUA) is not listed in the logical expression for MLF, as presented below, since the term MLF is combined with time at the various circuits where it is employed. Thus, time has been omitted in many of the logical quantities presented in this section. Where time is considered an important factor the memory row is indicated to show at what time the function can be true.

MLF is the logical quantity signifying interdigital pause.

MLF=(MLRDC–4) (MLRDB–0) (MLRDA–15) (MRB4) (MLP) $(\overline{MLRDC\text{–}3})$ The command to form MLF is a decoded decimal four in position (C), a decoded decimal 0 in position (B), a decoded decimal fifteen in position (A), and a binary weight of eight in MRB4 and MLP; but there is not a decoded decimal three in position (C) of the read register. The logical quantity (MLF) is derived for use in row DUA.

MLDR3 is the logical quantity that signifies three digits have been dialed. The equation for three dialed digits is: position (G) in the read register is not blank, and position (H) is not blank, and position (I) is not blank.

$$MLDR3=(\overline{BL\text{–}MRG})\ (\overline{BL\text{–}MRH})\ (\overline{BL\text{–}MRI})$$

MLDR3 is derived for use in row DUC.

MLBN7 is the logical quantity that indicates seven digits have been dialed. The equation for seven dialed digits is: position (C) in the read register is not blank, and position (D) is not blank.

$$MLBN7=(\overline{BL\text{–}MRC})\ (\overline{BL\text{–}MRD})$$

MLBN7 is derived for use in row DUD.

MLVX is the logical quantity indicating that the register is in some disconnect state ($V_x$). The equation for any disconnect state (MLVX) is: disconnect state (V1) or disconnect state (V2) or disconnect state (V3).

$$MLVX=(MLRDD\text{–}1A)+(MLRDD\text{–}2A)+(MLRDD\text{–}3A)$$

MLVX is derived for use in row DUA.

MLP is a flip-flop that stores the state of the multiplexed (P) highway (MMP) during each register time slot. The commands for the MLP flip-flop are: DUC set=MMP; DC reset=MLP; AC set=(CPB) (DUA) (DID); AC reset=(CPB) (DUG) (DIG).

MLADD is the logical quantity indicating recognition of one of the pulses in a dialed digit. The equation for MLADD is a decoded decimal four in position (C) of the read register, and the register is not in some disconnect state, and the (P) highway is available, and there is not a binary weight of eight in position (B) of the read register.

$$MLADD=(MLRDC\text{–}4)\ (\overline{MLVX})\ (MLP)\ (\overline{MRB4})$$

MLADD is derived for use in row DUA.

ML(A+B) is the logical quantity indicating that the originating line group marker is attempting to seize a register. The equation for ML(A+B) is $$(HWY1)+(HWY2)+(HWY3)+(HWY4)+(HWY5)$$

ML(A+B) is derived for use in row DUA.

BL–MTIN is the logical quantity that indicates that the (IN) flip-flops in the MT transfer register are blank. The equation for BL–MTIN is $$(\overline{MTIN1})\ (\overline{MTIN2})\ (\overline{MTIN3})\ (\overline{MTIN4})$$

BL–MTPA is the logical quantity that indicates that the (PA) flip-flops in the transfer register are blank. The equation for BL–MTPA is $$(\overline{MTPA1})\ (\overline{MTPA2})\ (\overline{MTPA3})\ (\overline{MTPA4})$$

MLTOA is the logical quantity to time out with the counter in row DUA. The equation for MLTOA is $$(MLRDC\text{–}4)\ (MLRDA\text{–}15)\ (MRB4)\ (MLP)\ (\overline{MLRDC\text{–}3})\ (MRB2)$$

MLTOA is derived for use in row DUA.

MLTOB is the logical quantity to time out with the counter in row DUB. The equation for MLTOB is (MLRDA–15) (MRB2). MLTOB is derived for use in row DUB.

MLE is the logical quantity to erase all information in the memory and return to the idle state. The command for MLE is $$[(TRRGO+MLGO)\ (MLRDD\text{–}3A)]+[(MLRDD\text{–}2A)\ (\overline{MRF1})\ (MMDC)\ (\overline{MRD2})]+[(\overline{MLA+B})\ (MLRDC+1)]$$

MLE is derived for use in row DUA.

MLC1 is the output of a flip-flop producing 8 ms. pulse widths at a pulse repetition frequency of 300 ms. The commands for MCL1 are: DC set=($\overline{MLC1}$) (DR1) (MLAS–A); DC reset=(DR1) (MLC1); AC set=AC reset=(CPB) (DUA) (DID).

MLC2 is the output of a gate producing an 8 ms. pulse width at a pulse repetition frequency of 1.2 sec. The command for MLC2 is $$(MLC2A)+[(MRD3)+(RSTRF)]\ (DUG)$$

MLGO is a lead to simulate release of the register from the trouble recorder. A single pole double-throw switch is mounted on a special switch card. The off position is grounded.

MLFUT, $\overline{MLFUT}$ are two leads from a double-pole-double-throw switch, mounted on a special switch card, which indicates the numbering plan to be used; the present (future) or the future.

The commands, for the most part, have been developed by decoding various positions in the read register. The remaining miscellaneous logical quantities were provided by flip-flops, gates, or simulated with special switch cards.

13.7 *Detailed write command logic*

The write command format for any memory position is: ($\overline{WRITE\ 0}$) [(WRITE 1)+(REWRITE)]. The write 0 or 1 and the rewrite commands vary depending upon the bit location in any memory row; but the format is always the same. The 36 equations listed below are the total write commands for each bit position in all six memory rows. If a time slot (i.e. DUA through DUG inclusive) does not appear in a portion of any write command equation, that portion is then covered in the general write command format as described in Section 13–2 of this chapter. Those special cases detailed in Sections 13–3, 13–4, and 13–5 of this chapter are all gated with the row's time slot in which they appear. For example, the total write command for any bit is:

$$MWXY=(MWXY1)\ (DUA)+(MWXY2)\ (DUB)+(MWXY3)\ (DUC)+(MWXY4)\ (DUD)+(MWXY5)\ (DUE)+(MWXY6)\ (DUF)+(MWXY7)\ (DUG)$$

where the MWXY indicates the write command for the Yth bit in position X. The numerical designation after the MWXY is to show that the write command for each memory row is unique. Each of the MWXY's in the various rows, must account for the write 0, write 1, and rewrite portions of the write command for that row. However, some of the MWXY's may be grouped together in a general write command format as described in Section 13–2 of this chapter. Therefore, it is necessary to implement only those positions and rows that require the special considerations. The write command for MWE3 is:

$$MWE3=(\overline{TWE})\ (\overline{MCE})\ \{[(MTPE3)\ (\overline{J\text{–}34})+(MRE3)\ (\overline{J\text{–}35})]\ (\overline{J\text{–}4})\ (\overline{J\text{–}23})+[(\overline{MLRDD\text{–}4B})\ (\overline{BL\text{–}STID})\ (MRE3)]\ [(MLRDD\text{–}4B)\ (MLRDC\text{–}2)\ (MRH4)\ [(MRH1)+(MRH2)+(MRH3)]\ (MSA)\ (MSR)+(MRE3)]\ (DUB)+(MCSDC)\ (DUG)\}$$

By inspection of MWE3, it is apparent that the only row's time slots present are for rows DUB and DUG. The remaining portion of the write command must be the general write command format and it must in turn, fulfill all the requirements for all the rows not specifically mentioned in the equation for MWE3. Hence, $$[(MTPE3)\ (\overline{J\text{–}34})+(MRE3)\ (\overline{J\text{–}35})]\ (\overline{J\text{–}4})\ (\overline{J\text{–}23})$$

must be equal to $$(MWXY1)\ (DUA)+(MWXY3)\ (DUC)+(MWXY4)\ (DUD)+(MWXY5)\ (DUE)+(MWXY6)\ (DUF)$$

and is the write 1, the write 0 and rewrite portions for all these rows. The portion of MWE3 that is:

$\overline{[(\text{MLRDD-4B})\ (\overline{\text{BL-STID}})\ (\text{MRE3})]}$
[(MLRDD-4B) (MLRDC-2) (MRH4) [(MRH1)+(MRH2)+(MRH3)] (MSA) (MSR)+(MRE3)] (DUB)

must be equal to (MWXY2) (DUB). It can be seen that this portion does indeed fulfill the write 0, write 1, and rewrite requirements. That portion of MWE3 that is (MCSDC) (DUG) must be equal to (MWXY7) (DUG). As mentioned in Section 13-5 of this chapter, MCSDC is both the write 1 and the rewrite portion of the write command and also that no special write 0 portion is required for this bit. The ($\overline{\text{TWR}}$) ($\overline{\text{MCE}}$) is the overall ($\overline{\text{write 0}}$) for all memory rows as mentioned in Section 13-5. Thus the write commands for memory position MRE3 have been accounted for, for all memory rows.

Write command equations:

MWA1=($\overline{\text{TWR}}$) ($\overline{\text{MCE}}$) {[MSTIC1) ($\overline{\text{MSTIC2}}$) ($\overline{\text{MSTIC3}}$) (MSTID1) (DUC)+(MTPA1) ($\overline{\text{J-33}}$)+(MRA1)] [(DUA)+(DUC) (MCD)+(DUE)]+($\overline{\text{MTIN1}}$) (MTIN2) ($\overline{\text{MTIN4}}$) (MTC) (MC24) (MTPA1) (DUE)+[($\overline{\text{MRA1}}$) ($\overline{\text{J-78}}$)+(MRA1) ($\overline{\text{J-79}}$)+(J-119)] ($\overline{\text{J-99}}$)}

MWA2=($\overline{\text{TWR}}$) ($\overline{\text{MCE}}$) {[(MSTIC1) ($\overline{\text{MSTIC2}}$) ($\overline{\text{MSTIC3}}$) (MSTID2) (DUC)+(MTPA2) ($\overline{\text{J-33}}$)+(MRA2)] [(DUA)+(DUC) (MCD)+(DUE)]+($\overline{\text{MTIN1}}$) (MTIN2) ($\overline{\text{MTIN4}}$) (MTC) (MC24) (MTPA2) (DUE)+[($\overline{\text{J-53}}$) ($\overline{\text{J-78}}$)+(MRA2) ($\overline{\text{J-79}}$)] ($\overline{\text{J-99}}$) ($\overline{\text{J-119}}$)}

MWA3=($\overline{\text{TWR}}$) ($\overline{\text{MCE}}$) {[(MSTIC1) ($\overline{\text{MSTIC2}}$) ($\overline{\text{MSTIC3}}$) (MSTID3) (DUC)+(MTPA3) ($\overline{\text{J-33}}$)+(MRA3)] [(DUA)+(DUC) (MCD)+(DUE)]+($\overline{\text{MTIN1}}$) (MTIN2) ($\overline{\text{MTIN4}}$) (MTC) (MC24) (MTPA3) (DUE)+[($\overline{\text{J-57}}$) ($\overline{\text{J-78}}$)+(MRA3) ($\overline{\text{J-79}}$)] ($\overline{\text{J-99}}$) ($\overline{\text{J-119}}$)}

MWA4=($\overline{\text{TWR}}$) ($\overline{\text{MCE}}$) {[(MSTIC1) ($\overline{\text{MSTIC2}}$) ($\overline{\text{MSTIC3}}$) (MSTID4) (DUC)+(MTPA4) ($\overline{\text{J-33}}$)+(MRA4)] [(DUA)+(DUC) (MCD)+(DUE)]+($\overline{\text{MTIN1}}$) (MTIN2) ($\overline{\text{MTIN4}}$) (MTC) (MC24) (MTPA4) (DUE)+[($\overline{\text{J-62}}$) ($\overline{\text{J-78}}$)+(MRA4) ($\overline{\text{J-79}}$)] ($\overline{\text{J-99}}$) ($\overline{\text{J-119}}$)}

MWB1=($\overline{\text{TWR}}$) ($\overline{\text{MCE}}$) {[(MTPB1) ($\overline{\text{J-33}}$)+(MRB1)] ($\overline{\text{J-26}}$)+[(MLRDA-15) (MLRDB-0)+(MRB1)] (DUB)+[(MSTIC1) (MSTIC2) ($\overline{\text{MSTIC3}}$) (MSTID1)+(MRB1)] (DUC)+[$\overline{(\text{MLRDC-3})\ (\text{MLP})\ (\overline{\text{MRD2}})}$ $\overline{+(\text{MLRDC-4})\ (\overline{\text{MLP}})\ (\overline{\text{MRD2}})+(\text{MCE})}$ +($\overline{\text{J-99}}$)] [[(MLRDC-2)+(MLRDC-3)+(MLRDC-4)+(MLRDD-2A)] (MLRDA-15) (MLRDB-0)+(MRB1)] (DUG)}

MWC4=($\overline{\text{TWR}}$) ($\overline{\text{MCE}}$) {[(MTPC4) ($\overline{\text{J-33}}$)+(MRC4)] ($\overline{\text{J-25}}$)+(K-97)}

MWD1=($\overline{\text{TWR}}$) ($\overline{\text{MCE}}$) {[(MTPD1) ($\overline{\text{J-34}}$)+(MRD1) ($\overline{\text{J-36}}$)] ($\overline{\text{J-2}}$) ($\overline{\text{J-24}}$)+[(MLRDD-1B) (AA)+(MLRDD-3B) ($\overline{\text{AT}}$)] [(BL-MRD) [(MLRDH-3)+(MLRDH-6)+(MLRDH-11)+(MLRDH-14)+($\overline{\text{BL-MRH}}$) (MCW2)]+(MLRDD-2B)+(MLRDD-4B) [($\overline{\text{MSR}}$)+(MCRDC)+(MLTOB)]+(MRD1)] (DUB)+[(MTPD1) ($\overline{\text{MTIN1}}$) (MTIN2) ($\overline{\text{MTIN4}}$) (MC24) (MTC) (DUE)+($\overline{\text{MMSB}}$) [(MCX2)+(MCX4)+(MCX8)]+(MRD1) [($\overline{\text{MTIN1}}$) (MTIN2) ($\overline{\text{MTIN4}}$) (MC24) $\overline{(\text{MTC})\ (\text{DUE})+(\text{MCX2})+(\text{MCX4})+(\text{MCX8})]]}$ (DUE)+[($\overline{\text{MLRDD+1A}}$) $\overline{(\text{MRE3})\ (\text{MRE4})}$ ($\overline{\text{MC24}}$)] [($\overline{\text{MLRDD-2A}}$) [(MLRDC-4)+(MLRDC-5)] [(MRE3)+(MRE4)]+(MLRDD-2A) (MMDC) [(MRF1)+(MRF2)]+(MLRDD-2A) ($\overline{\text{MMDC}}$) (MLRDA-4) ($\overline{\text{MRG1}}$)+(MLRDD-2A) ($\overline{\text{MMDC}}$)+(MLRDA-15) (MLRDB-1) (MRG1)+(MRD1)] (DUG)}

MWD2=($\overline{\text{TWR}}$) ($\overline{\text{MCE}}$) {[(MTPD2) ($\overline{\text{J-34}}$)+(MRD2) ($\overline{\text{J-36}}$)] ($\overline{\text{J-2}}$) ($\overline{\text{J-24}}$)+($\overline{\text{MLRDD-3B}}$) [(MLRDD-1B) (AA)+(MLRDD-2B)+(MLRDD-5B)+(MRD2)] (DUB)+[(MTPD2) ($\overline{\text{MTIN1}}$) (MTIN2) ($\overline{\text{MTIN4}}$) (MC24) (MTC) (DUE)+(MMSB) [(MCX2)+(MCX4)+(MCX8)] (MRD2) $\overline{[(\overline{\text{MTIN1}})}$ $\overline{(\text{MTIN2})\ (\overline{\text{MTIN4}})\ (\text{MC24})\ (\text{MTC})\ (\text{DUE})}$ +$\overline{(\text{MCX2})}$+($\overline{\text{MCX4}}$)+($\overline{\text{MCX8}}$)]] (DUE)+[(MLRDC-2) (MRF1)+(MLRDC-3) ($\overline{\text{MRB4}}$) ($\overline{\text{MLP}}$) (MLRDA-15) (MRB2) (MRG1)+(MLRDC-3) ($\overline{\text{MRB4}}$) ($\overline{\text{MLP}}$) (MLRDA-15) (MLRDB-0) ($\overline{\text{MRG1}}$)+(MLRDD-1A) (MRE3) (MRE4) ($\overline{\text{MC24}}$)+(MRD2)] (DUG)}

MWD3=($\overline{\text{TWR}}$) ($\overline{\text{MCE}}$) {[(MTPD3) ($\overline{\text{J-34}}$)+(MRD3) ($\overline{\text{J-36}}$)] ($\overline{\text{J-2}}$) ($\overline{\text{J-24}}$)+[(MLRDD-3B)+(MLRDD-4B) [($\overline{\text{MSR}}$)+(MCRDC)+(MLTOB)]+(MRD3)] (DUB)+[(MTPD3) $\overline{(\overline{\text{MTIN1}})\ (\text{MTIN2})\ (\overline{\text{MTIN4}})}$ $\overline{(\text{MC24})\ (\text{MTC})\ (\text{DUE})}$+[($\overline{\text{MTIN1}}$) (MTIN2) ($\overline{\text{MTIN4}}$) (MC24) (MTC) (DUE)] (MRD3)] (DUE)+[(MCFTO)+($\overline{\text{MCADD}}$) (MRD3)] (DUG)}

MWD4=($\overline{\text{TWR}}$) ($\overline{\text{MCE}}$) {[(MTPD4) ($\overline{\text{J-34}}$)+(MRD4) ($\overline{\text{J-36}}$) ($\overline{\text{J-2}}$) ($\overline{\text{J-24}}$)+[(MTPD4) ($\overline{\text{MTIN1}}$) (MTIN2) ($\overline{\text{MTIN4}}$) (MC24) (MTC) (DUE)+$\overline{[(\overline{\text{MTIN1}})\ (\text{MTIN2})\ (\overline{\text{MTIN4}})\ (\text{MC24})}$ $\overline{(\text{MTC})\ (\text{DUE})]}$ (MRD4)] (DUE)+[(MLRDD-2A) ($\overline{\text{MMDC}}$) (MLRDA-15) (MLRDB-1) (MRG1)+(MLRDD-2A) ($\overline{\text{MMC}}$) (MLRDA-4) ($\overline{\text{MRG1}}$)+(MRD4)] (DUG)}

MWE1=($\overline{\text{TWR}}$) ($\overline{\text{MCE}}$) {[(MTPE1) ($\overline{\text{J-34}}$)+(MRE1) ($\overline{\text{J-36}}$) ($\overline{\text{J-4}}$) ($\overline{\text{J-23}}$)+[$\overline{(\text{MLRDD-4B})}$ $\overline{(\overline{\text{BL-STID}})\ (\text{MRE1})\ (\overline{\text{MRE2}})]}$ [(MLRDD-4B) (MLRDC-2) (MRH4) [(MRH1)+(MRH2)+(MRH3)] (MSA) (MSR)+(MRE1)] (DUB)+(MCW1) (DUG)}

MWE2=($\overline{\text{TWR}}$) ($\overline{\text{MCE}}$) {[(MTPE2) ($\overline{\text{J-34}}$)+(MRE2) ($\overline{\text{J-36}}$) ($\overline{\text{J-4}}$) ($\overline{\text{J-23}}$)+[$\overline{(\text{MLRDD-4B})}$ $\overline{(\overline{\text{BL-STID}})\ (\text{MRE2})\ (\overline{\text{MRE3}})]}$ [(MLRDD-4B) (MLRDC-2) (MRH4) [(MRH1)+(MRH2)+(MRH3)] (MSA) (MSR)+(MRE2)] (DUB)+(MCW2) (DUG)}

MWE3=($\overline{\text{TWR}}$) ($\overline{\text{MCE}}$) {[(MTPE3) ($\overline{\text{J-34}}$)+(MRE3) ($\overline{\text{J-36}}$)] ($\overline{\text{J-4}}$) ($\overline{\text{J-23}}$)+[$\overline{(\text{MLRDD-4B})\ (\overline{\text{BL-STID}})\ (\text{MRE3})]}$ [(MLRDD-4B) (MLRDC-2) (MRH4) [(MRH1)+(MRH2)+(MRH3)] (MSA) (MSR)+(MRE3)] (DUB)+(MCSDC) (DUG)}

MWE4=($\overline{\text{TWR}}$) ($\overline{\text{MCE}}$) {[(MTPE4) ($\overline{\text{J-34}}$)+(MRE4) ($\overline{\text{J-36}}$)] ($\overline{\text{J-4}}$) ($\overline{\text{J-23}}$)+(MCRDC) (DUG)}

MWF1=($\overline{\text{TWR}}$) ($\overline{\text{MCE}}$) {[(MTPF1) ($\overline{\text{J-34}}$) +(MRF1) ($\overline{\text{J-37}}$)] ($\overline{\text{J-4}}$) ($\overline{\text{J-23}}$)+[(BL-MRC) +(MLRDC-6)+(MLRDC-7)+(MTT) (MC24)+(MRF1)] (DUG)}

MWF2=($\overline{\text{TWR}}$) ($\overline{\text{MCE}}$) {[(MTPF2) ($\overline{\text{J-34}}$) +(MRF2) ($\overline{\text{J-37}}$)] ($\overline{\text{J-4}}$) ($\overline{\text{J-23}}$)+(MCTS) (DUG)}

MWF3=($\overline{\text{TWR}}$) ($\overline{\text{MCE}}$) {[(MTPF3) ($\overline{\text{J-34}}$) +(MRF3) ($\overline{\text{J-37}}$)] ($\overline{\text{J-4}}$) ($\overline{\text{J-23}}$)+[(MCX2) +(MCX4)+(MCX8)+(MCD)] (DUG)}

MWF4=($\overline{\text{TWR}}$) ($\overline{\text{MCE}}$) {[(MTPF4) ($\overline{\text{J-34}}$) +(MRF4) ($\overline{\text{J-37}}$)] ($\overline{\text{J-4}}$) ($\overline{\text{J-23}}$)+[$\overline{\text{(MTC)+(MTT)+(TMTRS)}}$] (MC24) (DUG)}

MWG1=($\overline{\text{TWR}}$) ($\overline{\text{MCE}}$) {[(MTPG1) ($\overline{\text{J-35}}$) +(MRG1) ($\overline{\text{J-37}}$)] ($\overline{\text{J-6}}$) ($\overline{\text{J-23}}$) +[(MLRDD-3B) (AS1)+(MRG1)] (DUB) +[($\overline{\text{MTPA1}}$) (MTPA2) ($\overline{\text{MTPA3}}$) (MTPA4) (MTPB1) ($\overline{\text{MTPB2}}$) ($\overline{\text{MTPB3}}$) ($\overline{\text{MTPB4}}$) ($\overline{\text{MTIN1}}$) (MTIN2) (MTIN3) ($\overline{\text{MTIN4}}$) (MTC) (MC24)+(MRG1)] (DUG)}

MWG2=($\overline{\text{TWR}}$) ($\overline{\text{MCE}}$) {[(MTPG2) ($\overline{\text{J-35}}$) +(MRG2) ($\overline{\text{J-37}}$)] ($\overline{\text{J-6}}$) ($\overline{\text{J-23}}$) +[(MLRDD-3B) (AS2)+(MRG2)] (DUB)}

MWG3=($\overline{\text{TWR}}$) ($\overline{\text{MCE}}$) {[(MTPG3) ($\overline{\text{J-35}}$) +(MRG3) ($\overline{\text{J-37}}$)] ($\overline{\text{J-6}}$) ($\overline{\text{J-23}}$) +[(MLRDD-3B) (AS3)+(MRG3)] (DUB)}

MWG4=($\overline{\text{TWR}}$) ($\overline{\text{MCE}}$) {[(MTPG4) ($\overline{\text{J-35}}$) +(MRG4) ($\overline{\text{J-37}}$)] ($\overline{\text{J-6}}$) ($\overline{\text{J-23}}$)}

MWH1=($\overline{\text{TWR}}$) ($\overline{\text{MCE}}$) {([(MTPA1) (DUB) +(MTPH1) [(DUE)+(DUF)]] ($\overline{\text{J-35}}$) (MRH1) ($\overline{\text{J-38}}$)) ($\overline{\text{J-14}}$) ($\overline{\text{J-21}}$)+[$\overline{\text{(MC24) (MCXIN)+(MCRDC)}}$] [(MTC) (MC24) ($\overline{\text{MTIN1}}$) (MTIN2) ($\overline{\text{MTIN3}}$)+(MRH1)] (DUG)}

MWH2=($\overline{\text{TWR}}$) ($\overline{\text{MCE}}$) {([(MTPA2) (DUB) +(MTPH2) [(DUE)+(DUF)]] ($\overline{\text{J-35}}$) +(MRH2) ($\overline{\text{J-38}}$)) ($\overline{\text{J-14}}$) ($\overline{\text{J-21}}$)+[$\overline{\text{(MC24) (MCXIN)+(MCRDC)}}$] [(MTC) (MC24) ($\overline{\text{MTIN1}}$) (MTIN2) ($\overline{\text{MTIN3}}$)+(MLRDC-1) (MLA+B)+(MCX2)+(MRH2)] (DUG)}

MWH3=($\overline{\text{TWR}}$) ($\overline{\text{MCE}}$) {([(MTPA3) (DUB) +(MTPH3) [(DUE)+(DUF)]] ($\overline{\text{J-35}}$) +(MRH3) ($\overline{\text{J-38}}$)) ($\overline{\text{J-14}}$) ($\overline{\text{J-21}}$)+[$\overline{\text{(MC24) (MCXIN)+(MCRDC)}}$] [(MTC) (MC24) ($\overline{\text{MTIN1}}$) (MTIN2) ($\overline{\text{MTIN3}}$)+(MLRDC-1) (MLA+B)+(MCX4)+(MRH3)] (DUG)}

MWH4=($\overline{\text{TWR}}$) ($\overline{\text{MCE}}$) {([(MTPA4) (DUB) +(MTPH4) [(DUE)+(DUF)]] ($\overline{\text{J-35}}$) +(MRH4) ($\overline{\text{J-38}}$)) ($\overline{\text{J-14}}$) ($\overline{\text{J-21}}$)+[$\overline{\text{(MC24) (MCXIN)+(MCRDC)}}$] [(MCX8) +(MRH4)] (DUG)}

MWI1=($\overline{\text{TWR}}$) ($\overline{\text{MCE}}$) {([(MTPO1) (DUB) +(MTPI1) [(DUE)+(DUF)]] ($\overline{\text{J-35}}$) +(MRI1) ($\overline{\text{J-38}}$)) ($\overline{\text{J-18}}$) ($\overline{\text{J-21}}$)+[$\overline{\text{(MC24) (MCXIN)}}$ ($\overline{\text{MLRDH-2}}$)] [(MLRDC-1) [(HWY1)+(HWY2)+(HWY3)]+(MCO1) +(WSJ1)+(MTIC1) (MSTIC2) (MSTIC3) (MSTID1)+(MRI1)] (DUG)}

MWI2=($\overline{\text{TWR}}$) ($\overline{\text{MCE}}$) {([(MTPO2) (DUB) +(MTIP2) [(DUE)+(DUF)]] ($\overline{\text{J-35}}$) +(MRI2) ($\overline{\text{J-38}}$)) ($\overline{\text{J-18}}$) ($\overline{\text{J-21}}$)+[$\overline{\text{(MC24) (MCXIN)}}$ ($\overline{\text{MLRDH-2}}$)] [MLRDC-1) [(HWY2) +(HWY3)]+(MCO2)+(WSJ2) +(MSTIC1) (MSTIC2) (MSTIC3) (MSTID2) +(MRI2)] (DUG)}

MWI3=($\overline{\text{TWR}}$) ($\overline{\text{MCE}}$) {([(MTPO3) (DUB) +(MTPI3) [(DUE)+(DUF)]] ($\overline{\text{J-35}}$) +(MRI3) ($\overline{\text{J-38}}$)) ($\overline{\text{J-18}}$) ($\overline{\text{J-21}}$)+[$\overline{\text{(MC24) (MCXIN)}}$ ($\overline{\text{MLRDH-2}}$)] [(MLRDC-1) [(HWY4) +(HWY5)]+(MCO4)+(WSJ3) +(MSTIC1) (MSTIC2) (MSTIC3) (MSTID3) +(MRI3)] (DUG)}

MWI4=($\overline{\text{TWR}}$) ($\overline{\text{MCE}}$) {([(MTPO4) (DUB) +(MTPI4) [(DUE)+(DUF)]] ($\overline{\text{J-35}}$) +(MRI4) ($\overline{\text{J-38}}$)) ($\overline{\text{J-18}}$) ($\overline{\text{J-21}}$) +[(MLRDC-4)+(MRI4)] (DUG)}

Those common quantities (prefix J) and sender sequence states (prefix K) used in the write command equations are listed in Table 13-14, along with the reference to where they are defined.

TABLE 13-14

| Function: | Section |
|---|---|
| ($\overline{\text{J-2}}$)=($\overline{\text{K1D}}$) | 13-2 |
| ($\overline{\text{J-4}}$)=($\overline{\text{K1E}}$) or ($\overline{\text{K1F}}$) | 13-2 |
| ($\overline{\text{J-6}}$)=($\overline{\text{K1G}}$) | 13-2 |
| ($\overline{\text{J-14}}$)=($\overline{\text{K1H}}$) | 13-2 |
| ($\overline{\text{J-18}}$)=($\overline{\text{K1I}}$) | 13-2 |
| ($\overline{\text{J-21}}$)=K3I or K3H | 13-2 |
| ($\overline{\text{J-23}}$)=K3G or K3F or K3E | 13-2 |
| ($\overline{\text{J-24}}$)=K3D | 13-2 |
| ($\overline{\text{J-25}}$)=K3C | 13-2 |
| ($\overline{\text{J-26}}$)=K3B | 13-2 |
| ($\overline{\text{J-33}}$)=($\overline{\text{J-34}}$)=($\overline{\text{J-35}}$)=K5 | 13-2 |
| ($\overline{\text{J-36}}$)=($\overline{\text{J-37}}$)=($\overline{\text{J-38}}$)=($\overline{\text{K5}}$) | 13-2 |
| ($\overline{\text{J-53}}$)=$f_2$ | 13-4 |
| ($\overline{\text{J-57}}$)=$f_3$ | 13-4 |
| ($\overline{\text{J-62}}$)=$f_4$ | 13-4 |
| ($\overline{\text{J-78}}$)=AQ | 13-4 |
| ($\overline{\text{J-79}}$)=($\overline{\text{AQ}}$) | 13-4 |
| J-99=CQ | 13-4 |
| ($\overline{\text{J-99}}$)=($\overline{\text{CQ}}$) | 13-4 |
| J-119=SQ | 13-4 |
| K-91=MXC1(DUB) | 13-3 |
| K-93=MWC2(DUB) | 13-3 |
| K-95=MWC3(DUB) | 13-3 |
| K-97=MWC4(DUB) | 13-3 |

The translator 300, which operates in cooperation with the register-sender apparatus as disclosed herein, is disclosed in a copending U.S. patent application entitled, "Magnetic Drum Translator" by J. R. Maneschi, J. E. Meschi, V. K. Rice, J. G. Van Bosse and L. W. Amiot filed March 27, 1963, Serial No. 268,384.

While we have described above the principles of our invention in connection with specific apparatus, it is to be clearly understood that this description is made only by way of example and not as a limitation to the scope of our invention. For example in the appended claims reference to a coordinate array memory having columns and rows should be interpreted broadly to cover circulating delay line memories in which each individual delay line corresponds to a column, and the bits which emerge from the delay lines at the same time and are written back into the delay lines at one time should be interpreted as constituting a row.

What is claimed is:

1. In a communication switching system having a plurality of register junctors for connection to calling lines to receive call signals;

register apparatus comprising a memory and logic circuits shared on a time division multiplex basis, said memory having a coordinate array of storage elements in rows and columns, a plurality of registers individually associated with said register junctors, each register comprising a given number of said rows including a control row and at least one data row, a source of recurring pulses supplied to the memory, a multiplex arrangement associating each register with an individual pulse time slot during which the stored information is recirculated and may be selectively modified by means of the logic circuits, call signal information being received by the logic circuits from the register junctors during the associated time slots for storage in the memory;

each data row of each register being individually associated with a sub-time slot, and said control row of each register being associated with one sub-time preceding and one sub-time slot following the sub-time slots of the data rows within the time slot of the register;

carry storage means in said logic circuits to receive information during particular sub-time slots to control rewrite of rows having subsequent sub-time slots, including rewrite of the control row during its second sub-time slot.

2. A communication switching system comprising:

a plurality of communication paths;

a switching network to selectively interconnect said paths;

register means having a memory divided into a plurality of rows to store call signaling information oriented in digits, said rows each being divided into a plurality of positions and said digits each being oriented in a given number of pulses;

control means to selectively control said network for establishing a connection between a calling one of said paths and said register means;

logic means responsive to call signaling information from said calling path via said connection to generate timing information for distinguishing said pulses and said digits and to transfer said timing information into one of said memory rows;

said logic means subsequently responsive to stored timing information indicative of one of said pulses to subsequently generate a signal having a numerical value of "1" and to transfer said into a position of another one of said memory rows for storage thereof;

said logic means subsequently responsive to said stored signal and to store timing information designating a subsequent pulse to remove said stored signal from said position and to subsequently generate another signal having a numerical value of said signal plus "1" and to subsequently transfer said other signal into said memory position; and shifting means subsequently responsive to stored timing information indicative of a completed digit stored in said memory position to subsequently shift the information contained in said position into another memory position of the same memory row so that each of said digits of said call signaling information can be stored in said memory for further processing of the call to a called one of said paths.

3. A communication switching system as claimed in claim 2:

wherein said logic means is further responsive to said call signaling information from said calling path via said connection to generate said timing information for also designating the completion of said call signaling information after the duration of a given timing interval.

4. A communication switching system as claimed in claim 3:

which further includes means responsive to said communication paths having relatively many demands for service to generate a release signal for releasing said register means; and means responsive to said release signal to cause said logic means to shorten said given timing interval for designating the completion of said call signaling information in a relatively shorter interval of time so that said register means can be available for storage of information from other calling paths in a relatively shorter period of time.

5. A communication switching system as claimed in claim 3:

wherein said logic means includes storage means responsive to said timing information to also store said timing information for subsequent use by said logic means.

6. A communication switching system as claimed in claim 3:

wherein said logic means includes timing means to time said call signaling information, said timing means having at least three timing rates to distinguish said pulses and said digits and to designate the the completion of said call signaling information.

7. A communication switching system as claimed in claim 6:

wherein said register means comprises equipment shared on a time division multiplex basis by a plurality of calling paths in recurring time slots; and wherein said memory comprises a coordinate-array of storage elements in a recirculating arrangement with said equipment.

8. A communication switching system as claimed in claim 7:

wherein said shifting means is a shift register coupled to said memory.

9. A communication switching system as claimed in claim 8:

wherein said timing means includes add-logic means having an input and an output, said output coupled to said memory add 1 to said stored timing information;

first gate means coupled to said output of the add-logic means and to said memory to couple said output of the add-logic to said memory and to alternatively retransfer said stored timing information into said memory; and add-command means connected to said first gate means to enable said gate means for coupling said output of the add-logic to said memory.

10. A communication switching system as claimed in claim 9:

wherein said add-command means includes second gate means connected to said first gate means to generate an add-command signal for enabling said first gate means;

a source of recurring signals coupled to said second gate means to generate a plurality of recurring signals for sequentially enabling said second gate means means during each time slot, said recurring signals each corresponding to a memory row of a register with the first and last recurring signal each corresponding to said one of said memory rows so that said control information can be accessed during the first recurring signal and subsequently modified during the last recurring signal for the same time slot in accordance with the data information stored during said same time slot;

local add-command means connected to said second gate means to selectively enable said second gate means in coincidence with one of said recurring signals for controlling the information stored in each memory row in response to call signaling information and stored information in said storage means; and mode-of-time means connected to said second gate means having at least three separate timing rates to enable said second gate means in coincidence with said local add-command means at said different timing rates.

11. A communication switching system as claimed in claim 10:

wherein said mode-of-time means includes third gate means connected to said second gate means to generate a timing signal for selectively enabling said second gate means;

further includes at least three timing source means each having different timing intervals to enable said third gate means at different intervals of time; and wherein said mode-of-time means further includes mode means connected to said third gate means to selectively connect one of said source means to said third gate means for enabling said third gate means at a timing rate corresponding to said selected source means.

12. A communication switching system as claimed in claim 8:

which further includes a plurality of translator means to supply said register means with equipment location information for storage therein;

wherein said call signaling information includes equipment location information of said calling path received from said control means, directory number information subsequently received from said calling path, and equipment location information of said called path subsequently received from said translator means; and further includes a plurality of sender means to remove stored equipment location information from said register means and to then transmit said stored equipment location information to said control means for further processing of a call.

13. A communication switching system as claimed in claim 12:

wherein said timing means includes add-logic means having an input and an output, said output coupled to said memory to add 1 to said stored timing information;

first gate means coupled to said output of the add-logic means and to said memory to couple said output of the add-logic to said memory and to alternatively retransfer said stored timing information into said memory; and add-command means connected to said first gate means to enable said gate means for coupling said output of the add-logic to said memory.

14. A communication switching system as claimed in claim 13:

wherein said add-command means includes second gate means connected to said first gate means to generate an add-command signal for enabling said first gate means;

a source of recurring signals coupled to said second gate means to generate a plurality of recurring signals for sequentially enabling said second gate means during each time slot, said recurring signals each corresponding to a memory row of a register with the first and last recurring signal each corresponding to said one of said memory rows so that said control information can be accessed during the first recurring signal and subsequently modified during the last recurring signal for the same time slot in accordance with the data information stored during said same time slot;

local add-command means connected to said second gate means to selectively enable said second gate means in coincidence with one of said recurring signals for controlling the information stored in each memory row in response to said call signaling information and stored information in said storage means; and mode-of-time means connected to said second gate means having at least three separate timing rates to enable said second gate means in coincidence with said local add-command means at said different timing rates.

15. A communication switching system as claimed in claim 14:

wherein said mode-of-time means includes third gate means connected to said second gate means to generate a timing signal for selectively enabling said second gate means;

further includes at least three timing source means each having different timing intervals to enable said third gate means at different intervals of time; and wherein said mode-of-time means further includes mode means connected to said third gate means to selectively connect one of said source means to said third gate means for enabling said third gate means at a timing rate corresponding to said selected source means.

16. A communication switching system as claimed in claim 15:

which further includes transfer means to transfer said equipment location information from one of said translator means to said register means for storage therein.

17. A communication switching system as claimed in claim 16:

wherein said stored control information includes a signal indicative of said transfer means requesting the service of one of said translator means; and said logic means further responsive to said stored signal to subsequently generate timing information for timing said transfer means requesting the service of said translator means and to transfer said timing information into one of said other memory rows.

18. A communication switching system as claimed in claim 17:

wherein further logic means further includes release means responsive to said timing information subsequently designating a given time to subsequently stop said transfer means from requesting the service of said one of said translator means and to delete the stored signal from storage in said memory so that said transfer means can request the service of another one of said translator means.

19. A communication switching system as claimed in claim 18:

wherein said stored control information includes a signal indicative of one of said sender means operatively associated with said register means and sender sequence control information; and said logic means further responsive to said stored signal to subsequently generate timing information for timing the operation of said one of said sender means and to transfer said timing information into said one of said memory rows.

20. A communication switching system as claimed in claim 19:

wherein said logic means also to transfer control information into another one of said memory rows for controlling the sequence of operations for the register means; and said logic means further responsive to the stored timing information designating a given time-out interval to subsequently generate register sequence information designating a release sequence of operations for the register and to transfer said register sequence information into said memory so that said one of said sender means and said register means can be released.

21. A communication switching system as claimed in claim 19:

wherein said stored control information in said one of said memory rows further includes information for controlling the sequence of operations of the sender.

22. A communication switching system as claimed in claim 15:

wherein said stored control information includes a signal indicative of one of said sender means operatively associated with said register means and sender sequence control information; and said logic means further responsive to said stored signal to subsequently generate timing information for timing the operation of said one of said sender means and to transfer said timing information into said one of said memory rows.

23. A communication switching system as claimed in claim 22:

wherein said logic means also to transfer control information into another one of said memory rows for controlling the sequence of operations for the register means; and said logic means further responsive to the stored timing information designating a given time-out interval to subsequently generate register sequence information designating a release sequence of operations for the register and to transfer said register sequence information into said memory so that said one of said sender means and said register means can be released.

24. A communication switching system as claimed in claim 23:

wherein said stored control information in said one of said memory rows further includes information for controlling the sequence of operations of the sender.

25. A communication switching system as claimed in claim 12:

wherein said stored timing information in said one of said memory rows further includes information for controlling sequences of operations of system equipment.

26. A communication switching system as claimed in claim 25:

wherein said system equipment includes said register means and said sender means.

27. A communication switching system comprising:

a plurality of communication paths;

a switching network to selectively interconnect said paths;

register means to store call signaling information, said register means having a memory divided into a plurality of rows;

control means to selectively control said network for establishing a connection between a calling one of said paths and said register means;

logic means responsive to call signaling information from said calling path via said connection to transfer control information into one of said memory rows for controlling further storage of information in the memory; and said logic means further responsive to said stored control information to subsequently transfer said call signaling information into each of a given number of other memory rows designated by said control information so that said call signaling information can be used for further processing of a call to a called one of said paths.

28. A communication switching system as claimed in claim 27:

wherein said register means comprises equipment shared on a time division multiplex basis by a plurality of calls in recurring time slots; and wherein said memory comprises a coordinate-array of storage elements in a recirculating arrangement with said equipment.

29. A communication switching system as claimed in claim 28:

which further includes translator means to supply said register means with equipment location information for storage therein;

wherein said call signaling information includes equipment location information of said calling path received from said control means, directory number information subsequently received from said calling path, and equipment location information of said called path subsequently received from said translator means; and further includes sender means to remove stored equipment location information from said register means and to then transmit said stored equipment location information to said control means for further processing of a call.

30. A communication switching system as claimed in claim 29:

wherein said stored control information in said one of said memory rows further includes information for controlling sequences of operations of system equipment.

31. A communication switching system as claimed in claim 27:

which further includes a plurality of translator means to store equipment location information and to translate directory number information for the calling path into corresponding directory number information of said called path;

transfer means to transfer said equipment location information from one of said translator means to said register means for storage therein; and wherein said call signaling information includes said equipment location information of said called path subsequently received from said transfer means.

32. A communication switching system as claimed in claim 31:

wherein said stored control information includes a signal indicative of said transfer means requesting the service of one of said translator means; and said logic means further responsive to said stored signal to subsequently generate timing information for timing said transfer means requesting the service of said translator means and to transfer said timing information into one of said other memory rows.

33. A communication switching system as claimed in claim 32:

which further includes release means responsive to said timing information subsequently designating a given time to subsequently stop said transfer means from requesting the service of said one of said translator means and to delete the stored signal from storage in said memory so that said transfer means can request the service of another one of said translator means.

34. A communication switching system as claimed in claim 33:

wherein said logic means includes storage means responsive to said timing information to also store said timing information for subsequent use by said logic means.

35. A communication switching system as claimed in claim 34:

wherein said register means comprises equipment shared on a time division multiplex basis by a plurality of calling paths in recurring time slots; and wherein said memory comprises a coordinate-array of storage elements in a recirculating arrangement with said equipment.

36. A communication switching system as claimed in claim 35:

wherein said logic means includes add-logic means having an input and an output, said output coupled to said memory to add 1 to said stored timing information;

first gate means coupled to said output of the add-logic means and to said memory to couple said output of the add-logic to said memory and to alternatively retransfer said stored timing information into said memory; and add-command means connected to said first gate means to enable said gate means for coupling said output of the add-logic to said memory.

37. A communication switching system as claimed in claim 36:

wherein said add-command means includes second gate means connected to said first gate means to generate an add-command signal for enabling said first gate means;

a source of recurring signals coupled to said second gate means to generate a plurality of recurring signals for sequentially enabling said second gate means during each time slot, said recurring signals each corresponding to a memory row of a register with the first and last recurring signal each corresponding to said one of said memory rows so that said control information can be accessed during the first recurring signal and subsequently modified during the last recurring signal for the same time slot in accordance with the data information stored during said same time slot;

local add-command means connected to said second gate means to selectively enable said second gate means in coincidence with one of said recurring signals for controlling the information stored in each memory row in response to said call signaling information and stored information in said storage means; and mode-of-time means connected to said second gate means having at least three separate timing rates to enable said second gate means in coincidence with said local add-command means at said different timing rates.

38. A communication switching system as claimed in claim 37:

wherein said mode-of-time means includes third gate means connected to said second gate means to generate a timing signal for selectively enabling said second gate means;

further includes at least three timing source means each having different timing intervals to enable said third gate means at different intervals of time; and wherein said mode-of-time means further includes mode means connected to said third gate means to selectively connect one of said source means to said third gate means for enabling said third gate means at a timing rate corresponding to said selected source means.

39. A communication switching system as claimed in claim 27:

Wherein said call signaling information includes equipment location information of said called path; and further includes a plurality of sender means to remove stored equipment location information from said register means and to then transmit said stored equipment location information to said control means for further processing of a call.

40. A communication switching system as claimed in claim 39:

wherein said stored control information includes a signal indicative of one of said sender means operatively associated with said register means and sender sequence control information; and said logic means further responsive to said stored signal to subsequently generate timing information for timing the operation of said one of said sender means and to transfer said timing information into said one of said memory rows.

41. A communication switching system as claimed in claim 40:

wherein said logic means also to transfer control information into another one of said memory rows for controlling the sequence of operations for the register means; and said logic means further responsive to the stored timing information designating a given time-out interval to subsequently generate register sequence information designating a release sequence of operations for the register and to transfer said register sequence information into said memory so that said one of said sender means and said register means can be released.

42. A communication switching system as claimed in claim 41:

wherein said stored control information in said one of said memory rows further includes information for controlling the sequence of operations of the sender.

43. A communication switching system as claimed in claim 42:

wherein said logic means includes storage means responsive to said timing information to also store said timing information for subsequent use by said logic means.

44. A communication switching system as claimed in claim 43:

wherein said register means comprises equipment shared on a time division multiplex basis by a plurality of calling paths in recurring time slots; and wherein said memory comprises a coordinate-array of storage elements in a recirculating arrangement with said equipment.

45. A communication switching system as claimed in claim 44:

wherein said logic means includes add-logic means having an input and an output, said output coupled to said memory to add 1 to said stored timing information;

first gate means coupled to said output of the add-logic means and to said memory to couple said output of the add-logic to said memory and to alternatively retransfer said stored timing information into said memory; and add-command means connected to said first gate means to enable said gate means for coupling said output of the add-logic to said memory.

46. A communication switching system as claimed in claim 45:

wherein said add-command means includes second gate means connected to said first gate means to generate an add-command signal for enabling said first gate means;

a source of recurring signals coupled to said second gate means to generate a plurality of recurring signals for sequentially enabling said second gate means during each time slot, said recurring signals each corresponding to a memory row of a register with the first and last recurring signal each corresponding to said one of said memory rows so that said control information can be accessed during the last recurring signal for the same time slot in accordance with the data information stored during said said time slot;

local add-command means connected to said second gate means to selectively enable said second gate means in coincidence with one of said recurring signals for controlling the information stored in each memory row in response to said call signaling information and stored information in said storage means; and mode-of-time means connected to said second gate means having at least three separate timing rates to enable said second gate means in coincidence with said local add-command means at said different timing rates.

47. A communication switching system as claimed in claim 46:

wherein said mode-of-time means includes third gate means connected to said second gate means to generate a timing signal for selectively enabling said second gate means;

further includes at least three timing source means each having different timing intervals to enable said third gate means at different intervals of time; and wherein said mode-of-time means further includes mode means connected to said third gate means to selectively connect one of said source means to said third gate means for enabling said third gate means at a timing rate corresponding to said selected source means.

48. A communication switching system as claimed in claim 47:

which further includes a plurality of translator means to store equipment location information and to translate directory number information for the calling path into corresponding directory number information of said called path;

transfer means to transfer said equipment location information from one of said translator means to said register means for storage therein; and wherein said call signaling information includes said equipment location information of said called path subsequently received from said transfer means.

49. A communication switching system as claimed in claim 48:

wherein said stored control information includes a signal indicative of said transfer means requesting the service of one of said translator means; and said logic means further responsive to said stored signal to subsequently generate timing information for timing said transfer means requesting the service of said translator means and to transfer said timing information into one of said other memory rows.

50. A communication switching system as claimed in claim 49:

which further includes release means responsive to said timing information subsequently designating a given time to subsequently stop said transfer means from requesting the service of said one of said translator means and to delete the stored signal from storage in said memory so that said transfer means can request the service of another one of said translator means.

51. A communication switching system comprising:

a plurality of communication paths;

a switching network to selectively interconnect said paths;

register means having a memory divided into a plurality of rows to store call signaling information oriented in a given number of digits;

control means to selectively control said network for establishing a connection between a calling one of said paths and said register means;

logic means responsive to call signaling information from said calling path via said connecton to generate timing information for dstinguishing said digits and to transfer said timing information into one of said memory rows; and said logic means further responsive to said stored timing information designating one of said digits to subsequently generate said digit and to transfer said digit into another one of said memory rows so that each of said given number of digits of said call signaling information can be stored in said memory for further processing of the call to a called one of said paths.

52. In a communication system, a data storage and processing arrangement system comprising:

a plurality of junctors for connection to external units from which data signals are received;

digital processing apparatus time shared by said junctors and connected in common thereto, with a program for utilizing the apparatus being the same for all of the junctors;

a memory comprising a plurality of sets of storage elements, each junctor having individually associated therewith a group comprising a given number of said sets, including at least one control set and one data set;

means to generate sequentially a plurality of periodically recurring individual junctor addresses, with the period between occurrences of the address of each junctor sufficiently short to detect any significant changes in the data signals received from said external units; means to generate a given sequence of set addresses during each occurrence of each junctor address, said given sequence comprising an address designating said control set, followed by addresses designating the data sets in turn, followed by a repetition of the address of the control set; gate means to provide access to each set upon coincidence of its junctor address and set address;

means to generate signals designating read, processing, and write intervals in sequence during the occurrence of each set address; means effective responsive to the read interval signal to read the information from the addressed set, the information being maintained available to the apparatus during the processing and write intervals, and means effective responsive to the write interval signal to store information from the apparatus in said set;

carry storage means in said apparatus, the information available to said processing apparatus including information from the set being addressed, data signals received via the junctor being addressed, and information from the carry storage means; there being means in the processing apparatus to store in the carry storage means information currently available during occurrence of the particular address, whereby during each occurrence of a junctor address information available during the occurrence of one set address may be stored and used during the occurrence of subsequent set addresses;

selected information read from said control set during the first occurrence of its address in said given sequence and placed in the carry storage means being used to control the storage and processing of information in the data sets during the respective occurrences of their individual addresses, and the information in the control set being read, selectively modified and rewritten therein during the second occurrence of its address;

the processing apparatus, including the carry storage means, being cleared following the write interval of the second addressing of the control set.

53. A system as claimed in claim 52, wherein information stored in said control set includes sequence state information designating the portion of said program then being utilized.

54. A system as claimed in claim 53, further including other apparatus, means utilized in accordance with said control to couple said processing apparatus to said other apparatus during one occurrence of said address for one of said junctors to transfer information from said memory sets associated with that junctor to said other apparatus for additional processing, and means effective during a subsequent occurrence of said address of said junctor to receive information from said other apparatus and store it in said memory sets.

55. A system as claimed in claim 54, further including output means, and an arrangement effective during occurrences of said address of said junctor to transfer information from said memory sets to said output means, the information returned from said other apparatus including information for transfer to said output means for control thereof.

56. A system as claimed in claim 55, wherein said junctors are register junctors for connection to calling lines to receive call signals, said other apparatus comprises translation apparatus, and said output means comprises sending means.

References Cited by the Examiner

UNITED STATES PATENTS 2,738,382 3/1956 Brooks et al. ---------- 179—18

KATHLEEN H. CLAFFY, *Primary Examiner.*

WILLIAM C. COOPER, *Examiner.*